(12) United States Patent
Yamada et al.

(10) Patent No.: US 10,788,613 B2
(45) Date of Patent: Sep. 29, 2020

(54) PLANAR LIGHTING DEVICE

(71) Applicant: MINEBEA MITSUMI Inc., Nagano (JP)

(72) Inventors: Taku Yamada, Kitasaku (JP); Koji Sakai, Kitasaku (JP); Kenta Oishi, Kitasaku (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/483,983

(22) PCT Filed: Jan. 11, 2018

(86) PCT No.: PCT/JP2018/000507
§ 371 (c)(1),
(2) Date: Aug. 6, 2019

(87) PCT Pub. No.: WO2018/146988
PCT Pub. Date: Aug. 16, 2018

(65) Prior Publication Data
US 2020/0018889 A1  Jan. 16, 2020

(30) Foreign Application Priority Data

Feb. 9, 2017  (JP) ................................. 2017-022602

(51) Int. Cl.
*F21V 8/00* (2006.01)
*G09F 13/18* (2006.01)

(52) U.S. Cl.
CPC ............ *G02B 6/0036* (2013.01); *G09F 13/18* (2013.01)

(58) Field of Classification Search
CPC .. G02B 6/00; G02B 6/0036; F21S 2/00; F21S 41/00; F21S 43/00; F21S 45/00;
(Continued)

(56) References Cited

U.S. PATENT DOCUMENTS 7,639,918 B2 * 12/2009 Sayers ................... G02B 6/001
385/146
9,903,996 B2 * 2/2018 Fukui ...................... G09F 13/18
(Continued)

FOREIGN PATENT DOCUMENTS

JP  2002-109924 A  4/2002
JP  2002-258058 A  9/2002
(Continued)

OTHER PUBLICATIONS

English translation of Written Opinion for corresponding International Application No. PCT/JP2018/000507 dated Feb. 27, 2018.
(Continued)

*Primary Examiner* — Daniel Petkovsek
(74) *Attorney, Agent, or Firm* — Pearne & Gordon LLP

(57) ABSTRACT

A planar lighting device according to an embodiment includes a light guide plate and a reflecting member. The light guide plate has an incident surface that receives light output from a light source and an output surface that outputs the light received by the incident surface. The reflecting member faces an end surface opposite to the incident surface of the light guide plate and reflects light leaking from the end surface. A plurality of first prisms are formed on an opposite surface opposite to the output surface-of the light guide plate to be away from the output surface stepwise from the incident surface to the end surface. The first prisms cause the light reflected by the reflecting member and traveling from the end surface toward the incident surface to be output from the output surface in a first direction as first light and cause the light entering into the incident surface and traveling from the incident surface toward the end surface to be output from the output surface in a second direction different from the first direction as second light.

14 Claims, 30 Drawing Sheets

(58) Field of Classification Search
CPC ............. G09F 13/18; G09F 2013/1827; G09F 2013/184; G09F 2013/222
See application file for complete search history.

(56) References Cited

U.S. PATENT DOCUMENTS

2002/0057561 A1    5/2002  Niida et al.
2006/0269213 A1*  11/2006  Hwang ................ G02B 6/0036
                                                              385/146
2013/0307831 A1   11/2013  Robinson et al.

FOREIGN PATENT DOCUMENTS

JP    2015-526923 A    9/2015
KR    10-1373827 B1    3/2014

OTHER PUBLICATIONS

International Search Report for corresponding International Application No. PCT/JP2018/000507 dated Feb. 27, 2018.
Written Opinion for corresponding International Application No. PCT/JP2018/000507 dated Feb. 27, 2018.

* cited by examiner

PLANAR LIGHTING DEVICE

FIELD

The present invention relates to a planar lighting device.

BACKGROUND

Conventionally provided are planar lighting devices used for on-board sign lamps of vehicles, such as high mount stop lamps, and room lamps of vehicles, for example.

CITATION LIST

Patent Literature

Patent Literature 1: Japanese Patent Application Laid-open No. 2002-258058

SUMMARY

Technical Problem

Some planar lighting devices are designed to output light for design in addition to light for illumination. The light for design is light for displaying patterns, characters, and the like by the intensity of the light emission, for example. Displaying the light emission patterns, such as patterns and characters, increases the value of planar lighting devices. Such planar lighting devices need to control distribution of the light for illumination and the light for design. It is difficult, however, to control distribution of two kinds of light, that is, the light for illumination and the light for design.

The present invention has been made in view of the above situation, and an object of the present invention is to provide a planar lighting device that can control distribution of two kinds of light.

Solution to Problem

It is an object of the present invention to at least partially solve the problems in the conventional technology. A planar lighting device according to an embodiment comprises a light guide plate and a reflecting member. The light guide plate comprises an incident surface that receives light output from a light source and an output surface that outputs the light received by the incident surface. The reflecting member faces an end surface opposite to the incident surface of the light guide plate and reflects light leaking from the end surface. A plurality of first prisms are formed on an opposite surface opposite to the output surface of the light guide plate to be away from the output surface stepwise from the incident surface to the end surface. The first prisms causes the light reflected by the reflecting member and traveling from the end surface toward the incident surface to be output from the output surface in a first direction as first light and cause the light entering into the incident surface and traveling from the incident surface toward the end surface to be output from the output surface in a second direction different from the first direction as second light.

Advantageous Effects of Invention

An aspect of the present invention can control distribution of two kinds of light.

DESCRIPTION OF EMBODIMENTS

Planar lighting devices according to embodiments are described below with reference to the accompanying drawings. The embodiments described below are not intended to limit the use of the planar lighting devices. The drawings are schematic illustrations, and it should be noted that the relation between the sizes of components and the ratios of the components may possibly be different from those in an actual configuration. The relation between the sizes and the ratios may possibly be different between the drawings.

First Embodiment

Figure 1:
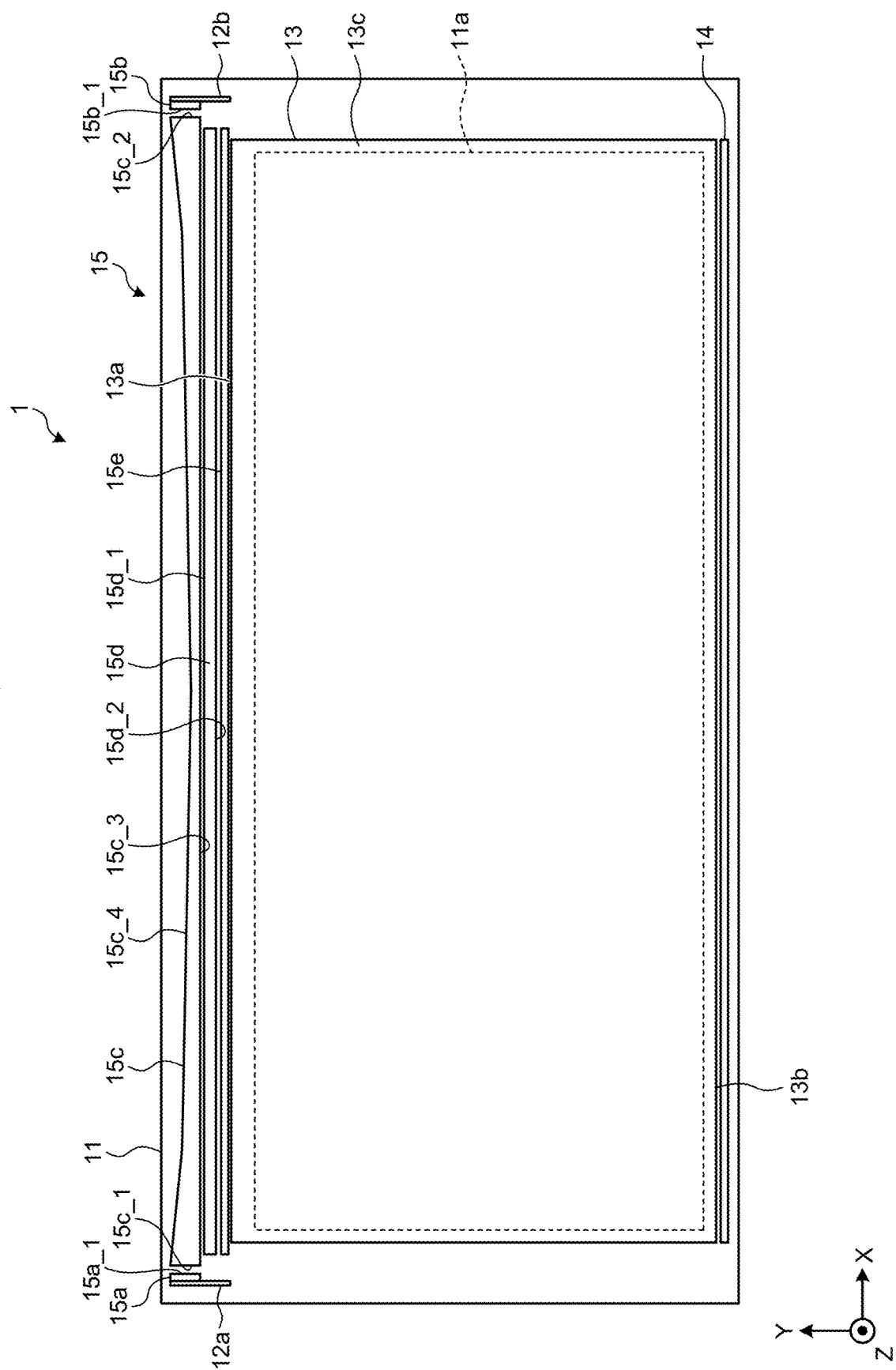
FIG. 1 is a front view of a planar lighting device according to a first embodiment.

An outline of the configuration of a planar lighting device 1 is described with reference to FIG. 1. FIG. 1 is a front view of the planar lighting device 1 according to a first embodiment.

As illustrated in FIG. 1, the planar lighting device 1 includes a housing frame 11, flexible printed circuits (FPCs) 12a and 12b, a light guide plate 13, a reflection film 14, and a linear light source 15. The linear light source 15 includes light emitting diodes (LEDs) 15a and 15b, a light bar 15c, a prism sheet 15d, and a diffusion sheet 15e. The planar lighting device 1 is used for high mount stop lamps and room lamps of vehicles, for example.

The housing frame 11 holds and accommodates the FPCs 12a and 12b, the light guide plate 13, the reflection film 14, and the linear light source 15. The housing frame 11 is made of synthetic resin and/or metal, for example. For convenience of explanation, FIG. 1 does not illustrate a part of the housing frame 11 in the plus direction of a Z-axis. The housing frame 11 has an opening 11a from which light is output.

The FPC 12a is a substrate on which the LED 15a is mounted. The FPC 12a has a mounting surface on which the LED 15a is placed. The FPC 12b is a substrate on which the LED 15b is mounted. The FPC 12b has a mounting surface on which the LED 15b is placed.

The FPCs 12a and 12b are connected to a drive circuit, which is not illustrated. The drive circuit drives the LEDs 15a and 15b via the FPCs 12a and 12b, respectively, thereby causing the LEDs 15a and 15b to emit light (turning on the LEDs 15a and 15b).

The light guide plate 13 is made of a transparent material (e.g., polycarbonate resin) and has a rectangular shape in a top view. The light guide plate 13 has an incident surface 13a, an end surface 13b, and a principal surface 13c. The incident surface 13a is a side surface provided side by side with the diffusion sheet 15e. The end surface 13b is a side surface provided side by side with the reflection film 14 and a surface opposite to the incident surface 13a.

The incident surface 13a and the end surface 13b of the light guide plate 13 are strip-shaped surfaces extending in an X-axis direction. The incident surface 13a receives light diffused by the diffusion sheet 15e. Part of the light entering into the incident surface 13a and traveling in the light guide plate 13 leaks from the end surface 13b. The end surface 13b receives light reflected by the reflection film 14.

The principal surface 13c of the light guide plate 13 is a rectangular flat surface expanding along the X-Y plane. The principal surface 13c is an output surface from which light entering into the incident surface 13a is output. In the following description, the "principal surface 13c" may be referred to as an "output surface 13c". The light output from the output surface 13c includes light reflected by the reflection film 14 and light not reflected by the reflection film 14.

The light guide plate 13 has desired translucency. The light guide plate 13, for example, has such translucency that the light guide plate 13 is entirely transparent and allows an object behind a principal surface 13d as will be described later (refer to FIGS. 9 and 10) opposite to the output surface 13c to be visually recognized from the output surface 13c side.

The reflection film 14 is disposed side by side with the end surface 13b of the light guide plate 13 and reflects light leaking from the end surface 13b. The light reflected by the reflection film 14 enters through the end surface 13b. In other words, the reflection film 14 faces the end surface 13b opposite to the incident surface 13a of the light guide plate 13 and reflects light leaking from the end surface 13b. The reflection film 14 is an example of a reflecting member.

The linear light source 15 outputs light. The linear light source 15 is an example of a light source.

The LEDs 15*a* and 15*b* of the linear light source 15 are point light sources. The LED 15*a* has a light-emitting surface 15*a*_1 that emits light. The LED 15*b* has a light-emitting surface 15*b*_1 that emits light. The LED 15*a* is disposed side by side with an incident surface 15*c*_1 of the light bar 15*c* with the light-emitting surface 15*a*_1 facing the incident surface 15*c*_1. The LED 15*b* is disposed side by side with an incident surface 15*c*_2 of the light bar 15*c* with the light-emitting surface 15*b*_1 facing the incident surface 15*c*_2. Consequently, the LED 15*a* emits light entering into the incident surface 15*c*_1, and the LED 15*b* emits light entering into the incident surface 15*c*_2.

The surface opposite to the light-emitting surface 15*a*_1 of the LED 15*a* is placed on the mounting surface of the FPC 12*a*, and the surface opposite to the light-emitting surface 15*b*_1 of the LED 15*b* is placed on the mounting surface of the FPC 12*b*. In other words, the LEDs 15*a* and 15*b* are top-view LEDs. Alternatively, the LEDs 15*a* and 15*b* may be side-view LEDs.

The light bar 15*c* converts light entering thereinto from the LEDs 15*a* and 15*b* serving as point light sources into linear light and outputs it to the light guide plate 13. The light bar 15*c* has a rod-like shape and has the incident surfaces 15*c*_1 and 15*c*_2, an output surface 15*c*_3, and a surface 15*c*_4 opposite to the output surface 15*c*_3. The incident surface 15*c*_1 of the light bar 15*c* is one end surface in the longitudinal direction (X-axis direction) of the light bar 15*c*. The incident surface 15*c*_1 receives light emitted by the LED 15*a*. The incident surface 15*c*_2 of the light bar 15*c* is the other end surface in the longitudinal direction of the light bar 15*c*. The incident surface 15*c*_2 receives light emitted by the LED 15*b*. The output surface 15*c*_3 of the light bar 15*c* outputs the received light.

The prism sheet 15*d* controls distribution of light. The prism sheet 15*d* is disposed between the output surface 15*c*_3 of the light bar 15*c* and the diffusion sheet 15*e*. The prism sheet 15*d* has a surface 15*d*_1 and a surface 15*d*_2. The surface 15*d*_1 faces the output surface 15*c*_3 of the light bar 15*c*, and the surface 15*d*_2 is opposite to the surface 15*d* 1. The prism sheet 15*d* controls distribution of light output from the light bar 15*c* and outputs the light.

The diffusion sheet 15*e* diffuses light. The diffusion sheet 15*e* is disposed between the surface 15*d*_2 of the prism sheet 15*d* and the incident surface 13*a* of the light guide plate 13. The diffusion sheet 15*e* diffuses light output from the prism sheet 15*d* and outputs the diffused light to the incident surface 13*a* of the light guide plate 13.

The length (size in the X-axis direction) of a region in which the luminance of the linear light source 15 (more specifically, the diffusion sheet 15*e*) is uniform is preferably equal to or larger than the length (size in the X-axis direction) of the incident surface 13*a* of the light guide plate 13. The region in which the luminance is uniform is a region in which the ratio between the maximum value and the minimum value (minimum/maximum) of the luminance obtained by equalization in the thickness direction (Y-axis direction) and resolution of equal to or lower than 1 mm, more preferably, equal to or lower than 0.5 mm in the width direction (Z-axis direction) is equal to or higher than 60%, more preferably, equal to or higher than 80%.

Figure 2:
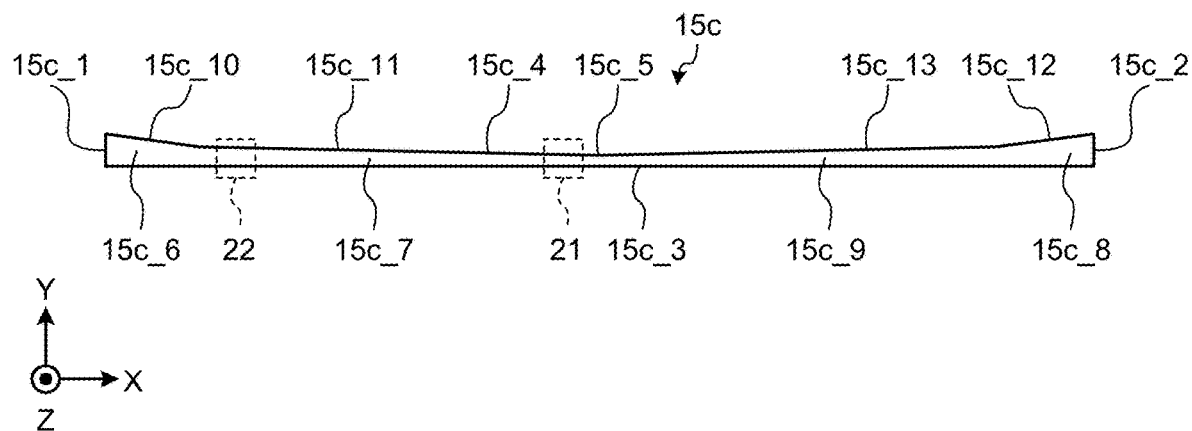
FIG. 2 is a view for explaining a light bar according to the first embodiment.

The following describes the light bar 15*c* according to the first embodiment with reference to FIGS. 2 to 6. FIG. 2 is a view for explaining the light bar 15*c* according to the first embodiment. As illustrated in FIG. 2, the light bar 15*c* has a first part 15*c*_6 and a second part 15*c*_7 having a wedge shape with their width (size in a Y-axis direction) decreasing from the incident surface 15*c*_1 toward a center 15*c* 5 (center in the longitudinal direction of the light bar 15*c*) in the longitudinal direction (X-axis direction) of the light bar 15*c*. The light bar 15*c* also has a third part 15*c*_8 and a fourth part 15*c*_9 having a wedge shape with their width decreasing from the incident surface 15*c*_2 toward the center 15*c*_5 in the longitudinal direction of the light bar 15*c*. As illustrated in FIG. 2, the shape of the light bar 15*c* is line-symmetric with respect to a line segment passing through the center 15*c*_5 and parallel to the Y-axis in a sectional view along the X-Y plane.

As illustrated in FIG. 2, the first part 15*c*_6 includes part of the output surface 15*c*_3 and a surface 15*c*_10 opposite to the part of the output surface 15*c*_3. The second part 15*c*_7 includes part of the output surface 15*c*_3 and a surface 15*c*_11 opposite to the part of the output surface 15*c*_3. The third part 15*c*_8 includes part of the output surface 15*c*_3 and a surface 15*c*_12 opposite to the part of the output surface 15*c*_3. The fourth part 15*c*_9 includes part of the output surface 15*c*_3 and a surface 15*c*_13 opposite to the part of the output surface 15*c*_3.

Figure 3:
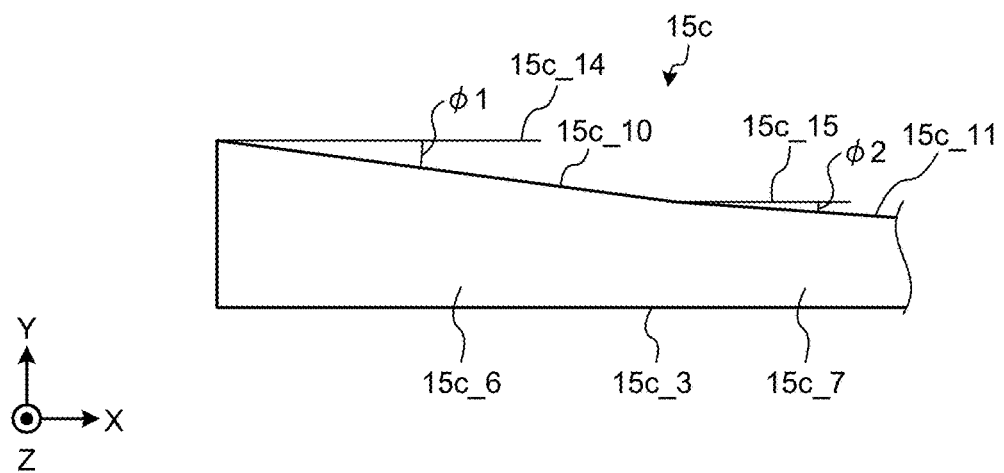
FIG. 3 is a partially enlarged view of a first part and a second part.

FIG. 3 is a partially enlarged view of the first part 15*c*_6 and the second part 15*c*_7. As illustrated in FIG. 3, an angle $\phi 1$ is formed between a virtual plane (plane parallel to the X-Z plane) 15*c*_14 parallel to the surface 15*d*_2 (refer to FIG. 1) of the prism sheet 15*d* and the surface 15*c*_10 in a sectional view along the X-Y plane. An angle $\phi 2$ is formed between a virtual plane (plane parallel to the X-Z plane) 15*c*_15 parallel to the surface 15*d*_2 and the surface 15*c*_11. The angle $\phi 1$ is larger than the angle $\phi 2$. Similarly, in a sectional view along the X-Y plane, an angle formed between the virtual plane parallel to the surface 15*d*_2 and the surface 15*c*_12 (refer to FIG. 2) is larger than an angle formed between the virtual plane parallel to the surface 15*d*_2 and the surface 15*c*_13 (refer to FIG. 2).

Figure 4:
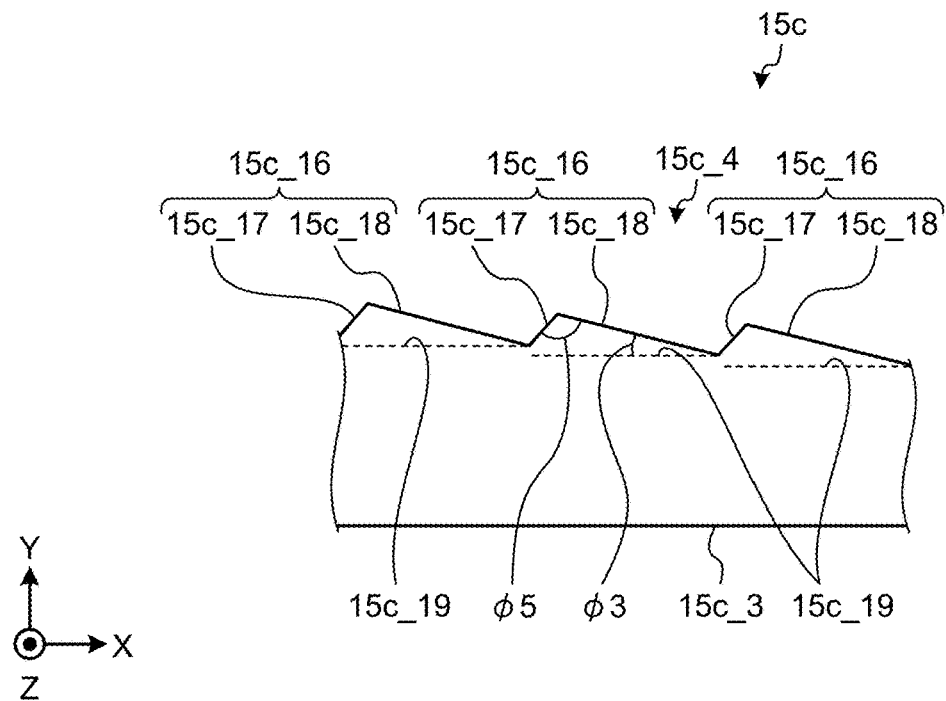
FIG. 4 is a view for explaining prisms formed on a surface opposite to an output surface of the light bar according to the first embodiment.
Figure 5:
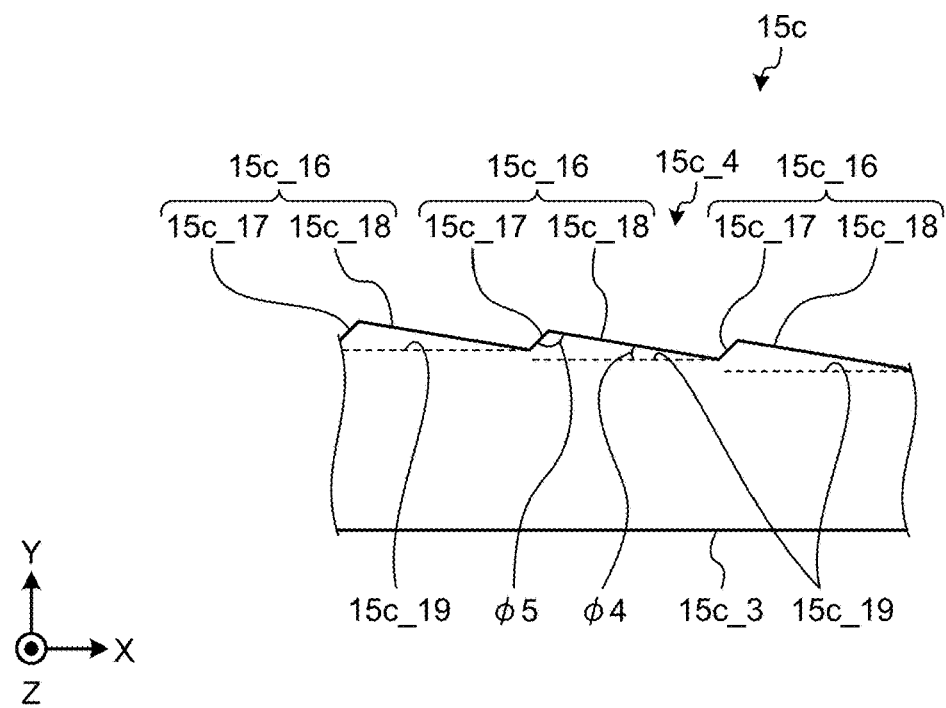
FIG. 5 is a view for explaining the prisms formed on the surface opposite to the output surface of the light bar according to the first embodiment.

The following describes prisms 15*c*_16 formed on the surface 15*c*_4 opposite to the output surface 15*c*_3 of the light bar 15*c* according to the first embodiment with reference to FIGS. 4 and 5. FIGS. 4 and 5 are views for explaining the prisms 15*c*_16 formed on the surface 15*c*_4 opposite to the output surface 15*c*_3 of the light bar 15*c* according to the first embodiment. A plurality of prisms 15*c*_16 are formed on the surface 15*c*_4 opposite to the output surface 15*c*_3 of the light bar 15*c* in the longitudinal direction (X-axis direction) of the light bar 15*c*.

FIG. 4 is a view for explaining the prisms 15*c*_16 formed in a part 21 near the middle in the longitudinal direction (X-axis direction) of the surface 15*c*_4 of the light bar 15*c* illustrated in FIG. 2. The prisms 15*c*_16 are formed in the incident surface 15*c*_1 side of the center 15*c*_5. FIG. 5 is a view for explaining the prisms 15*c*_16 formed in a part 22 close to the incident surface 15*c*_1 in the longitudinal direction of the surface 15*c*_4 of the light bar 15*c* illustrated in FIG. 2.

As illustrated in FIG. 4, a plurality of prisms 15*c*_16 are formed side by side in the longitudinal direction (X-axis direction) of the light bar 15*c* on the surface 15*c*_4 in the part 21 near the middle of the light bar 15*c*. The prisms 15*c*_16 each have a fourth region 15*c* 17 and a fifth region 15*c*_18. The fourth region 15*c*_17 is gradually away from the output surface 15*c*_3 in a direction from the incident surface 15*c*_1 (refer to FIG. 2) toward the center 15*c*_5 (refer to FIG. 2). The fifth region 15*c*_18 is gradually closer to the output surface 15*c*_3 in a direction from the incident surface 15*c*_1 (refer to FIG. 2) toward the center 15*c*_5 (refer to FIG. 2). The fifth region 15*c*_18 of a certain prism 15*c*_16 is connected to the fourth region 15*c*_17 of the certain prism 15*c*_16.

Similarly, as illustrated in FIG. 5, a plurality of prisms 15c_16 are formed side by side in the longitudinal direction (X-axis direction) of the light bar 15c on the surface 15c_4 in the part 22 close to the incident surface 15c_1 of the light bar 15c.

The shape of the prisms 15c_16 in a sectional view along the X-Y plane is line-symmetric with respect to a line segment passing through the center 15c_5 and parallel to the Y-axis direction.

An angle ϕ3 (refer to FIG. 4) is formed between the fifth region 15c_18 of the prism 15c_16 at the center 15c_5 of the light bar 15c and a virtual plane 15c_19 parallel to the surface 15d_2 of the prism sheet 15d in a sectional view along the X-Y plane. An angle ϕ4 (refer to FIG. 5) is formed between the fifth region 15c_18 of the prism 15c_16 at the ends of the light bar 15c (both ends in the longitudinal direction of the light bar 15c) and the plane 15c_19. The angle ϕ3 is larger than the angle ϕ4. The angle formed between the fifth region 15c_18 of the prism 15c_16 and the plane 15c_19 continuously varies in a manner gradually decreasing from the center 15c_5 toward the ends of the light bar 15c.

The angle formed between the fourth region 15c_17 and the fifth region 15c_18 in a sectional view along the X-Y plane is an angle ϕ5, which is common to the prisms 15c_16 at the center 15c_5 of the light bar 15c and the prisms 15c_16 at the ends of the light bar 15c.

With the prisms 15c_16 formed on the surface 15c_4 of the light bar 15c, the planar lighting device 1 can easily control distribution of light (light distribution) and luminance distribution in the X-axis direction on the output surface 15c_3 of the light bar 15c. As a result, the planar lighting device 1 can accurately control light distribution and luminance distribution in the X-axis direction on the output surface 13c of the light guide plate 13.

Figure 6:
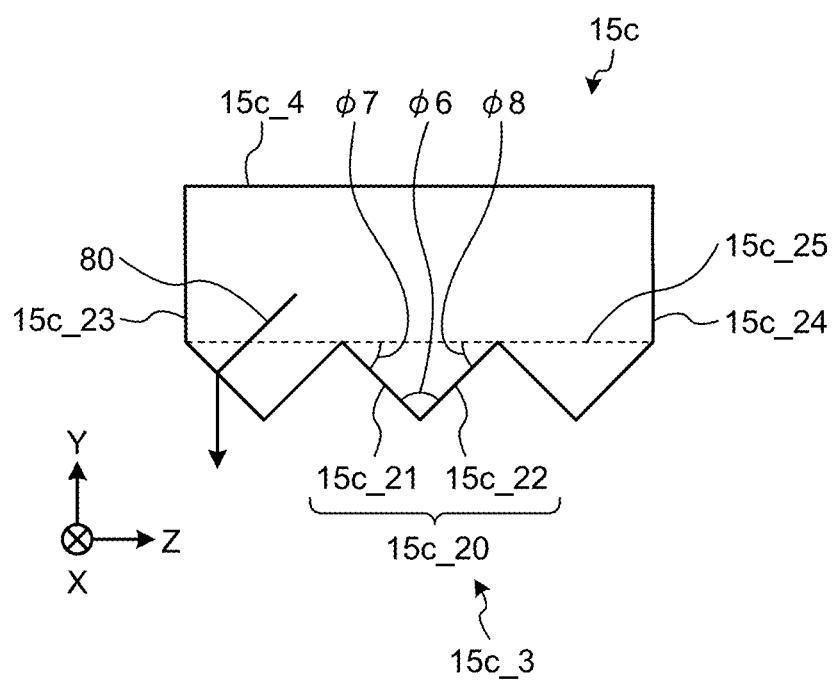
FIG. 6 is a view for explaining prisms formed on the output surface of the light bar according to the first embodiment.

The following describes prisms 15c_20 formed on the output surface 15c_3 of the light bar 15c according to the first embodiment with reference to FIG. 6. FIG. 6 is a view for explaining the prisms 15c_20 formed on the output surface 15c_3 of the light bar 15c according to the first embodiment. FIG. 6 illustrates a side surface of the light bar 15c.

As illustrated in FIG. 6, a plurality of prisms 15c_20 are formed side by side in the width direction (Z-axis direction) of the light bar 15c on the output surface 15c_3 of the light bar 15c. The prisms 15c_20 each have a sixth region 15c_21 and a seventh region 15c_22. The sixth region 15c_21 is gradually closer to the surface 15d_2 (refer to FIG. 1) of the prism sheet 15d in a direction from a first end 15c_23 (end in the minus direction of the Z-axis) toward a second end 15c_24 (end in the plus direction of the Z-axis) in the lateral direction of the light bar 15c. The seventh region 15c_22 is gradually away from the surface 15d_2 of the prism sheet 15d in a direction from the first end 15c_23 toward the second end 15c_24 in the lateral direction of the light bar 15c.

In a sectional view along the Y-Z plane, an angle ϕ6 formed between the sixth region 15c_21 and the seventh region 15c_22 (apex angle of the prism 15c_20) is 90 degrees, for example. An angle ϕ7 formed between the sixth region 15c_21 and a virtual plane 15c_25 parallel to the surface 15d_2 of the prism sheet 15d and an angle ϕ8 formed between the seventh region 15c_22 and the plane 15c_25 are 45 degrees, for example.

As illustrated in FIG. 6, for example, a path of light 80 entering into the light bar 15c is shifted to a direction parallel to the Y-axis direction by the prism 15c_20. The light 80 the path of which has been shifted enters into the surface 15d_1 (refer to FIG. 1) of the prism sheet 15d. As described above, the prisms 15c_20 control distribution of light in the Z-axis direction. Furthermore, the prisms 15c_16 are formed on the surface 15c_4 opposite to the output surface 15c_3 of the light bar 15c. By changing the apex angle of the prisms 15c_20 formed on the output surface 15c_3, for example, the planar lighting device 1 can easily control distribution of light (light distribution) and luminance distribution in the Z-axis direction on the output surface 15c_3 of the light bar 15c. As a result, the planar lighting device 1 can easily control distribution of light (light distribution) and luminance distribution in the Y-axis direction on the output surface 13c of the light guide plate 13.

When the angle ϕ6 of the apex angle of the prisms 15c_20 is 90 degrees, the width of distribution of light in the Z-axis direction on the output surface 13c of the light guide plate 13 is made narrowest. When the angle ϕ6 is larger than 90 degrees, the width of distribution of light in the Z-axis direction on the output surface 13c of the light guide plate 13 is made wider.

Figure 7A:
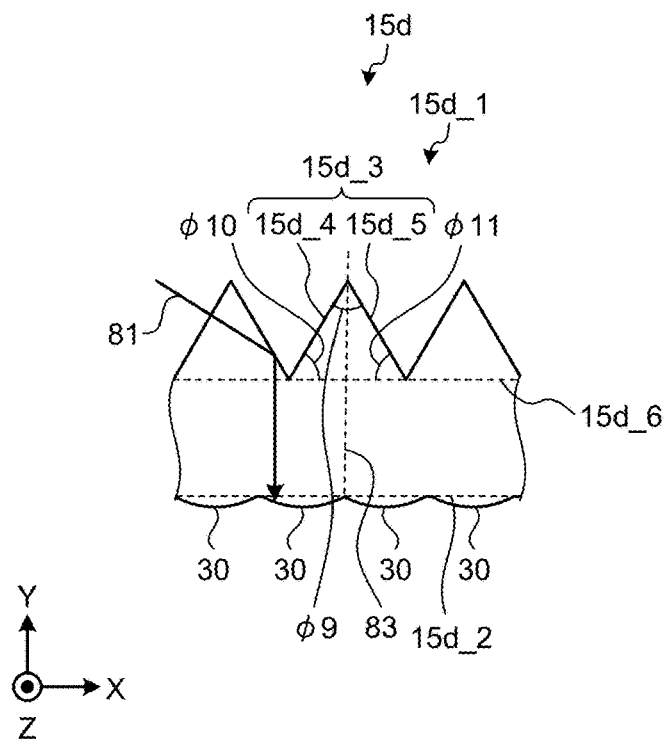
FIG. 7A is a view for explaining a prism sheet according to the first embodiment.
Figure 7B:
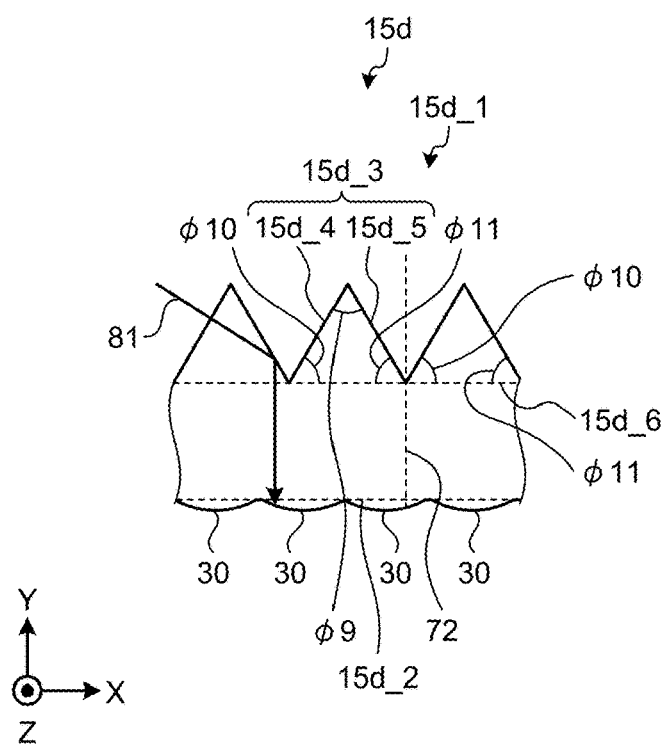
FIG. 7B is a view for explaining the prism sheet according to the first embodiment.
Figure 8:
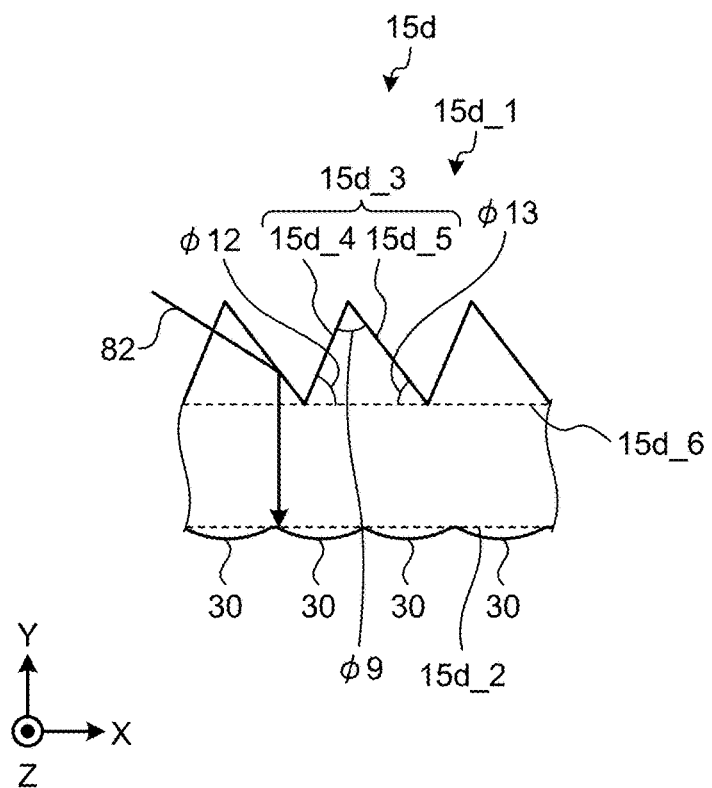
FIG. 8 is a view for explaining the prism sheet according to the first embodiment.

The following describes the prism sheet 15d according to the first embodiment with reference to FIGS. 7A, 7B, and 8. FIGS. 7A, 7B, and 8 are views for explaining the prism sheet 15d according to the first embodiment.

FIGS. 7A and 7B are views for explaining prisms 15d_3 formed near the middle in the longitudinal direction (X-axis direction) of the prism sheet 15d illustrated in FIG. 1. FIG. 8 is a view for explaining the prisms 15d_3 formed close to a first end (end in the minus direction of the X-axis) in the longitudinal direction of the prism sheet 15d illustrated in FIG. 1. A plurality of prisms 15d_3 are formed side by side in the longitudinal direction (X-axis direction) of the prism sheet 15d on the surface 15d_1 of the prism sheet 15d.

As illustrated in FIG. 7A, a plurality of prisms 15d_3 are formed side by side in the longitudinal direction (X-axis direction) of the prism sheet 15d on the surface 15d_1 near the middle in the longitudinal direction of the prism sheet 15d. The prisms 15d_3 each have an eighth region 15d_4 and a ninth region 15d_5. The eighth region 15d_4 is gradually away from the surface 15d_2 in a direction from the first end (end in the minus direction of the X-axis) toward the center in the longitudinal direction of the prism sheet 15d. The ninth region 15d_5 is gradually closer to the surface 15d_2 in a direction from the first end (end in the minus direction of the X-axis) toward the center in the longitudinal direction of the prism sheet 15d. One end of the ninth region 15d_5 of a certain prism 15d_3 is connected to one end of the eighth region 15d_4 of the certain prism 15d_3. The other end of the ninth region 15d_5 of the certain prism 15d_3 is connected to the eighth region 15d_4 of another prism 15d_3 adjacent to the certain prism 15d_3. The other end of the eighth region 15d_4 of the certain prism 15d_3 is connected to the ninth region 15d_5 of another prism 15d_3 adjacent to the certain prism 15d_3.

As illustrated in FIG. 7A, a path of light 81 entering into the surface 15d_1 of the prism sheet 15d is shifted to a direction parallel to the Y-axis direction by the prism 15d_3. The light 81 the path of which has been shifted enters into the diffusion sheet 15e. More specifically, for example, the light 81 entering into the eighth region 15d_4 of the prism 15d_3 is reflected toward the surface 15d_2 by the ninth region 15d_5. As described above, the prisms 15d_3 control distribution of light in the X-axis direction.

Similarly, as illustrated in FIG. 8, a plurality of prisms 15d_3 are formed side by side in the longitudinal direction (X-axis direction) of the prism sheet 15d at the first end (end in the minus direction of the X-axis) in the longitudinal direction of the surface 15d_1 of the prism sheet 15d.

The shape of the prisms 15d_3 in a sectional view along the X-Y plane is line-symmetric with respect to a line segment passing through the center in the longitudinal direction of the prism sheet 15d and parallel to the Y-axis direction.

An angle φ10 (refer to FIG. 7A) is formed between the eighth region 15d_4 of the prism 15d_3 at a middle part including the center in the longitudinal direction of the prism sheet 15d and a virtual plane 15d_6 parallel to the surface 15d_2 in a sectional view along the X-Y plane. An angle φ12 (refer to FIG. 8) is formed between the eighth region 15d_4 of the prism 15d_3 at an end in the longitudinal direction of the prism sheet 15d and the plane 15d_6. The angle φ10 is smaller than the angle φ12. In other words, the angle (inclination angle) φ10 of the eighth region 15d_4 of the prism 15d_3 formed at the middle part of the surface 15d_1 in the X-axis direction with respect to the surface 15d_2 is smaller than the angle (inclination angle) φ12 of the eighth region 15d_4 formed at an end of the surface 15d_1 in the X-axis direction with respect to the surface 15d_2.

An angle φ11 (refer to FIG. 7A) is formed between the ninth region 15d_5 of the prism 15d_3 at the middle part including the center in the longitudinal direction of the prism sheet 15d and the plane 15d_6 in a sectional view along the X-Y plane. An angle φ13 (refer to FIG. 8) is formed between the ninth region 15d_5 of the prism 15d_3 at an end in the longitudinal direction of the prism sheet 15d and the plane 15d_6. The angle φ11 is larger than the angle φ13. In other words, the angle (inclination angle) φ11 of the ninth region 15d_5 of the prism 15d_3 formed at the middle part of the surface 15d_1 in the X-axis direction with respect to the surface 15d_2 is larger than the angle (inclination angle) φ13 of the ninth region 15d_5 formed at an end of the surface 15d_1 in the X-axis direction with respect to the surface 15d_2.

The angle formed between the eighth region 15d_4 and the ninth region 15d_5 in a sectional view along the X-Y plane is an angle φ9, which is common to the prisms 15d_3 at the middle part including the center in the longitudinal direction of the prism sheet 15d and the prisms 15d_3 at the ends of the prism sheet 15d.

As illustrated in FIG. 7A, let us assume a case where a line segment 83 passing through the center in the longitudinal direction of the prism sheet 15d and parallel to the Y-axis direction in a sectional view along the X-Y plane passes through the angle formed between the eighth region 15d_4 of a certain prism 15d_3 and the ninth region 15d_5 of the certain second prism 15d_3. In this case, the angle φ10 formed between the eighth region 15d_4 of the prism 15d_3 at the middle part including the center in the longitudinal direction of the prism sheet 15d and the plane 15d_6 is equal to the angle φ11 formed between the ninth region 15d_5 and the plane 15d_6. In other words, the shape of the prism 15d_3 at the middle part is an isosceles triangle in a sectional view along the X-Y plane.

As illustrated in FIG. 7B, let us assume a case where a line segment 72 passing through the center in the longitudinal direction of the prism sheet 15d and parallel to the Y-axis direction in a sectional view along the X-Y plane passes through the boundary between the ninth region 15d_5 of a certain prism 15d_3 and the eighth region 15d_4 of another prism 15d_3 adjacent to the certain prism 15d_3. In this case, the angle φ10 formed between the eighth region 15d_4 of the certain prism 15d_3 at the middle part including the center in the longitudinal direction of the prism sheet 15d and the plane 15d_6, the angle φ11 formed between the ninth region 15d_5 of the certain prism 15d_3 and the plane 15d_6, the angle φ10 formed between the eighth region 15d_4 of the adjacent prism 15d_3 and the plane 15d_6, the angle φ11 formed between the ninth region 15d_5 of the adjacent prism 15d_3 and the plane 15d_6 are equal to one another. In other words, in a sectional view along the X-Y plane, the shape of the certain prism 15d_3 and the adjacent prism 15d_3 at the middle part including the center in the longitudinal direction of the prism sheet 15d is an isosceles triangle.

As described above, the shape of the prisms 15d_3 in a sectional view along the X-Y plane is line-symmetric with respect to a line segment passing through the center in the longitudinal direction of the prism sheet 15d and parallel to the Y-axis direction. As illustrated in FIG. 8, a path of light 82 emitted by the LED 15b and entering into the surface 15d_1 is shifted to a direction parallel to the Y-axis direction by the prism 15d_3 formed in the LED 15a side of the center in the longitudinal direction of the prism sheet 15d in the X-axis direction. The light 82 the path of which has been shifted enters into the diffusion sheet 15e (refer to FIG. 1). As described above, the prisms 15d_3 formed in the LED 15a side of the center in the longitudinal direction of the prism sheet 15d can control distribution of the light emitted by the LED 15b. Similarly, the prisms 15d_3 formed in the LED 15b side of the center in the longitudinal direction of the prism sheet 15d can control distribution of the light emitted by the LED 15a. As a result, if one of the LEDs 15a and 15b disposed on both sides of the light bar 15c is disconnected (turned off), and only the other thereof is turned on, the planar lighting device 1 can maintain the light distribution substantially equivalent to the light distribution obtained when both of the LEDs 15a and 15b are turned on.

While the surface 15d_2 of the prism sheet 15d is a flat surface, it may be provided with a lenticular lens including a plurality of convex lenses 30 disposed side by side in the X-axis direction as illustrated in FIGS. 7A, 7B, and 8. By increasing the contact angle between the convex lenses 30 and the surface 15d_2, the width of distribution of light in the X-axis direction can be increased. As described above, by adjusting the contact angle between the convex lenses 30 and the surface 15d_2, distribution of light (light distribution) in the X-axis direction can be easily controlled. As a result, the planar lighting device 1 can easily control distribution of light (light distribution) in the X-axis direction on the output surface 13c of the light guide plate 13.

By making the pitch intervals between adjacent convex lenses 30 smaller than the pitch intervals between adjacent second prisms 15d_3, the uniformity of the luminance in the X-axis direction can be easily improved. As a result, the planar lighting device 1 can easily control luminance distribution in the X-axis direction on the output surface 13c of the light guide plate 13.

Figure 9:
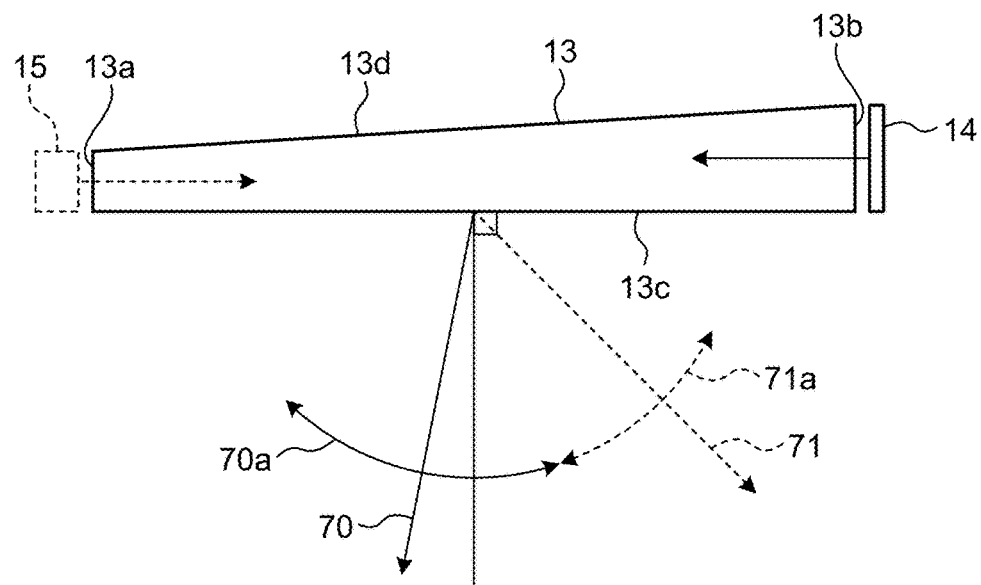
FIG. 9 is a view for explaining a light guide plate according to the first embodiment.
Figure 10:
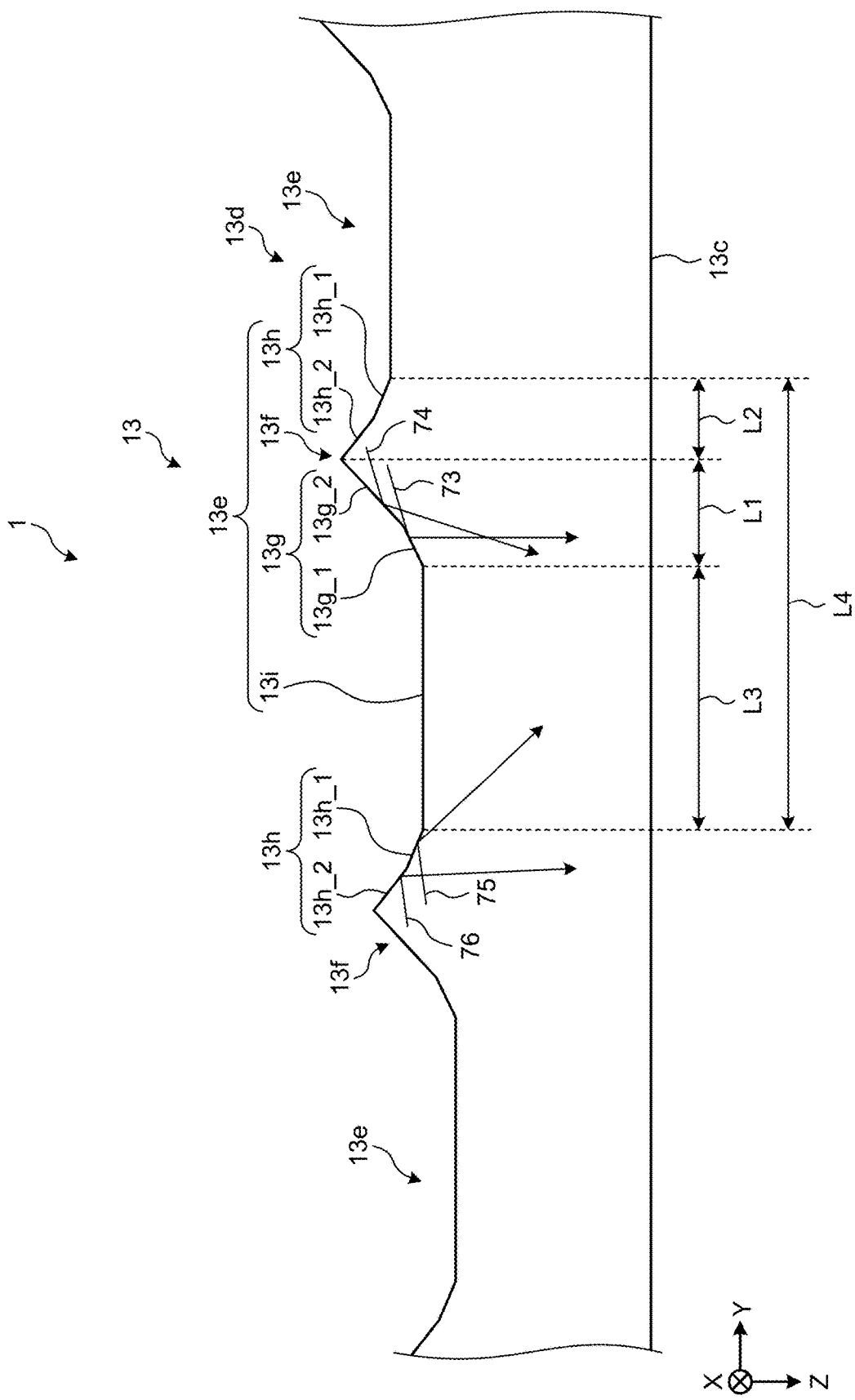
FIG. 10 is a view for explaining the light guide plate according to the first embodiment.

The following describes the light guide plate 13 according to the first embodiment with reference to FIGS. 9 and 10. FIGS. 9 and 10 are views for explaining the light guide plate 13 according to the first embodiment.

As illustrated in FIG. 9, light output from the linear light source 15 and entering into the incident surface 13a of the light guide plate 13 is output from the output surface 13c in a first direction 70 as light for illumination or output from the output surface 13c in a second direction 71 as light for design. The first direction 70 is not a single direction but a direction within a certain range 70a. Similarly, the second direction 71 is not a single direction but a direction within a certain range 71a. The light for illumination is an example of first light, and the light for design is an example of second light.

As illustrated in FIG. 10, the light guide plate 13 has a principal surface 13d (opposite surface) opposite to the output surface 13c of the light guide plate 13. A plurality of prisms 13e are formed side by side in the lateral direction (Y-axis direction) of the light guide plate 13 on the principal surface 13d of the light guide plate 13. The prisms 13e according to the present embodiment are formed to be away from the output surface 13c stepwise from the incident surface 13a (refer to FIG. 1) to the end surface 13b (refer to FIG. 1) (from the minus direction of the Y-axis to the plus direction of the Y-axis).

The prisms 13e each have a protrusion 13f including a first region 13g and a second region 13h, and a third region 13i. The protrusion 13f protrudes toward the opposite side of the output surface 13c. The prism 13e is an example of a first prism, and the protrusion 13f is an example of a first protrusion.

The first region 13g causes light reflected by the reflection film 14 (refer to FIG. 1) and traveling from the end surface 13b toward the incident surface 13a to be output from the output surface 13c in the first direction 70 (refer to FIG. 9) as light for illumination.

The first region 13g, for example, is gradually away from the output surface 13c in a direction from the incident surface 13a toward the end surface 13b of the light guide plate 13 (plus direction of the Y-axis).

The first region 13g includes a region 13g_1 and a region 13g_2 (a plurality of regions). The regions 13g_1 and 13g_2 are flat surfaces. The inclination angle of the region 13g_2 with respect to the output surface 13c is larger than that of the region 13g_1 with respect to the output surface 13c. One end of the region 13g_1 of a certain prism 13e is connected to one end of the third region 13i of the certain prism 13e. The other end of the region 13g_1 of the certain prism 13e is connected to one end of the region 13g_2 of the certain prism 13e. The other end of the region 13g_2 of the certain prism 13e is connected to a region 13h_2, which will be described later, of the certain prism 13e.

The region 13g_1, for example, reflects light 73 reflected by the reflection film 14 and traveling from the end surface 13b toward the incident surface 13a and causes the light to be output from the output surface 13c in the first direction 70 as light for illumination. The region 13g_2 reflects light 74 reflected by the reflection film 14 and traveling from the end surface 13b toward the incident surface 13a and causes the light to be output from the output surface 13c in the first direction 70 as light for illumination. Consequently, by adjusting the inclination angles of the regions 13g_1 and 13g_2 with respect to the output surface 13c, for example, the planar lighting device 1 can control distribution of light for illumination. As described with reference to FIG. 9, the first direction 70 is not a single direction but a direction within the certain range 70a. The light output from the output surface 13c in the first direction 70 by the region 13g_1 and the light output from the output surface 13c in the first direction 70 by the region 13g_2 may be light traveling in the same direction or different directions within the certain range 70a.

The prisms 13e according to the present embodiment are formed to be away from the output surface 13c stepwise from the incident surface 13a (refer to FIG. 1) to the end surface 13b (refer to FIG. 1) such that a large amount of light is reflected and subjected to distribution control by the first regions 13g. Consequently, the planar lighting device 1 can control distribution of light for illumination efficiently.

The second region 13h causes at least part of light entering into the incident surface 13a and traveling from the incident surface 13a toward the end surface 13b to be output from the output surface 13c in the second direction 71 (refer to FIG. 9) as light for design.

The second region 13h, for example, is gradually closer to the output surface 13c in a direction from the incident surface 13a toward the end surface 13b of the light guide plate 13 (plus direction of the Y-axis). The second region 13h reflects light entering into the incident surface 13a and traveling from the incident surface 13a toward the end surface 13b and causes the light to be output from the output surface 13c in the second direction 71.

The second region 13h includes a region 13h_1 and a region 13h_2 (a plurality of regions). The regions 13h_1 and 13h_2 are flat surfaces. The inclination angle of the region 13h_2 with respect to the output surface 13c is larger than that of the region 13h_1 with respect to the output surface 13c. One end of the region 13h_1 of a certain prism 13e is connected to the third region 13i of another prism 13e adjacent to the certain prism 13e. The other end of the region 13h_1 of the certain prism 13e is connected to one end of the region 13h_2 of the certain prism 13e. The other end of the region 13h_2 of the certain prism 13e is connected to the region 13g_2 of the certain prism 13e.

The region 13h_1, for example, reflects light 75 traveling from the incident surface 13a toward the end surface 13b and causes the light to be output from the output surface 13c in the second direction 71 as light for design. Consequently, by adjusting the inclination angle of the region 13h_1 with respect to the output surface 13c, for example, the planar lighting device 1 can control distribution of light for design. The region 13h_2 reflects light 76 traveling from the incident surface 13a toward the end surface 13b and causes the light to be output from the output surface 13c in the first direction 70 not as light for design but as light for illumination.

Figure 11:
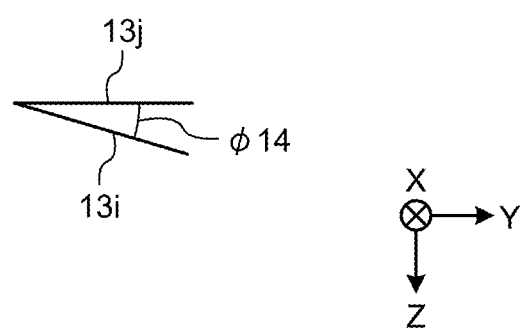
FIG. 11 is a view for explaining an example of an inclination angle of a third region with respect to the output surface according to embodiments.

The third region 13i is parallel or substantially parallel to the output surface 13c. FIG. 11 is a view for explaining an example of the inclination angle of the third region 13i with respect to the output surface 13c according the embodiment. As illustrated in FIG. 11, for example, the third region 13i is a region having an angle φ14 with respect to a virtual region 13j parallel to the output surface 13c of 0 degree to 4 degrees. The angle φ14 is preferably 0 degree to 1 degree, and more preferably 0 degree to 0.5 degree.

As described above, the third region 13i is parallel or substantially parallel to the output surface 13c. When an object behind the principal surface 13d opposite to the output surface 13c of the light guide plate 13 is visually recognized from the output surface 13c side, the visually recognized object has high physical continuity. In other words, distortion in the visually recognized object is suppressed. Consequently, the light guide plate 13 has the desired translucency described above.

P1 is the ratio of a length L3 of the third region 13i in the Y-axis direction (size in the Y-axis direction of the third region 13i) to a length L4 of the prism 13e in the Y-axis direction (size in the Y-axis direction of the prism 13e). The ratio P1 is equal to or larger than 0.6 (60%) and smaller than 1.0 (100%). The ratio P1 is expressed by Expression (1):

$$P1 = L3/L4 \qquad \text{Expression (1)}$$

The length L4 is the sum of a length L1 of the first region 13g in the Y-axis direction (size in the Y-axis direction of the first region 13g), a length L2 of the second region 13h in the Y-axis direction (size in the Y-axis direction of the second region 13h), and the length L3. The length L4 is expressed by Expression (2):

$$L4=L1+L2+L3 \qquad \text{Expression (2)}$$

Figure 12:
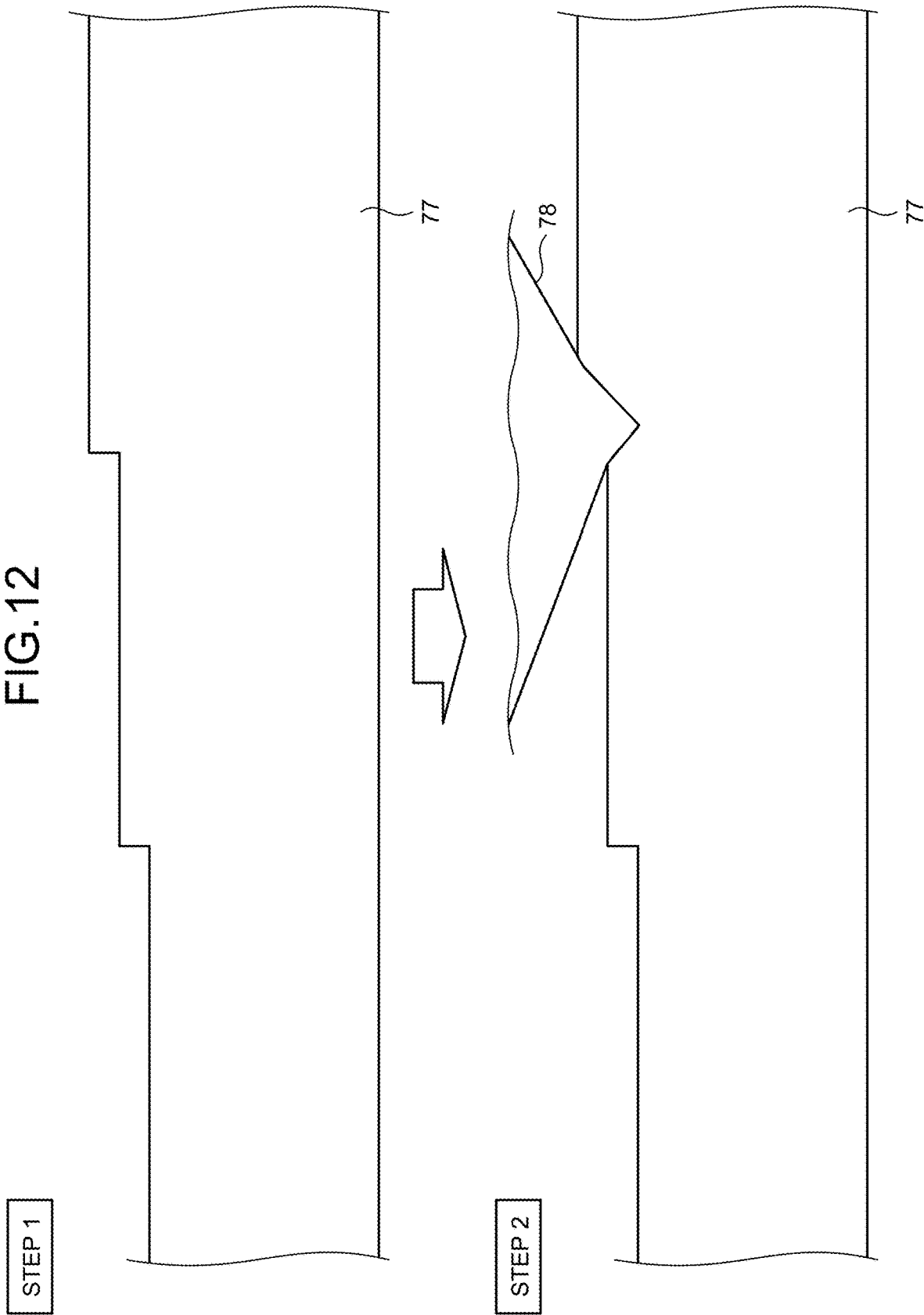
FIG. 12 is a view for explaining an example of a method for producing a mold used to manufacture the light guide plate with the prisms formed thereon according to the first embodiment.

The following describes an example of a method for producing a mold 77 used to manufacture the light guide plate 13 with the prisms 13e formed thereon according to the first embodiment with reference to FIG. 12. FIG. 12 is a view for explaining an example of the method for producing the mold 77 used to manufacture the light guide plate 13 with the prisms 13e formed thereon according to the first embodiment.

As illustrated in FIG. 12, the mold 77 is cut so as to have a stepped shape at Step 1. The mold 77 is cut such that the height of the steps of the mold 77 is substantially equal to the distance in the Z-axis direction between two third regions 13i of two adjacent prisms 13e illustrated in FIG. 10.

At Step 2, the stepped parts of the mold 77 are sequentially cut using a cutting tool 78 having the same shape as that of the protrusion 13f (refer to FIG. 10) of the prism 13e. By using the mold 77 produced as described above, the light guide plate 13 with the prisms 13e formed thereon can be manufactured (e.g., injection molding).

The planar lighting device 1 according to the first embodiment has been described. The planar lighting device 1 includes the light guide plate 13 and the reflection film 14. The light guide plate 13 has the incident surface 13a and the output surface 13c. The incident surface 13a receives light output from the linear light source 15. The output surface 13c outputs light received by the incident surface 13a. The reflection film 14 faces the end surface 13b opposite to the incident surface 13a of the light guide plate 13 and reflects light leaking from the end surface 13b. On the principal surface 13d opposite to the output surface 13c of the light guide plate 13, the prisms 13e are formed to be away from the output surface 13c stepwise from the incident surface 13a to the end surface 13b. The prisms 13e cause light reflected by the reflection film 14 and traveling from the end surface 13b toward the incident surface 13a to be output from the output surface 13c in the first direction 70 as light for illumination. In addition, the prisms 13e cause light entering into the incident surface 13a and traveling from the incident surface 13a toward the end surface 13b to be output from the output surface 13c in the second direction 71 different from the first direction 70 as light for design.

In the planar lighting device 1, the prisms 13e each have the protrusion 13f protruding toward the opposite side of the output surface 13c of the light guide plate 13. The protrusion 13f has the first region 13g. The first region 13g is gradually away from the output surface 13c in a direction from the incident surface 13a toward the end surface 13b and causes light traveling from the end surface 13b toward the incident surface 13a to be output from the output surface 13c in the first direction 70 as light for illumination. The first region 13g includes a plurality of regions (a plurality of flat surfaces) 13g_1 and 13g_2. The first region 13g may include one flat surface region or one curved surface region, three or more flat surface regions, or three or more curved surface regions. Furthermore, the first region 13g may include one or more flat surface regions and one or more curved surface regions.

In the planar lighting device 1, the protrusion 13f has the second region 13h. The second region 13h is gradually closer to the output surface 13c in a direction from the incident surface 13a toward the end surface 13b and causes at least light traveling from the incident surface 13a toward the end surface 13b to be output from the output surface 13c in the second direction 71 as light for design. The second region 13h includes a plurality of regions (a plurality of flat surfaces) 13h_1 and 13h_2. The second region 13h may include one flat surface region or one curved surface region, three or more flat surface regions, or three or more curved surface regions. Furthermore, the second region 13h may include one or more flat surface regions and one or more curved surface regions.

In the planar lighting device 1, one (region 13h_2) of the regions 13h_1 and 13h_2 included in the second region 13h causes light traveling from the incident surface 13a toward the end surface 13b to be output from the output surface 13c in the first direction 70 as light for illumination. If the second region 13h in the planar lighting device 1 includes two or more regions (a plurality of flat surfaces or a plurality of curved surfaces), at least one of the regions included in the second region 13h may cause light traveling from the incident surface 13a toward the end surface 13b to be output from the output surface 13c in the first direction 70 as light for illumination.

The planar lighting device 1 having the configuration described above can control distribution of two kinds of light, that is, distribution of light for illumination and light for design as described above.

Figure 13:
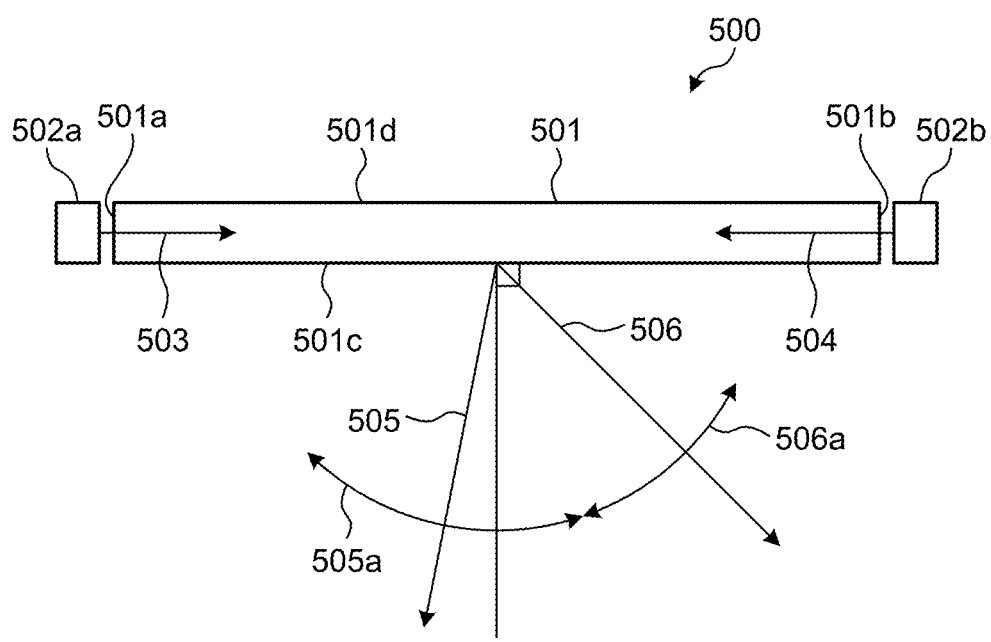
FIG. 13 is a side view of a planar lighting device according to a first reference example.

The following describes a planar lighting device 500 according to a first reference example with reference to FIG. 13. FIG. 13 is a side view of the planar lighting device 500 according to the first reference example. As illustrated in FIG. 13, the planar lighting device 500 according to the first reference example includes a light guide plate 501 and light sources 502a and 502b. The light sources 502a and 502b are LEDs that emit light.

The light guide plate 501 has incident surfaces 501a and 501b, an output surface 501c, and a principal surface 501d opposite to the output surface 501c.

The incident surface 501a receives light 503 emitted by the light source 502a. The incident surface 501b receives light 504 emitted by the light source 502b.

In the first reference example, a plurality of prisms are formed on the principal surface 501d opposite to the output surface 501c of the light guide plate 501. The prisms according to the first reference example, for example, cause the light 504 traveling from the incident surface 501b toward the incident surface 501a to be output from the output surface 501c in a third direction 505 as light for illumination. In addition, the prisms cause the light 503 traveling from the incident surface 501a toward the incident surface 501b to be output from the output surface 501c in a fourth direction 506 different from the third direction 505 as light for design. The third direction 505 is not a single direction but a direction within a certain range 505a. Similarly, the fourth direction 506 is not a single direction but a direction within a certain range 506a. In the first reference example, all the distances between the respective prisms and the output surface 501c are the same.

In the planar lighting device 500 according to the first reference example, the light guide length of the light guide plate 501 is relatively short because the light sources 502a and 502b are disposed at both ends of the light guide plate 501. Furthermore, the light 504 traveling from the incident surface 501b toward the incident surface 501a is less likely to be reflected by the prisms because the distances between the respective prisms and the output surface 501c are the same. Consequently, it is difficult for the planar lighting device 500 according to the first reference example to control distribution of light for illumination efficiently.

In the planar lighting device 1 according to the first embodiment as described above, on the other hand, the linear light source 15 is disposed at one end of the light guide plate 13, and the reflection film 14 having a relatively small thickness is disposed at the other end. As a result, the light guide length of the light guide plate 13 is longer than that of the light guide plate 501 according to the first reference example. Furthermore, the prisms 13e according to the first embodiment are formed to be away from the output surface 13c stepwise from the incident surface 13a to the end surface 13b such that a large amount of light is reflected and subjected to distribution control by the first regions 13g. Consequently, the planar lighting device 1 can control distribution of light for illumination efficiently compared with the planar lighting device 500 according to the first reference example.

Second Embodiment

Figure 14:
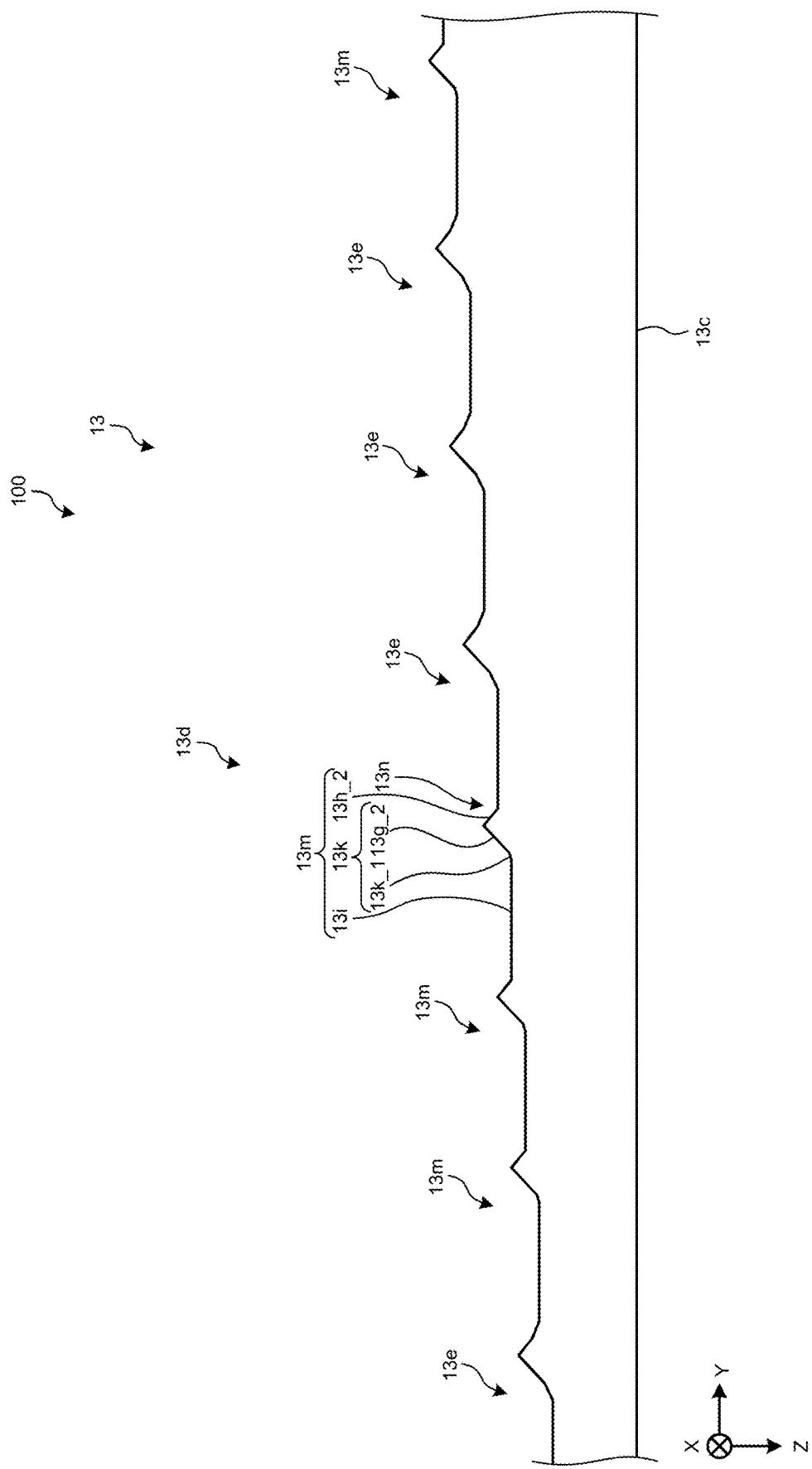
FIG. 14 is a view for explaining a light guide plate according to a second embodiment.

The following describes a planar lighting device 100 according to a second embodiment with reference to FIG. 14. In the description of the second embodiment, components similar to those of the planar lighting device 1 according to the first embodiment are denoted by like reference numerals, and explanation thereof is omitted. FIG. 14 is a view for explaining the light guide plate 13 according to the second embodiment.

As illustrated in FIG. 14, a plurality of prisms 13e and 13m are formed corresponding to bright parts 79a (refer to FIG. 15) and dark parts 79b (refer to FIG. 15) of a light emission pattern 79, which will be described later, in the lateral direction (Y-axis direction) of the light guide plate 13 on the principal surface 13d of the light guide plate 13. The prisms 13e and 13m according to the second embodiment are formed to be away from the output surface 13c stepwise from the incident surface 13a (refer to FIG. 1) to the end surface 13b (refer to FIG. 1).

The prisms 13m according to the second embodiment cause light entering into the incident surface 13a and traveling from the incident surface 13a toward the end surface 13b and light reflected by the reflection film 14 and traveling from the end surface 13b toward the incident surface 13a to be output from the output surface 13c in the first direction 70 (refer to FIG. 9) as light for illumination. The prisms 13m each have a protrusion 13n and the third region 13i. The protrusion 13n protrudes toward the opposite side of the output surface 13c. The protrusion 13n has a fourth region 13k and a region (fifth region) 13h_2. The prism 13m is an example of a second prism, and the protrusion 13n is an example of a second protrusion.

The fourth region 13k causes light reflected by the reflection film 14 (refer to FIG. 1) and traveling from the end surface 13b toward the incident surface 13a to be output from the output surface 13c in the first direction 70 (refer to FIG. 9) as light for illumination.

The fourth region 13k, for example, is gradually away from the output surface 13c in a direction from the incident surface 13a toward the end surface 13b of the light guide plate 13 (plus direction of the Y-axis).

The fourth region 13k includes a region 13k_1 and a region 13g_2 (a plurality of regions). The region 13k_1 is a flat surface. The inclination angle of the region 13k_1 with respect to the output surface 13c is the same as that of the region 13g_1 (refer to FIG. 10) with respect to the output surface 13c. However, the length of the region 13k_1 in the Y-axis direction is shorter than that of the region 13g_1 in the Y-axis direction. The length of the region 13k_1 in the X-axis direction is shorter than that of the region 13g_1 in the X-axis direction.

The fourth region 13k may include one flat surface region or one curved surface region, three or more flat surface regions, or three or more curved surface regions. Furthermore, the fourth region 13k may include one or more flat surface regions and one or more curved surface regions.

While the prism 13m includes one flat surface as the fifth region 13h_2 in this example, the fifth region 13h_2 may include one curved surface region, three or more flat surface regions, or three or more curved surface regions. Furthermore, the fifth region 13h_2 may include one or more flat surface regions and one or more curved surface regions.

One end of the region 13k_1 of a certain prism 13m is connected to one end of the third region 13i of the certain prism 13m. The other end of the third region 13i of the certain prism 13m is connected to the region 13h_2 of another prism 13m adjacent to the certain prism 13m or the region 13h_1 (refer to FIG. 10) of the prism 13e adjacent to the certain prism 13m. The other end of the region 13k_1 of the certain prism 13m is connected to one end of the region 13g_2 of the certain prism 13m. The other end of the region 13g_2 of the certain prism 13m is connected to one end of the region 13h_2 of the certain prism 13m. The other end of the region 13h_2 of the certain prism 13m is connected to the third region 13i of the prism (prism 13m or 13e) adjacent to the certain prism 13m.

The region 13k_1, for example, reflects light reflected by the reflection film 14 and traveling from the end surface 13b toward the incident surface 13a and causes the light to be output from the output surface 13c in the first direction 70 as light for illumination.

As described in the first embodiment with reference to FIG. 9, the prism 13e has the region 13h_1 that causes light for design to be output from the output surface 13c in the second direction 71 (refer to FIG. 9). As a result, the prism 13e is a part that looks relatively bright when viewed from the second direction 71 by a user. By contrast, the prism 13m has no region that causes light for design to be output from the output surface 13c in the second direction 71. As a result, the prism 13m is a part that looks relatively dark when viewed from the second direction 71 by the user. In other words, the prism 13m corresponds to the dark part 79b (refer to FIG. 15), which will be described later, and the prism 13e corresponds to the bright part 79a (refer to FIG. 15), which will be described later.

Figure 15:
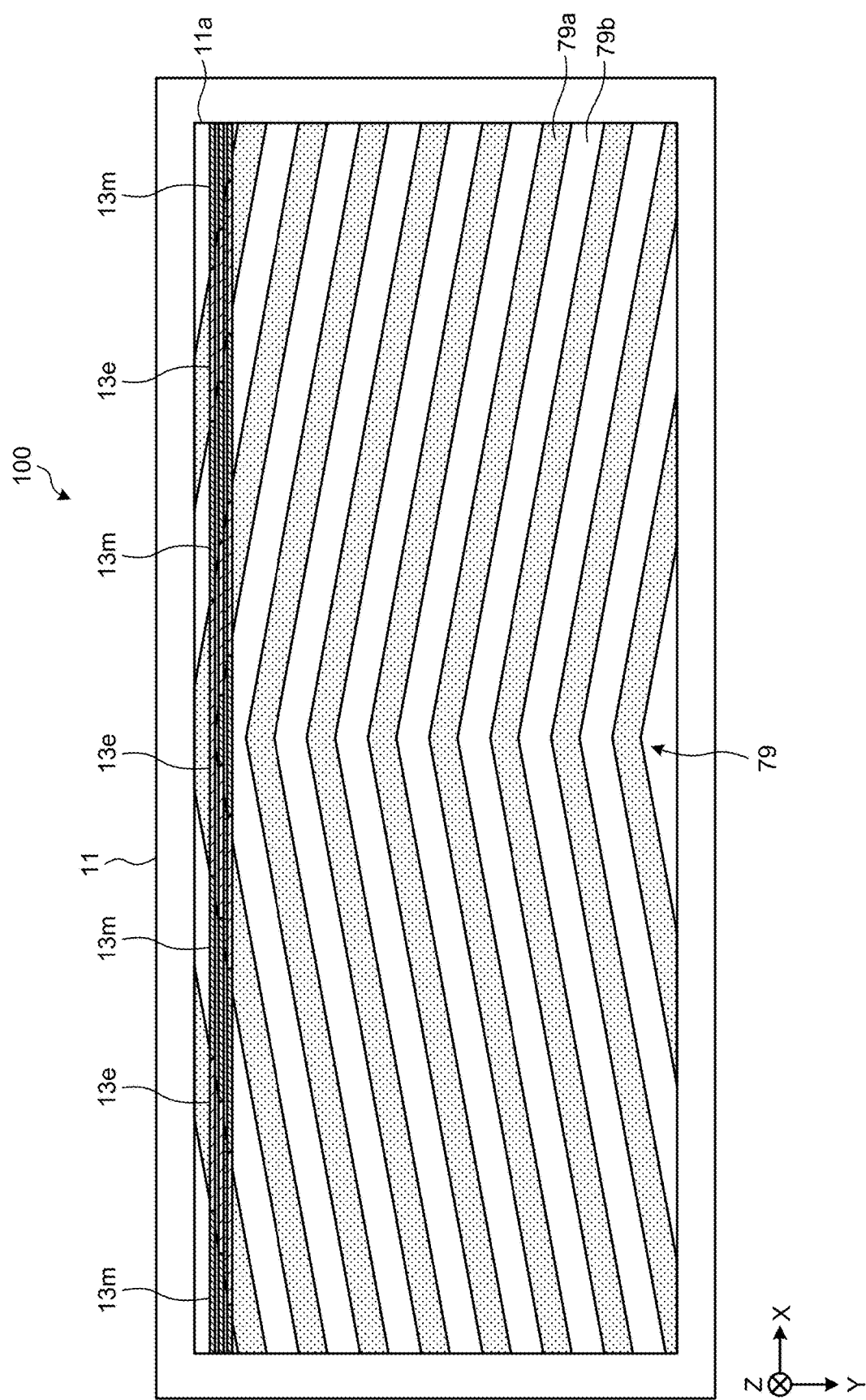
FIG. 15 is a view for explaining an example of a light emission pattern viewed when a user observes a planar lighting device from a second direction according to the second embodiment.

The following describes an example of a light emission state (light emission pattern) observed by the user when the user observes the planar lighting device 100 from the second direction 71 (refer to FIG. 9) according to the second embodiment with reference to FIG. 15. FIG. 15 is a view for explaining an example of the light emission pattern 79 obtained when the user observes the planar lighting device 100 from the second direction 71 according to the second embodiment.

As illustrated in FIG. 15, the light emission pattern 79 observed by the user includes the bright parts 79a having relatively high luminance and the dark parts 79b having relatively low luminance. The user recognizes the bright parts 79a by observing the prisms 13e that cause a relatively large amount of light to be output toward the user and recognizes the dark parts 79b by observing the prisms 13m described above that cause a relatively small amount of light to be output toward the user. In other words, the positions of the bright parts 79a in FIG. 15 are provided with the prisms 13e, and the positions of the dark parts 79b are provided with the prisms 13m. More specifically, as illustrated in FIG. 15, a plurality of prism rows are formed in the Y-axis direction, for example. In each of the prism rows, the prisms 13e corresponding to the bright parts 79a and the prisms 13m corresponding to the dark parts 79b are alternately aligned in the X-axis direction, for example. In the example illustrated in FIG. 15, the positions provided with the prisms 13e or the prisms 13m in the X-axis direction are shifted row by row in the prism rows corresponding to the positions of the bright parts 79a or the dark part 79b of the light emission pattern 79. The X-axis direction is a direction from the incident surface 13a toward the end surface 13b and is an example of a third direction. The Y-axis direction is orthogonal to the X-axis direction and is an example of a fourth direction. FIG. 15 does not illustrate all the prisms 13e and 13m and illustrate part of them.

By adjusting the length, the number, the position, and the like of the prisms 13e and the prisms 13m, the luminance of the bright parts 79a and the dark parts 79b of the light emission pattern 79 can be adjusted, and the light emission pattern can be changed. By adjusting the length (size in the Y-axis direction) of the region 13h_1 in the prisms 13e, the gradation of brightness of the bright parts 79a can be controlled. As a result, the expressivity of the design can be improved.

In the example illustrated in FIG. 14, the region 13h_2 serving as the fifth region causes light traveling from the incident surface 13a toward the end surface 13b to be output from the output surface 13c in the first direction 70 as light for illumination. Alternatively, the present embodiment may employ, as the fifth region, a region gradually closer to the output surface 13c in a direction from the incident surface 13a toward the end surface 13b and a region that causes light traveling from the incident surface 13a toward the end surface 13b to be output from the output surface 13c in the second direction 71 as light for design and that is smaller than the region 13h_1 that causes light for design to be output from the output surface 13c in the second direction 71 (refer to FIG. 9) in the second region 13h according to the first embodiment described with reference to FIG. 10. When the user observes the fifth region described above from the second direction 71, the luminance of the part of the output surface 13c corresponding to the fifth region is lower than that of the part of the output surface 13c corresponding to the second region 13h according to the first embodiment. As a result, the fifth region corresponds to the dark part 79b.

Figure 16:
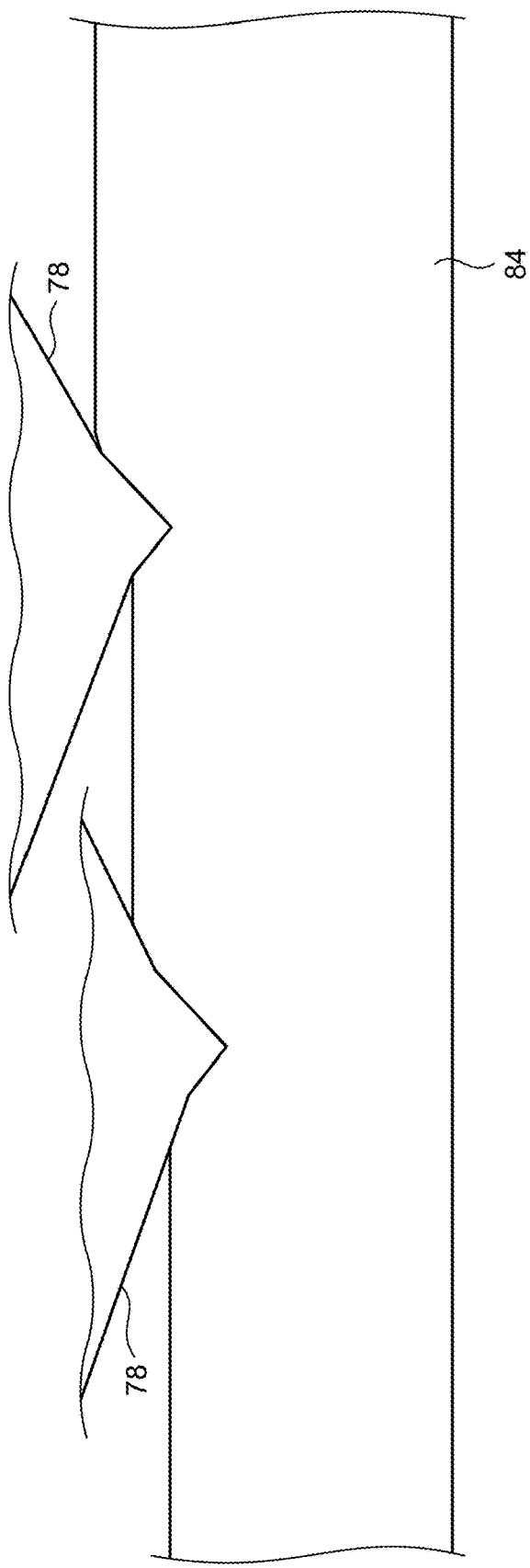
FIG. 16 is a view for explaining an example of a method for producing a mold used to manufacture the light guide plate with prisms formed thereon according to the second embodiment.

The following describes a method for producing a mold 84 used to manufacture the light guide plate 13 with the prisms 13e and 13m formed thereon according to the second embodiment with reference to FIG. 16. FIG. 16 is a view for explaining an example of the method for producing the mold 84 used to manufacture the light guide plate 13 with the prisms 13e and 13m formed thereon according to the second embodiment.

Similarly to Step 1 in the method for producing the mold 77 according to the first embodiment described with reference to FIG. 12, the mold 84 is cut so as to have a stepped shape. The mold 84 is cut such that the height of the steps of the mold 84 is substantially equal to the distance in the Z-axis direction between two third regions 13i of two adjacent prisms illustrated in FIG. 14. Examples of the two adjacent prisms include three pairs of prisms, that is, the prisms 13e and 13e, the prisms 13e and 13m, and the prisms 13m and 13m.

At Step 2, as illustrated in FIG. 16, the stepped parts of the mold 84 are cut using the cutting tool 78 having the same shape as that of the protrusion 13f (refer to FIG. 10). As illustrated in FIG. 16, the depth of cutting by the cutting tool 78 is reduced at the part (right part in FIG. 16) corresponding to the protrusion 13n (refer to FIG. 14) such that the shape corresponding to the protrusion 13n is formed in the mold 84. By using the mold 84 produced with one cutting tool 78 as described above, the light guide plate 13 with the prisms 13e and 13m formed thereon can be manufactured.

The planar lighting device 100 according to the second embodiment has been described. Similarly to the first embodiment, the planar lighting device 100 according to the second embodiment can control distribution of two kinds of light, that is, distribution of light for illumination and light for design.

Third Embodiment

Figure 17:
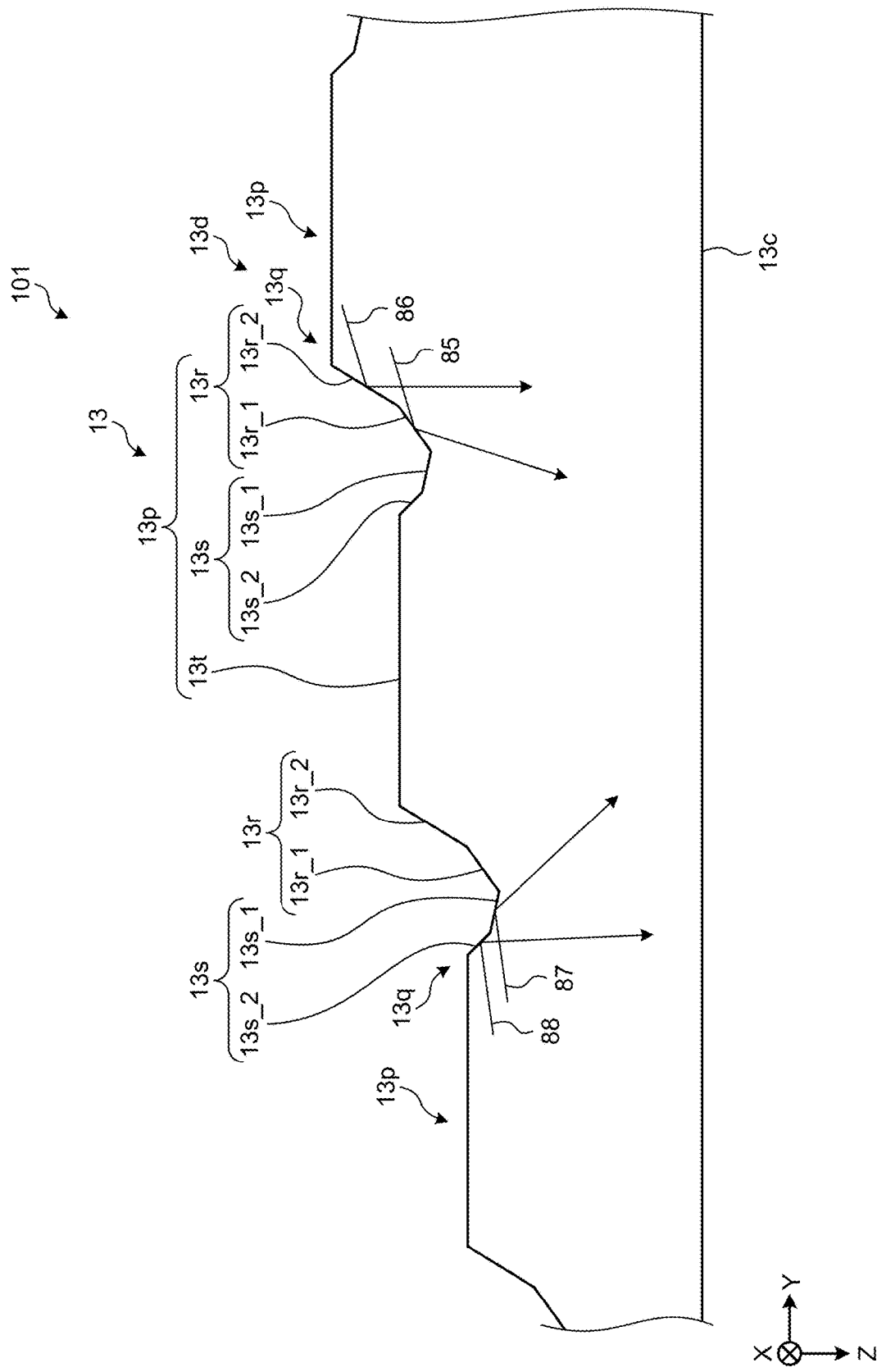
FIG. 17 is a view for explaining a light guide plate included in a planar lighting device according to a third embodiment.

The following describes a planar lighting device 101 according to a third embodiment with reference to FIG. 17. In the description of the third embodiment, components similar to those of the planar lighting device 1 according to the first embodiment and the planar lighting device 100 according to the second embodiment are denoted by like reference numerals, and explanation thereof is omitted. FIG. 17 is a view for explaining the light guide plate 13 included in the planar lighting device 101 according to the third embodiment.

As illustrated in FIG. 17, a plurality of prisms 13p are formed side by side in the lateral direction (Y-axis direction) of the light guide plate 13 on the principal surface 13d of the light guide plate 13 according to the third embodiment. The prisms 13p according to the present embodiment are formed to be away from the output surface 13c stepwise from the incident surface 13a (refer to FIG. 1) to the end surface 13b (refer to FIG. 1) (from the minus direction of the Y-axis to the plus direction of the Y-axis).

The prisms 13p each have a recess 13q including a first region 13r and a second region 13s, and a third region 13t. The recess 13q is recessed toward the output surface 13c. The prism 13p is an example of the first prism, and the recess 13q is an example of a first recess.

The first region 13r causes light reflected by the reflection film 14 (refer to FIG. 1) and traveling from the end surface 13b toward the incident surface 13a to be output from the output surface 13c in the first direction 70 (refer to FIG. 9) as light for illumination.

The first region 13r, for example, is gradually away from the output surface 13c in a direction from the incident surface 13a toward the end surface 13b of the light guide plate 13 (plus direction of the Y-axis).

The first region 13r includes a region 13r_1 and a region 13r_2 (a plurality of regions). The regions 13r_1 and 13r_2 are flat surfaces. The inclination angle of the region 13r_2 with respect to the output surface 13c is larger than that of the region 13r_1 with respect to the output surface 13c. One end of the region 13r_1 of a certain prism 13p is connected to a region 13s_1, which will be described later, of the second region 13s of the certain prism 13p. The other end of the region 13r_1 of the certain prism 13p is connected to one end of the region 13r_2 of the certain prism 13p. The other end of the region 13r_2 of the certain prism 13p is connected to the third region 13t of another prism 13p adjacent to the certain prism 13p.

The region 13r_1, for example, reflects light 85 reflected by the reflection film 14 and traveling from the end surface 13b toward the incident surface 13a and causes the light to be output from the output surface 13c in the first direction 70 as light for illumination. The region 13r_2 reflects light 86 reflected by the reflection film 14 and traveling from the end surface 13b toward the incident surface 13a and causes the light to be output from the output surface 13c in the first direction 70 as light for illumination. Consequently, by adjusting the inclination angles of the regions 13r_1 and 13r_2 with respect to the output surface 13c, for example, the planar lighting device 101 can control distribution of light for illumination.

The prisms 13p according to the present embodiment are formed to be away from the output surface 13c stepwise from the incident surface 13a to the end surface 13b such that a large amount of light is reflected and subjected to distribution control by the first regions 13r. Consequently, the planar lighting device 101 can control distribution of light for illumination efficiently.

The second region 13s causes at least part of light entering into the incident surface 13a and traveling from the incident surface 13a toward the end surface 13b to be output from the output surface 13c in the second direction 71 (refer to FIG. 9) as light for design.

The second region 13s, for example, is gradually closer to the output surface 13c in a direction from the incident surface 13a toward the end surface 13b of the light guide plate 13 (plus direction of the Y-axis).

The second region 13s includes a region 13s_1 and a region 13s_2 (a plurality of regions). The regions 13s_1 and 13s_2 are flat surfaces. The inclination angle of the region 13s_2 with respect to the output surface 13c is larger than that of the region 13s_1 with respect to the output surface 13c. One end of the region 13s_1 of a certain prism 13p is connected to one end of the region 13s_2 of the certain prism 13p. The other end of the region 13s_1 of the certain prism 13p is connected to one end of the region 13r_1 of the certain prism 13p. The other end of the region 13s_2 of the certain prism 13p is connected to one end of the third region 13t of the certain prism 13p. The other end of the third region 13t of the certain prism 13p is connected to the region 13r_2 of another prism 13p adjacent to the certain prism 13p.

The region 13s_1, for example, reflects light 87 traveling from the incident surface 13a toward the end surface 13b and causes the light to be output from the output surface 13c in the second direction 71 as light for design. Consequently, by adjusting the inclination angle of the region 13s_1 with respect to the output surface 13c, for example, the planar lighting device 101 can control distribution of light for design. The region 13s_2 reflects light 88 traveling from the incident surface 13a toward the end surface 13b and causes the light to be output from the output surface 13c in the first direction 70 not as light for design but as light for illumination.

Similarly to the third region 13i according to the first embodiment, the third region 13t is parallel or substantially parallel to the output surface 13c. When an object behind the principal surface 13d opposite to the output surface 13c of the light guide plate 13 is visually recognized from the output surface 13c side, the visually recognized object has high physical continuity because the third region 13t is parallel or substantially parallel to the output surface 13c. In other words, distortion in the visually recognized object is suppressed. Consequently, the light guide plate 13 according to the third embodiment has the desired translucency described above.

Figure 18:
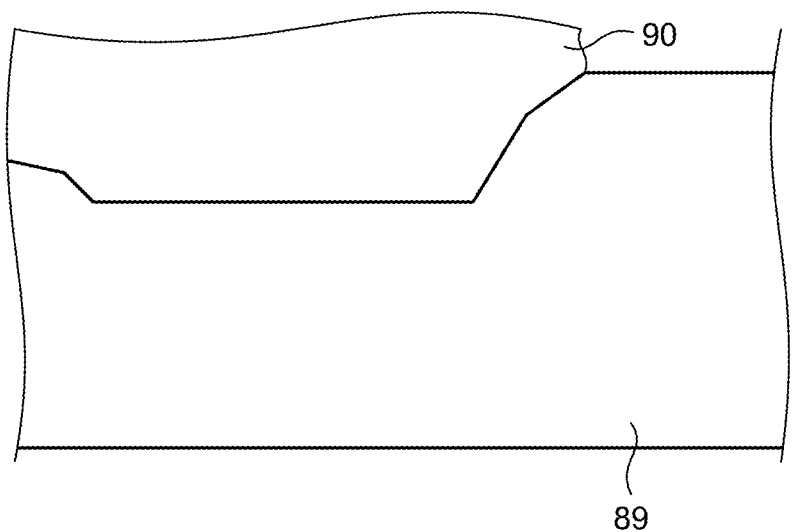
FIG. 18 is a view for explaining an example of a method for producing a mold used to manufacture the light guide plate with prisms formed thereon according to the third embodiment.

The following describes a method for producing a mold 89 used to manufacture the light guide plate 13 with the prisms 13p formed thereon according to the third embodiment with reference to FIG. 18. FIG. 18 is a view for explaining an example of the method for producing the mold 89 used to manufacture the light guide plate 13 with the prisms 13p formed thereon according to the third embodiment.

Similarly to Step 1 in the method for producing the mold 77 according to the first embodiment described with reference to FIG. 12, the mold 89 is cut so as to have a stepped shape. The mold 89 is cut such that the height of the steps of the mold 89 is substantially equal to the distance in the Z-axis direction between two third regions 13t of two adjacent prisms 13p illustrated in FIG. 17.

At Step 2, as illustrated in FIG. 18, the parts between the steps of the mold 89 are sequentially cut using a cutting tool 90 having the same shape as that of the prism 13p (refer to FIG. 17). By using the mold 89 produced as described above, the light guide plate 13 with the prisms 13p formed thereon can be manufactured.

The planar lighting device 101 according to the third embodiment has been described. On the principal surface 13d opposite to the output surface 13c of the light guide plate 13 in the planar lighting device 101, the prisms 13p are formed to be away from the output surface 13c stepwise from the incident surface 13a to the end surface 13b. The prisms 13p cause light reflected by the reflection film 14 and traveling from the end surface 13b toward the incident surface 13a to be output from the output surface 13c in the first direction 70 as light for illumination. In addition, the prisms 13p cause light entering into the incident surface 13a and traveling from the incident surface 13a toward the end surface 13b to be output from the output surface 13c in the second direction 71 as light for design.

In the planar lighting device 101, the prisms 13p each have the recess 13q recessed toward the output surface 13c of the light guide plate 13. The recess 13q has the first region 13r. The first region 13r is gradually away from the output surface 13c in a direction from the incident surface 13a toward the end surface 13b and causes light traveling from the end surface 13b toward the incident surface 13a to be output from the output surface 13c in the first direction 70 as light for illumination. The first region 13r includes a plurality of regions (a plurality of flat surfaces) 13r_1 and 13r_2.

In the planar lighting device 101, the recess 13q has the second region 13s. The second region 13s is gradually closer to the output surface 13c in a direction from the incident surface 13a toward the end surface 13b and causes at least light traveling from the end surface 13b toward the incident surface 13a to be output from the output surface 13c in the second direction 71 as light for design. The second region 13s includes a plurality of regions (a plurality of flat surfaces) 13s_1 and 13s_2.

In the planar lighting device 101, one (region 13s_2) of the regions 13s_1 and 13s_2 included in the second region 13s causes light traveling from the incident surface 13a toward the end surface 13b to be output from the output surface 13c in the first direction 70 as light for illumination.

The planar lighting device 101 having the configuration described above can control distribution of two kinds of light, that is, distribution of light for illumination and light for design as described above.

Fourth Embodiment

Figure 19:
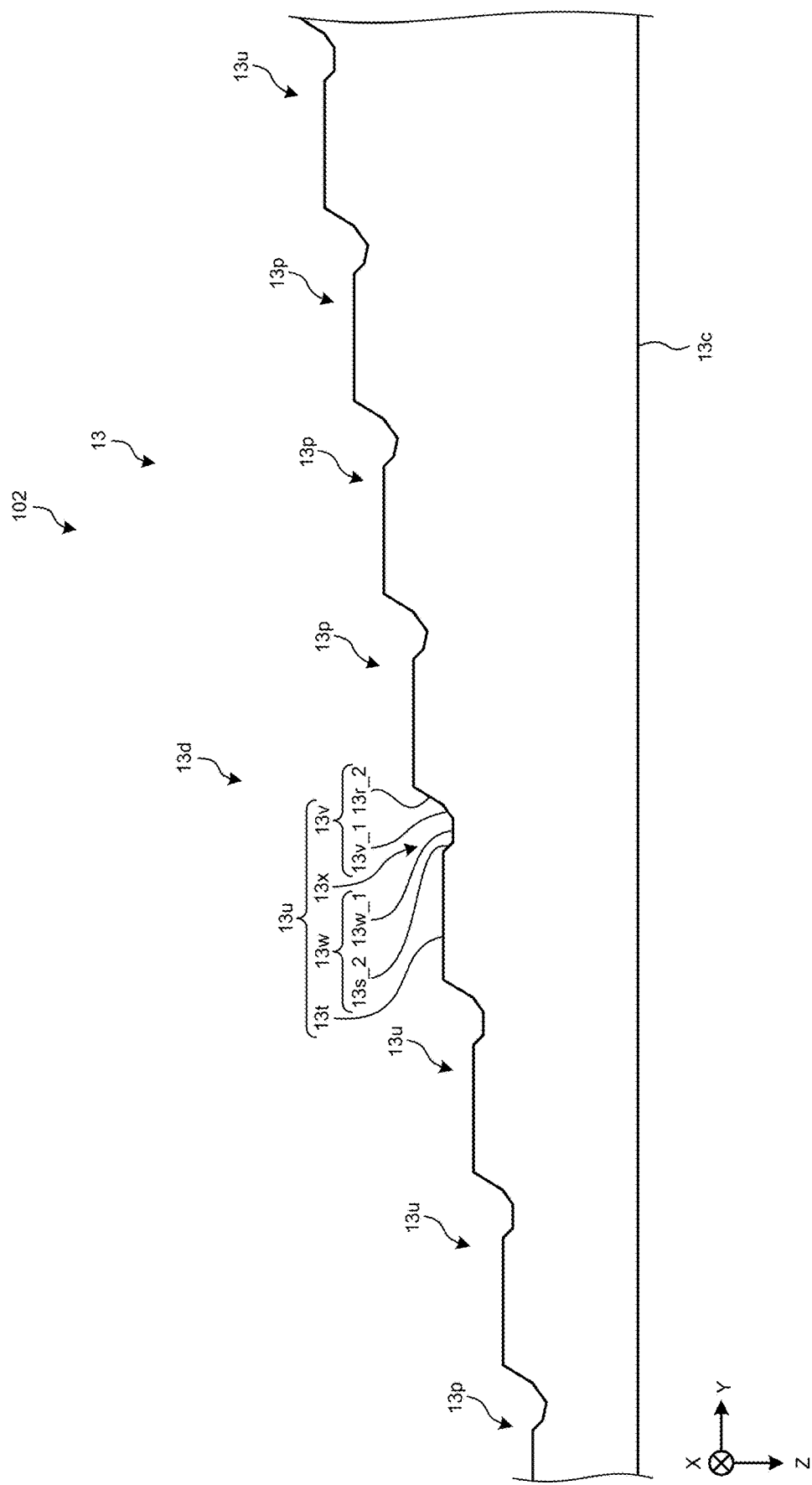
FIG. 19 is a view for explaining a light guide plate included in a planar lighting device according to a fourth embodiment.

The following describes a planar lighting device 102 according to a fourth embodiment with reference to FIG. 19. In the description of the fourth embodiment, components similar to those of the planar lighting device 1 according to the first embodiment, the planar lighting device 100 according to the second embodiment, and the planar lighting device 101 according to the third embodiment are denoted by like reference numerals, and explanation thereof is omitted. FIG. 19 is a view for explaining the light guide plate 13 included in the planar lighting device 102 according to the fourth embodiment.

As illustrated in FIG. 19, a plurality of prisms 13p and 13u are formed corresponding to the bright parts 79a (refer to FIG. 15) and the dark parts 79b (refer to FIG. 15) of the light emission pattern 79 as described in the second embodiment with reference to FIG. 15 in the lateral direction (Y-axis direction) of the light guide plate 13 on the principal surface 13d of the light guide plate 13. The prisms 13p and 13u according to the fourth embodiment are formed to be away from the output surface 13c stepwise from the incident surface 13a (refer to FIG. 1) to the end surface 13b (refer to FIG. 1).

The prisms 13u according to the fourth embodiment cause light entering into the incident surface 13a and traveling from the incident surface 13a toward the end surface 13b and light reflected by the reflection film 14 and traveling from the end surface 13b toward the incident surface 13a to be output from the output surface 13c in the first direction 70 (refer to FIG. 9) as light for illumination. The prisms 13u each have a recess 13x and the third region 13t. The recess 13x is recessed toward the output surface 13c. The recess 13x has a fourth region 13v and a fifth region 13w. The prism 13u is an example of the second prism, and the recess 13x is an example of a second recess.

The fourth region 13v causes light reflected by the reflection film 14 (refer to FIG. 1) and traveling from the end surface 13b toward the incident surface 13a to be output from the output surface 13c in the first direction 70 (refer to FIG. 9) as light for illumination.

The fourth region 13v, for example, is gradually away from the output surface 13c in a direction from the incident surface 13a toward the end surface 13b of the light guide plate 13 (plus direction of the Y-axis).

The fourth region 13v includes a region 13v_1 and a region 13r_2 (a plurality of regions). The region 13v_1 is a flat surface. The inclination angle of the region 13v_1 with respect to the output surface 13c is the same as that of the region 13r_1 (refer to FIG. 17) with respect to the output surface 13c. However, the length of the region 13v_1 in the Y-axis direction is shorter than that of the region 13r_1 in the Y-axis direction. One end of the region 13v_1 of a certain prism 13u is connected to one end of a region 13w_1, which will be described later, of the certain prism 13u. The other end of the region 13v_1 of the certain prism 13u is connected to one end of the region 13r_2 of the certain prism 13u. The other end of the region 13r_2 of the certain prism 13u is connected to the third region 13t of another prism (prism 13u or 13p) adjacent to the certain prism 13u.

The fourth region 13v may include one flat surface region or one curved surface region, three or more flat surface regions, or three or more curved surface regions. Furthermore, the fourth region 13v may include one or more flat surface regions and one or more curved surface regions.

The regions 13v_1 and 13r_2, for example, reflect light reflected by the reflection film 14 and traveling from the end surface 13b toward the incident surface 13a and cause the light to be output from the output surface 13c in the first direction 70 as light for illumination. Consequently, by adjusting the inclination angles of the regions 13v_1 and 13r_2 with respect to the output surface 13c, for example, the planar lighting device 102 can control distribution of light for illumination.

The prisms 13p and 13u according to the present embodiment are formed to be away from the output surface 13c stepwise from the incident surface 13a to the end surface 13b such that a large amount of light is reflected and subjected to distribution control by the first regions 13r (refer to FIG. 17) and the fourth regions 13v. Consequently, the planar lighting device 102 can control distribution of light for illumination efficiently.

The fifth region 13w hardly causes light traveling from the incident surface 13a toward the end surface 13b to be output from the output surface 13c in the second direction 71 (refer to FIG. 9) as light for design.

The fifth region 13w, for example, comes gradually closer to the output surface 13c by a certain distance in a direction from the incident surface 13a toward the end surface 13b of the light guide plate 13 (plus direction of the Y-axis) and extends in a direction along the output surface 13c.

The fifth region 13w includes a region 13w_1 and a region 13s_2 (a plurality of regions). The region 13w_1 is parallel or substantially parallel to the output surface 13c. One end of the region 13w_1 of a certain prism 13u is connected to one end of the region 13v_1 of the certain prism 13u. The other end of the region 13w_1 of the certain prism 13u is connected to one end of the region 13s_2 of the certain prism 13u. The other end of the region 13s_2 of the certain prism 13u is connected to one end of the third region 13t of the certain prism 13u. The other end of the third region 13t of the certain prism 13u is connected to the region 13r_2 of another prism 13u adjacent to the certain prism 13u or the region 13r_2 of the prism 13p adjacent to the certain prism 13u.

The fifth region 13w may include one flat surface region or one curved surface region, three or more flat surface regions, or three or more curved surface regions. Furthermore, the fifth region 13w may include one or more flat surface regions and one or more curved surface regions.

The region 13w_1, for example, is parallel or substantially parallel to the output surface 13c. As a result, the region 13w_1 hardly causes light traveling in the light guide plate 13 to be output from the output surface 13c in the first direction 70 as light for illumination. Furthermore, the region 13w_1 hardly causes light traveling in the light guide plate 13 to be output from the output surface 13c in the second direction 71 as light for design.

Instead of the fifth region 13w, the present embodiment may employ, as the fifth region, a region gradually closer to the output surface 13c in a direction from the incident surface 13a toward the end surface 13b and a region that causes light traveling from the incident surface 13a toward the end surface 13b to be output from the output surface 13c in the second direction 71 as light for design and that is smaller than the region 13s_1 that causes light for design to be output from the output surface 13c in the second direction 71 (refer to FIG. 9) in the second region 13s according to the third embodiment described with reference to FIG. 17. When the user observes the fifth region described above from the second direction 71, the luminance of the part of the output surface 13c corresponding to the fifth region is lower than that of the part of the output surface 13c corresponding to the second region 13s according to the third embodiment. As a result, the fifth region corresponds to the dark part 79b (refer to FIG. 15).

As described in the third embodiment with reference to FIG. 17, the prism 13p has the region 13s_1 that causes light for design to be output from the output surface 13c in the second direction 71 (refer to FIG. 9). As a result, the prism 13p is a part that looks relatively bright when viewed from the second direction 71 by the user. By contrast, the prism 13u has no region that causes light for design to be output from the output surface 13c in the second direction 71. As a result, the prism 13u is a part that looks relatively dark when viewed from the second direction 71 by the user. In other words, the prism 13p corresponds to the bright part 79a described above (refer to FIG. 15), and the prism 13u corresponds to the dark part 79b described above (refer to FIG. 15).

By adjusting the length, the number, the position, and the like of the prisms 13p and the prisms 13u, the luminance of the bright parts and the dark parts of the light emission pattern displayed by the planar lighting device 102 can be adjusted, and the light emission pattern can be changed.

Figure 20:
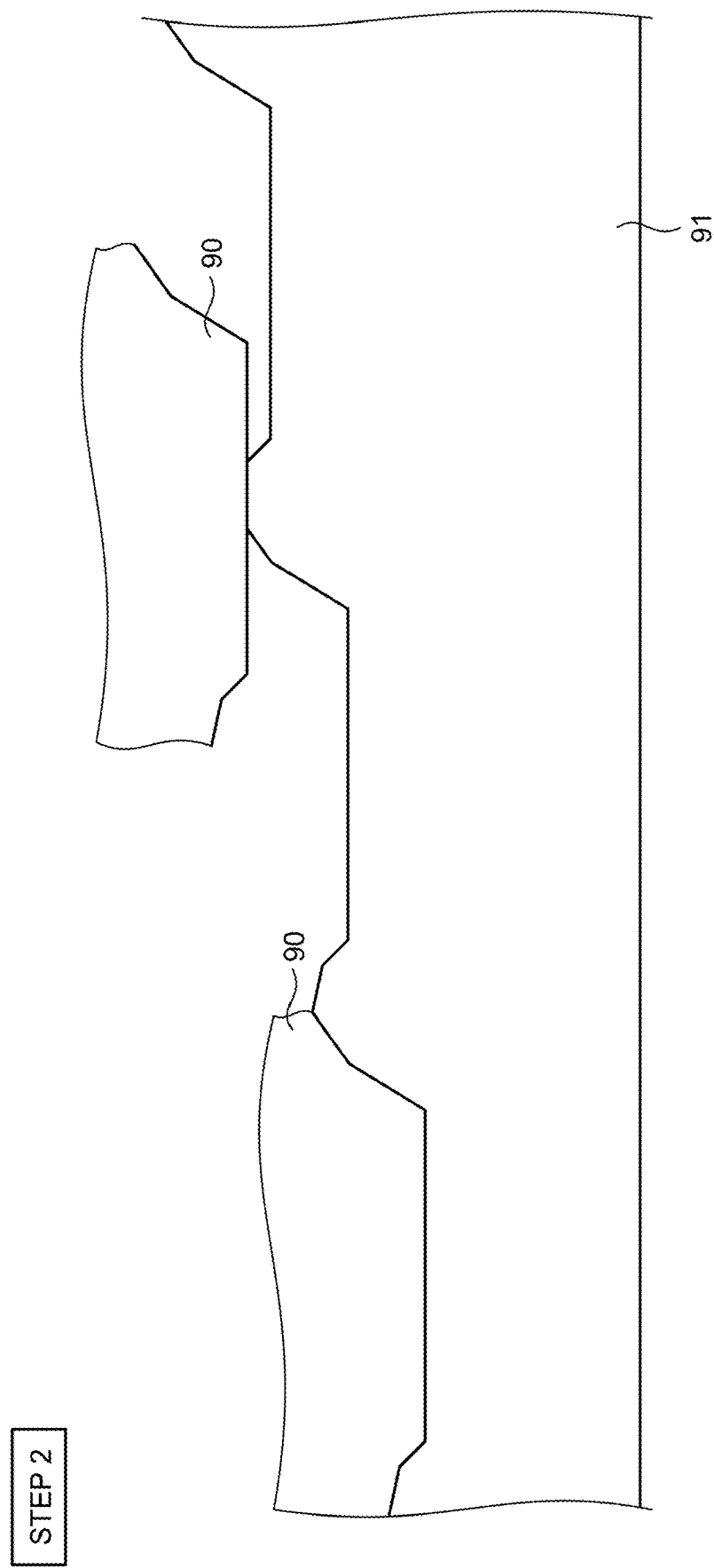
FIG. 20 is a view for explaining an example of a method for producing a mold used to manufacture the light guide plate with prisms formed thereon according to the fourth embodiment.

The following describes a method for producing a mold 91 used to manufacture the light guide plate 13 with the prisms 13p and 13u formed thereon according to the fourth embodiment with reference to FIG. 20. FIG. 20 is a view for explaining an example of the method for producing the mold 91 used to manufacture the light guide plate 13 with the prisms 13p and 13u formed thereon according to the fourth embodiment.

Similarly to Step 1 in the method for producing the mold 77 according to the first embodiment described with reference to FIG. 12, the mold 91 is cut so as to have a stepped shape. The mold 91 is cut such that the height of the steps of the mold 91 is substantially equal to the distance in the Z-axis direction between two third regions 13t of two adjacent prisms illustrated in FIG. 19. Examples of the two adjacent prisms include three pairs of prisms, that is, the prisms 13p and 13p, the prisms 13p and 13u, and the prisms 13u and 13u.

At Step 2, as illustrated in FIG. 20, the parts between the steps of the mold 91 are cut using the cutting tool 90 having the same shape as that of the recess 13q (refer to FIG. 17). As illustrated in FIG. 20, the part (right part in FIG. 20) corresponding to the region 13w_1 (refer to FIG. 19) is processed to be flat by a flat surface part of the cutting tool 90, thereby forming the shape corresponding to the recess 13x (refer to FIG. 19) in the mold 91. By using the mold 91 produced as described above, the light guide plate 13 with the prisms 13p and 13u formed thereon can be manufactured.

The planar lighting device 102 according to the fourth embodiment has been described. Similarly to the first embodiment, the planar lighting device 102 according to the fourth embodiment can control distribution of two kinds of light, that is, distribution of light for illumination and light for design.

The following describes examples of prisms other than the prisms 13e, 13m, 13p, and 13u formed on the light guide plate 13 according to each of the first embodiment to the fourth embodiments as described above with reference to FIGS. 21 to 31. FIGS. 21 to 31 are views for explaining other prisms. Prisms 202 to 209 described as examples of other prisms with reference to FIGS. 21 to 31 are examples of the first prism.

Figure 21:
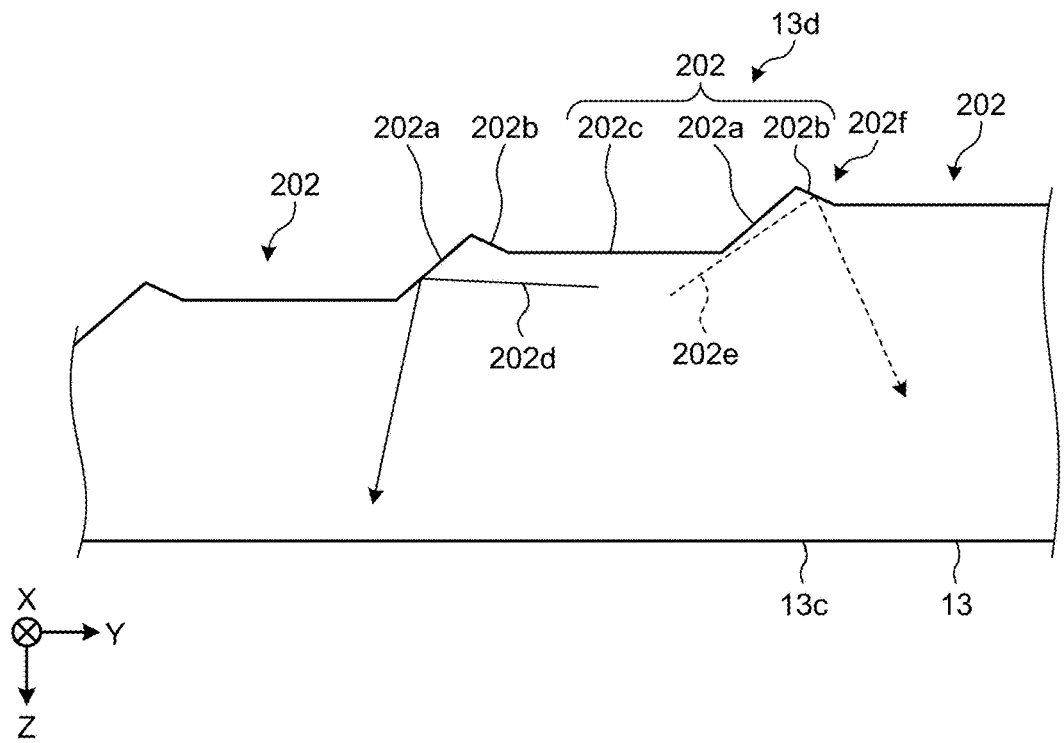
FIG. 21 is a view for explaining another prism.

FIG. 21 illustrates prisms 202 formed on the light guide plate 13. The prisms 202 are formed side by side in the lateral direction (Y-axis direction) of the light guide plate 13 on the principal surface 13d of the light guide plate 13. The prisms 202 are formed to be away from the output surface 13c stepwise from the incident surface 13a (refer to FIG. 1) to the end surface 13b (refer to FIG. 1) (from the minus direction of the Y-axis to the plus direction of the Y-axis).

The prisms 202 each have a protrusion 202f including a first region 202a and a second region 202b, and a third region 202c. The protrusion 202f protrudes toward the opposite side of the output surface 13c. The protrusion 202f is an example of the first protrusion.

One end of the first region 202a of a certain prism 202 is connected to one end of the third region 202c of the certain prism 202. The other end of the first region 202a of the certain prism 202 is connected to one end of the second region 202b of the certain prism 202. The other end of the second region 202b of the certain prism 202 is connected to the third region 202c of another prism 202 adjacent to the certain prism 202. The other end of the third region 202c of the certain prism 202 is connected to the second region 202b of another prism 202 adjacent to the certain prism 202.

The first region 202a causes light reflected by the reflection film 14 (refer to FIG. 1) and traveling from the end surface 13b toward the incident surface 13a to be output from the output surface 13c in the first direction 70 (refer to FIG. 9) as light for illumination. The first region 202a is a flat surface. In other words, the first region 202a includes a flat surface.

The first region 202a, for example, is gradually away from the output surface 13c in a direction from the incident surface 13a toward the end surface 13b of the light guide plate 13 (plus direction of the Y-axis). The first region 202a causes light reflected by the reflection film 14 and traveling from the end surface 13b toward the incident surface 13a to be output from the output surface 13c in the first direction 70.

The first region 202a, for example, reflects light 202d reflected by the reflection film 14 and traveling from the end surface 13b toward the incident surface 13a and causes the light to be output from the output surface 13c in the first direction 70 as light for illumination. Consequently, by adjusting the inclination angle of the first region 202a with respect to the output surface 13c, for example, the planar lighting device including the light guide plate 13 with the prisms 202 formed thereon can control distribution of light for illumination.

The prisms 202 are formed to be away from the output surface 13c stepwise from the incident surface 13a to the end surface 13b such that a large amount of light is reflected and subjected to distribution control by the first regions 202a. Consequently, the planar lighting device including the light guide plate 13 with the prisms 202 formed thereon can control distribution of light for illumination efficiently.

The second region 202b causes light entering into the incident surface 13a and traveling from the incident surface 13a toward the end surface 13b to be output from the output surface 13c in the second direction 71 (refer to FIG. 9) as light for design. The second region 202b is a flat surface. In other words, the second region 202b includes a flat surface.

The second region 202b, for example, is gradually closer to the output surface 13c in a direction from the incident surface 13a toward the end surface 13b of the light guide plate 13 (plus direction of the Y-axis). The second region 202b reflects light entering into the incident surface 13a and traveling from the incident surface 13a toward the end surface 13b and causes the light to be output from the output surface 13c in the second direction 71.

The second region 202b, for example, reflects light 202e traveling from the incident surface 13a toward the end surface 13b and causes the light to be output from the output surface 13c in the second direction 71 as light for design.

Consequently, by adjusting the inclination angle of the second region 202b with respect to the output surface 13c, for example, the planar lighting device including the light guide plate 13 with the prisms 202 formed thereon can control distribution of light for design.

Similarly to the third region 13i according to the first embodiment, the third region 202c is parallel or substantially parallel to the output surface 13c. When an object behind the principal surface 13d opposite to the output surface 13c of the light guide plate 13 is visually recognized from the output surface 13c side, the visually recognized object has high physical continuity. In other words, distortion in the visually recognized object is suppressed. Consequently, the light guide plate 13 has the desired translucency described above.

Figure 22:
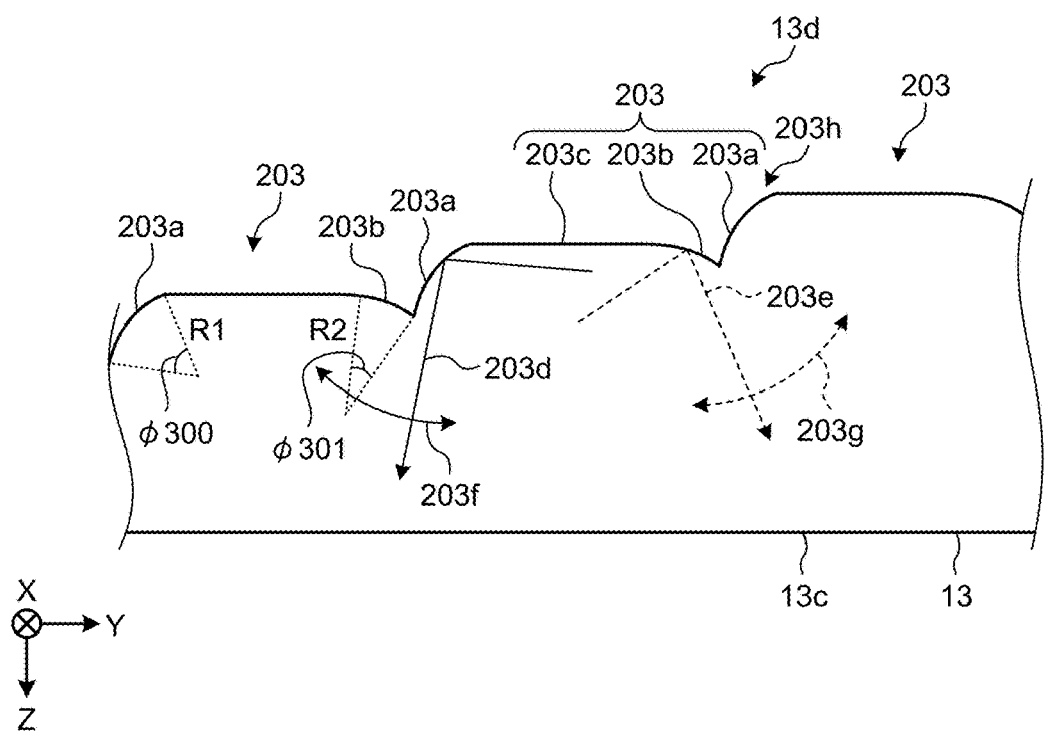
FIG. 22 is a view for explaining another prism.
Figure 23:
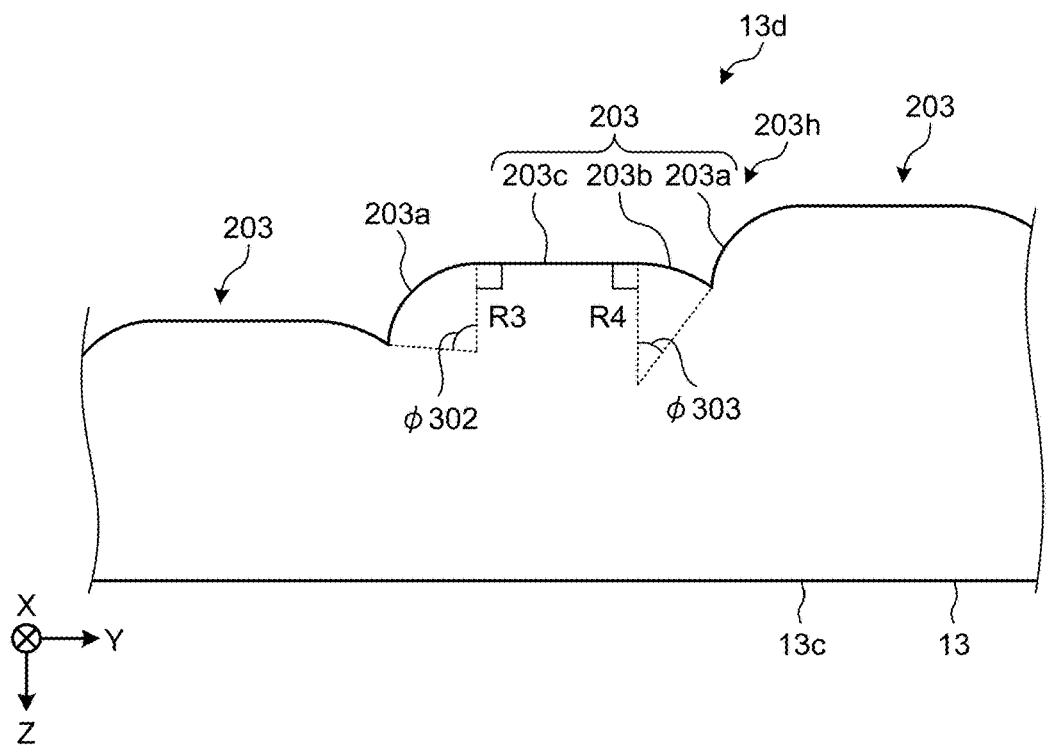
FIG. 23 is a view for explaining another prism.

FIG. 22 illustrates prisms 203 formed on the light guide plate 13. Similarly to the prisms 202 described with reference to FIG. 21, the prisms 203 are formed on the light guide plate 13.

The prisms 203 each have a recess 203h including a first region 203a and a second region 203b, and a third region 203c. The recess 203h is recessed toward the output surface 13c. The recess 203h is an example of the first recess.

One end of the first region 203a of a certain prism 203 is connected to one end of the second region 203b of the certain prism 203. The other end of the first region 203a of the certain prism 203 is connected to the third region 203c of another prism 203 adjacent to the certain prism 203. The other end of the second region 203b of the certain prism 203 is connected to one end of the third region 203c of the certain prism 203. The other end of the third region 203c of the certain prism 203 is connected to the first region 203a of another prism 203 adjacent to the certain prism 203.

The first region 203a causes light reflected by the reflection film 14 (refer to FIG. 1) and traveling from the end surface 13b toward the incident surface 13a to be output from the output surface 13c in the first direction 70 (refer to FIG. 9) as light for illumination. The first region 203a is a curved surface protruding outward. The first region 203a has a shape of a circular arc with a radius of "R1" and a central angle of "ϕ300".

The first region 203a, for example, is gradually away from the output surface 13c in a direction from the incident surface 13a toward the end surface 13b of the light guide plate 13 (plus direction of the Y-axis).

The first region 203a, for example, reflects light 203d reflected by the reflection film 14 and traveling from the end surface 13b toward the incident surface 13a and causes the light to be output from the output surface 13c in the first direction 70 as light for illumination. Consequently, by adjusting the inclination angle of the first region 203a with respect to the output surface 13c, for example, the planar lighting device including the light guide plate 13 with the prisms 203 formed thereon can control distribution of light for illumination.

The first region 203a can widen the width of distribution of light output from the output surface 13c in the first direction 70 as light for illumination because the first region 203a is a curved surface. In the example illustrated in FIG. 22, for example, the first region 203a can change the traveling direction of the light 203d toward the output surface 13c within a predetermined angular range 203f. Consequently, the planar lighting device including the light guide plate 13 with the prisms 203 formed thereon can finely control distribution of light for illumination.

The prisms 203 are formed to be away from the output surface 13c stepwise from the incident surface 13a to the end surface 13b such that a large amount of light is reflected and subjected to distribution control by the first regions 203a. Consequently, the planar lighting device including the light guide plate 13 with the prisms 203 formed thereon can control distribution of light for illumination efficiently.

The second region 203b causes light entering into the incident surface 13a and traveling from the incident surface 13a toward the end surface 13b to be output from the output surface 13c in the second direction 71 (refer to FIG. 9) as light for design. The second region 203b is a curved surface protruding outward. The second region 203b has a shape of a circular arc with a radius of "R2" and a central angle of "ϕ301".

The second region 203b, for example, is gradually closer to the output surface 13c in a direction from the incident surface 13a toward the end surface 13b of the light guide plate 13 (plus direction of the Y-axis).

The second region 203b, for example, reflects light 203e traveling from the incident surface 13a toward the end surface 13b and causes the light to be output from the output surface 13c in the second direction 71 as light for design. Consequently, by adjusting the inclination angle of the second region 203b with respect to the output surface 13c, for example, the planar lighting device including the light guide plate 13 with the prisms 203 formed thereon can control distribution of light for design.

The second region 203b can widen the width of distribution of light output from the output surface 13c in the second direction 71 as light for design because the second region 203b is a curved surface. In the example illustrated in FIG. 22, for example, the second region 203b can change the traveling direction of the light 203e toward the output surface 13c within a predetermined angular range 203g. Consequently, the planar lighting device including the light guide plate 13 with the prisms 203 formed thereon can finely control distribution of light for design.

Similarly to the third region 13i according to the first embodiment, the third region 203c is parallel or substantially parallel to the output surface 13c. When an object behind the principal surface 13d opposite to the output surface 13c of the light guide plate 13 is visually recognized from the output surface 13c side, the visually recognized object has high physical continuity. In other words, distortion in the visually recognized object is suppressed. Consequently, the light guide plate 13 has the desired translucency described above.

In a sectional view along the Y-Z plane in FIG. 22, the line segment indicating the shape of the third region 203c is neither a tangent to the circular arc indicating the shape of the first region 203a nor a tangent to the circular arc indicating the shape of the second region 203b. Alternatively, as shown in a sectional view along the Y-Z plane in the example illustrated in FIG. 23, the line segment indicating the shape of the third region 203c may be a tangent to the circular arc indicating the shape of the first region 203a and a tangent to the circular arc indicating the shape of the second region 203b. In the example illustrated in FIG. 23, the first region 203a has a shape of a circular arc with a radius of "R3" and a central angle of "ϕ302". The second region 203b has a shape of a circular arc with a radius of "R4" and a central angle of "ϕ303". Furthermore, the line segment indicating the shape of the third region 203c may be a tangent to at least one of the circular arc indicating the shape of the first region 203a and the circular arc indicating the shape of the second region 203b.

Figure 24:
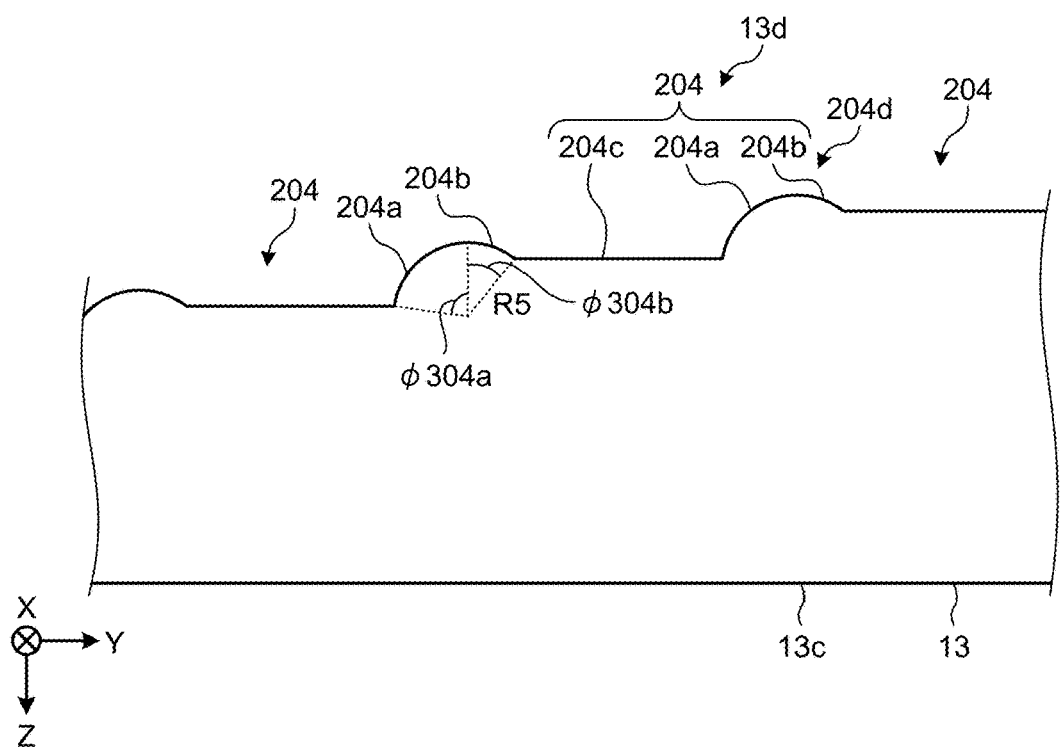
FIG. 24 is a view for explaining another prism.
Figure 25:
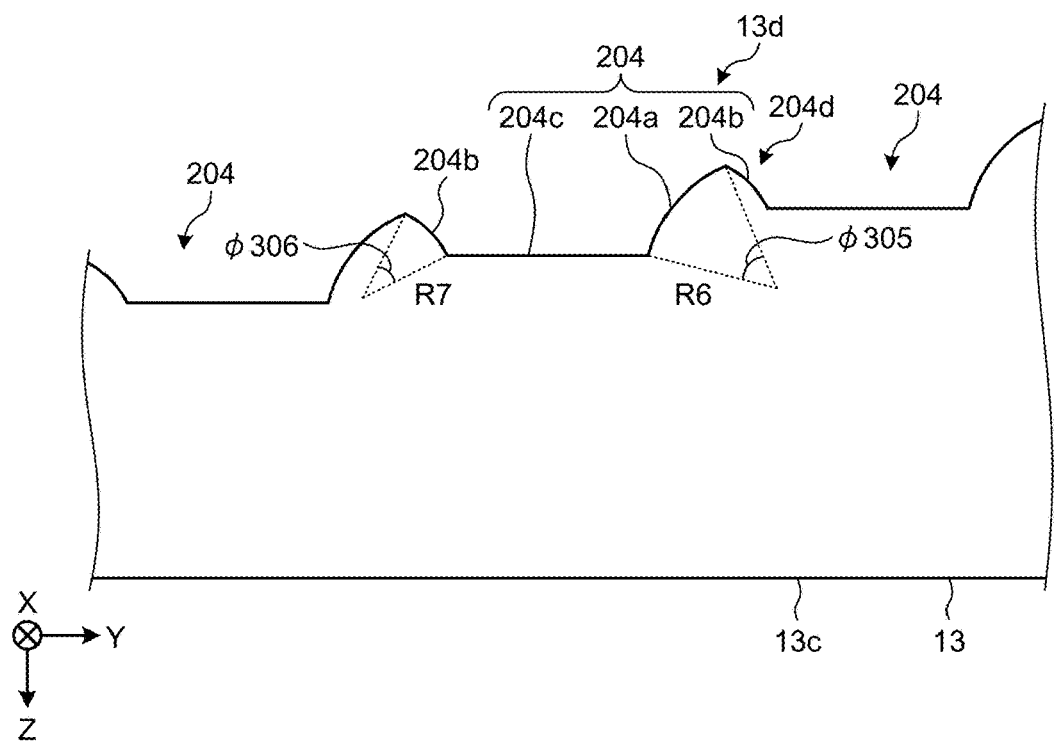
FIG. 25 is a view for explaining another prism.

FIG. 24 illustrates prisms 204 formed on the light guide plate 13. Similarly to the prisms 202 described with reference to FIG. 21, the prisms 204 are formed on the light guide plate 13.

The prisms 204 each have a protrusion 204d including a first region 204a and a second region 204b, and a third region 204c. The protrusion 204d protrudes toward the opposite side of the output surface 13c. The protrusion 204d is an example of the first protrusion.

One end of the first region 204a of a certain prism 204 is connected to one end of the third region 204c of the certain prism 204. The other end of the first region 204a of the certain prism 204 is connected to one end of the second region 204b of the certain prism 204. The other end of the second region 204b of the certain prism 204 is connected to the third region 204c of another prism 204 adjacent to the certain prism 204. The other end of the third region 204c of the certain prism 204 is connected to the second region 204b of another prism 204 adjacent to the certain prism 204.

The first region 204a causes light reflected by the reflection film 14 (refer to FIG. 1) and traveling from the end surface 13b toward the incident surface 13a to be output from the output surface 13c in the first direction 70 (refer to FIG. 9) as light for illumination. The first region 204a is a curved surface protruding outward. The first region 204a has a shape of a circular arc with a radius of "R5" and a central angle of "ϕ304a".

The first region 204a, for example, is gradually away from the output surface 13c in a direction from the incident surface 13a toward the end surface 13b of the light guide plate 13 (plus direction of the Y-axis).

The first region 204a, for example, reflects light reflected by the reflection film 14 and traveling from the end surface 13b toward the incident surface 13a and causes the light to be output from the output surface 13c in the first direction 70 as light for illumination. Consequently, by adjusting the inclination angle of the first region 204a with respect to the output surface 13c, for example, the planar lighting device including the light guide plate 13 with the prisms 204 formed thereon can control distribution of light for illumination.

The first region 204a can widen the width of distribution of light output from the output surface 13c in the first direction 70 as light for illumination because the first region 204a is a curved surface. Consequently, the planar lighting device including the light guide plate 13 with the prisms 204 formed thereon can finely control distribution of light for illumination.

The prisms 204 are formed to be away from the output surface 13c stepwise from the incident surface 13a to the end surface 13b such that a large amount of light is reflected and subjected to distribution control by the first regions 204a. Consequently, the planar lighting device including the light guide plate 13 with the prisms 204 formed thereon can control distribution of light for illumination efficiently.

The second region 204b causes light entering into the incident surface 13a and traveling from the incident surface 13a toward the end surface 13b to be output from the output surface 13c in the second direction 71 (refer to FIG. 9) as light for design. The second region 204b is a curved surface protruding outward. The second region 204b has a shape of a circular arc with a radius of "R5" and a central angle of "ϕ304b".

The second region 204b, for example, is gradually closer to the output surface 13c in a direction from the incident surface 13a toward the end surface 13b of the light guide plate 13 (plus direction of the Y-axis). The second region 204b reflects light entering into the incident surface 13a and traveling from the incident surface 13a toward the end surface 13b and causes the light to be output from the output surface 13c in the second direction 71. Consequently, by adjusting the inclination angle of the second region 204b with respect to the output surface 13c, for example, the planar lighting device including the light guide plate 13 with the prisms 204 formed thereon can control distribution of light for design.

The second region 204b can widen the width of distribution of light output from the output surface 13c in the second direction 71 as light for design because the second region 204b is a curved surface. Consequently, the planar lighting device including the light guide plate 13 with the prisms 204 formed thereon can finely control distribution of light for design.

Similarly to the third region 13i according to the first embodiment, the third region 204c is parallel or substantially parallel to the output surface 13c. When an object behind the principal surface 13d opposite to the output surface 13c of the light guide plate 13 is visually recognized from the output surface 13c side, the visually recognized object has high physical continuity. In other words, distortion in the visually recognized object is suppressed. Consequently, the light guide plate 13 has the desired translucency described above.

In a sectional view along the Y-Z plane in FIG. 24, the radius "R5" and the central position of the circular arc indicating the shape of the first region 204a of a certain protrusion 204d are the same as the radius "R5" and the central position of the circular arc indicating the shape of the second region 204b of the certain protrusion 204d. Alternatively, as shown in a sectional view along the Y-Z plane in the example illustrated in FIG. 25, a radius "R6" and the central position of the circular arc indicating the shape of the first region 204a of a certain protrusion 204d may be different from a radius "R7" and the central position of the circular arc indicating the shape of the second region 204b of the certain protrusion 204d. In the example illustrated in FIG. 25, the central angle of the circular arc indicating the shape of the first region 204a is "ϕ305". The central angle of the circular arc indicating the shape of the second region 204b is "ϕ306".

Figure 26:
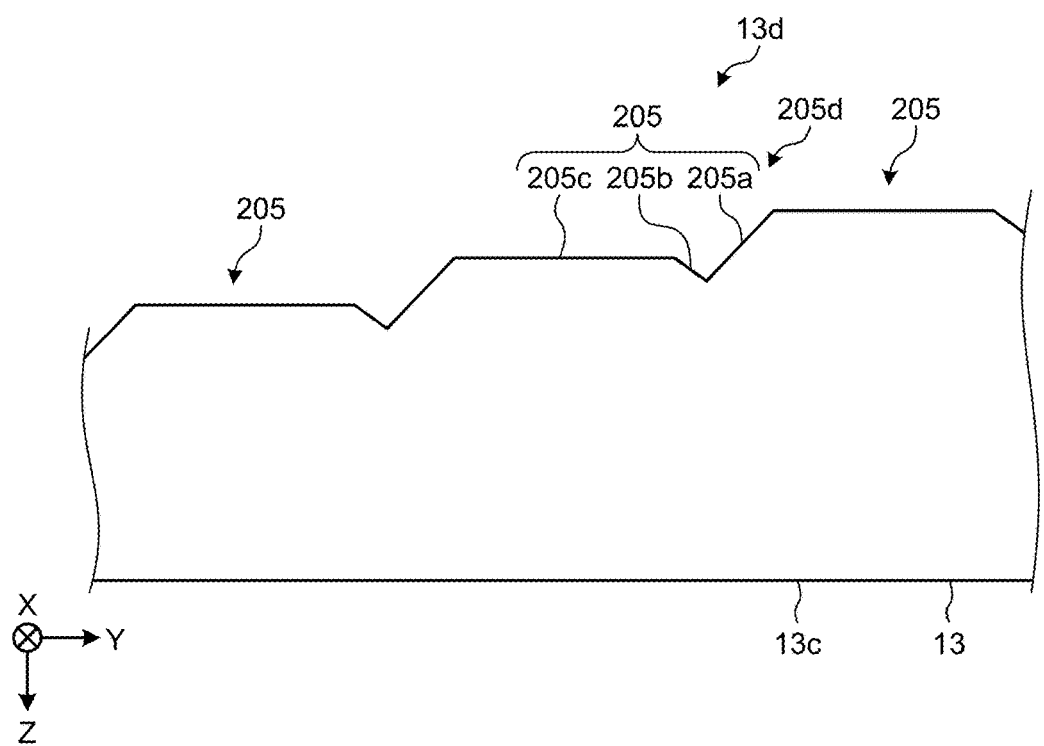
FIG. 26 is a view for explaining another prism.

FIG. 26 illustrates prisms 205 formed on the light guide plate 13. Similarly to the prisms 202 described with reference to FIG. 21, the prisms 205 are formed on the light guide plate 13.

The prisms 205 each have a recess 205d including a first region 205a and a second region 205b, and a third region 205c. The recess 205d is recessed toward the output surface 13c. The recess 205d is an example of the first recess.

One end of the first region 205a of a certain prism 205 is connected to one end of the second region 205b of the certain prism 205. The other end of the first region 205a of the certain prism 205 is connected to the third region 205c of another prism 205 adjacent to the certain prism 205. The other end of the second region 205b of the certain prism 205 is connected to one end of the third region 205c of the certain prism 205. The other end of the third region 205c of the certain prism 205 is connected to the first region 205a of another prism 205 adjacent to the certain prism 205.

The first region 205a causes light reflected by the reflection film 14 (refer to FIG. 1) and traveling from the end surface 13b toward the incident surface 13a to be output from the output surface 13c in the first direction 70 (refer to FIG. 9) as light for illumination. The first region 205a is a flat surface. In other words, the first region 205a includes a flat surface.

The first region 205a, for example, is gradually away from the output surface 13c in a direction from the incident surface 13a toward the end surface 13b of the light guide plate 13 (plus direction of the Y-axis).

The first region 205a, for example, reflects light reflected by the reflection film 14 and traveling from the end surface 13b toward the incident surface 13a and causes the light to be output from the output surface 13c in the first direction 70 as light for illumination. Consequently, by adjusting the inclination angle of the first region 205a with respect to the output surface 13c, for example, the planar lighting device including the light guide plate 13 with the prisms 205 formed thereon can control distribution of light for illumination.

The prisms 205 are formed to be away from the output surface 13c stepwise from the incident surface 13a to the end surface 13b such that a large amount of light is reflected and subjected to distribution control by the first regions 205a. Consequently, the planar lighting device including the light guide plate 13 with the prisms 205 formed thereon can control distribution of light for illumination efficiently.

The second region 205b causes light entering into the incident surface 13a and traveling from the incident surface 13a toward the end surface 13b to be output from the output surface 13c in the second direction 71 (refer to FIG. 9) as light for design. The second region 205b is a flat surface. In other words, the second region 205b includes a flat surface.

The second region 205b, for example, is gradually closer to the output surface 13c in a direction from the incident surface 13a toward the end surface 13b of the light guide plate 13 (plus direction of the Y-axis). The second region 205b reflects light entering into the incident surface 13a and traveling from the incident surface 13a toward the end surface 13b and causes the light to be output from the output surface 13c in the second direction 71. Consequently, by adjusting the inclination angle of the second region 205b with respect to the output surface 13c, for example, the planar lighting device including the light guide plate 13 with the prisms 205 formed thereon can control distribution of light for design.

Similarly to the third region 13i according to the first embodiment, the third region 205c is parallel or substantially parallel to the output surface 13c. When an object behind the principal surface 13d opposite to the output surface 13c of the light guide plate 13 is visually recognized from the output surface 13c side, the visually recognized object has high physical continuity. In other words, distortion in the visually recognized object is suppressed. Consequently, the light guide plate 13 has the desired translucency described above.

Figure 27:
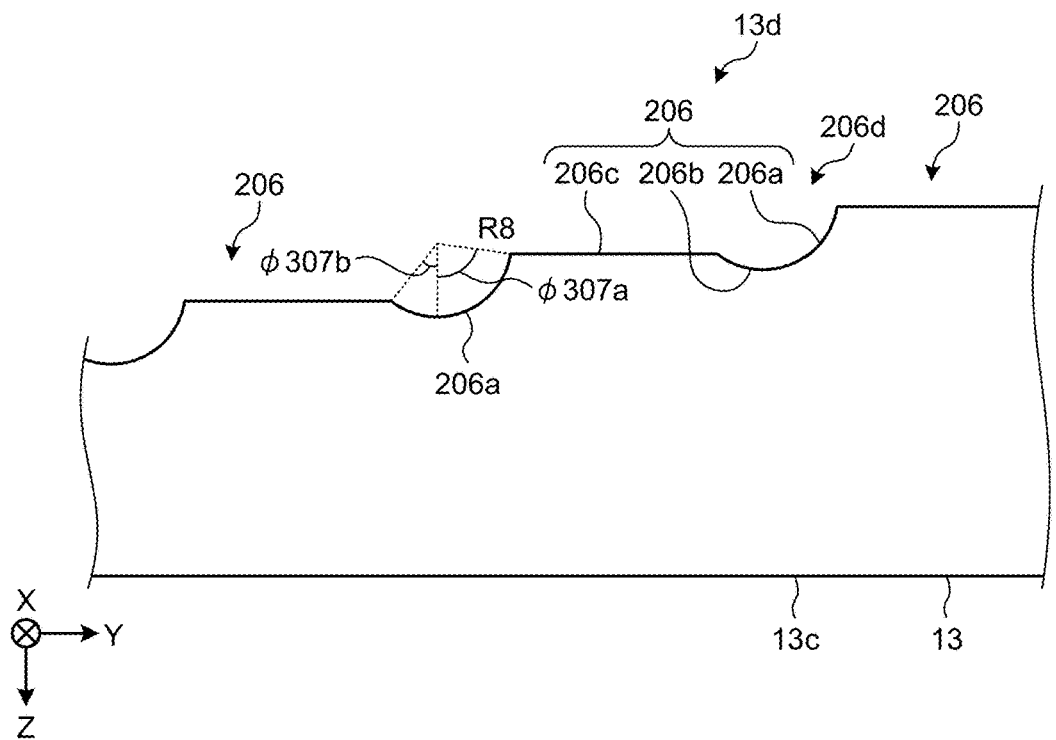
FIG. 27 is a view for explaining another prism.
Figure 28:
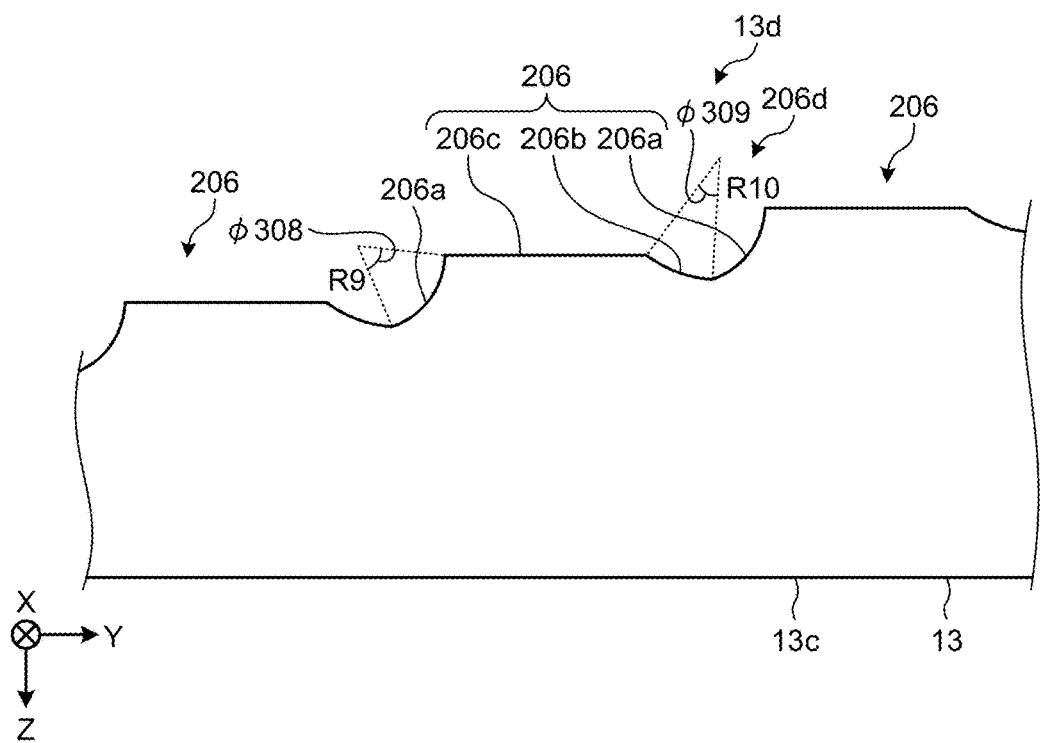
FIG. 28 is a view for explaining another prism.

FIG. 27 illustrates prisms 206 formed on the light guide plate 13. Similarly to the prisms 202 described with reference to FIG. 21, the prisms 206 are formed on the light guide plate 13.

The prisms 206 each have a recess 206d including a first region 206a and a second region 206b, and a third region 206c. The recess 206d is recessed toward the output surface 13c. The recess 206d is an example of the first recess.

One end of the first region 206a of a certain prism 206 is connected to one end of the second region 206b of the certain prism 206. The other end of the first region 206a of the certain prism 206 is connected to the third region 206c of another prism 206 adjacent to the certain prism 206. The other end of the second region 206b of the certain prism 206 is connected to one end of the third region 206c of the certain prism 206. The other end of the third region 206c of the certain prism 206 is connected to the first region 206a of another prism 206 adjacent to the certain prism 206.

The first region 206a causes light reflected by the reflection film 14 (refer to FIG. 1) and traveling from the end surface 13b toward the incident surface 13a to be output from the output surface 13c in the first direction 70 (refer to FIG. 9) as light for illumination. The first region 206a is a curved surface recessed inward. In other words, the first region 206a includes a curved surface. The first region 206a has a shape of a circular arc with a radius of "R8" and a central angle of "φ307a".

The first region 206a, for example, is gradually away from the output surface 13c in a direction from the incident surface 13a toward the end surface 13b of the light guide plate 13 (plus direction of the Y-axis).

The first region 206a, for example, reflects light reflected by the reflection film 14 and traveling from the end surface 13b toward the incident surface 13a and causes the light to be output from the output surface 13c in the first direction 70 as light for illumination. Consequently, by adjusting the inclination angle of the first region 206a with respect to the output surface 13c, for example, the planar lighting device including the light guide plate 13 with the prisms 206 formed thereon can control distribution of light for illumination.

The first region 206a can widen the width of distribution of light output from the output surface 13c in the first direction 70 as light for illumination because the first region 206a is a curved surface. Consequently, the planar lighting device including the light guide plate 13 with the prisms 206 formed thereon can finely control distribution of light for illumination.

The prisms 206 are formed to be away from the output surface 13c stepwise from the incident surface 13a to the end surface 13b such that a large amount of light is reflected and subjected to distribution control by the first regions 206a. Consequently, the planar lighting device including the light guide plate 13 with the prisms 206 formed thereon can control distribution of light for illumination efficiently.

The second region 206b causes light entering into the incident surface 13a and traveling from the incident surface 13a toward the end surface 13b to be output from the output surface 13c in the second direction 71 (refer to FIG. 9) as light for design. The second region 206b is a curved surface recessed inward. In other words, the second region 206b includes a curved surface. The second region 206b has a shape of a circular arc with a radius of "R8" and a central angle of "φ307b".

The second region 206b, for example, is gradually closer to the output surface 13c in a direction from the incident surface 13a toward the end surface 13b of the light guide plate 13 (plus direction of the Y-axis). The second region 206b reflects light entering into the incident surface 13a and traveling from the incident surface 13a toward the end surface 13b and causes the light to be output from the output surface 13c in the second direction 71. Consequently, by adjusting the inclination angle of the second region 206b with respect to the output surface 13c, for example, the planar lighting device including the light guide plate 13 with the prisms 206 formed thereon can control distribution of light for design.

The second region 206b can widen the width of distribution of light output from the output surface 13c in the second direction 71 as light for design because the second region 206b is a curved surface. Consequently, the planar lighting device including the light guide plate 13 with the prisms 206 formed thereon can finely control distribution of light for design.

Similarly to the third region 13i according to the first embodiment, the third region 206c is parallel or substantially parallel to the output surface 13c. When an object behind the principal surface 13d opposite to the output surface 13c of the light guide plate 13 is visually recognized from the output surface 13c side, the visually recognized object has high physical continuity. In other words, distortion in the visually recognized object is suppressed. Consequently, the light guide plate 13 has the desired translucency described above.

In a sectional view along the Y-Z plane in FIG. 27, the radius "R8" and the central position of the circular arc indicating the shape of the first region 206a of a certain recess 206d are the same as the radius "R8" and the central position of the circular arc indicating the shape of the second region 206b of the certain recess 206d. Alternatively, as shown in a sectional view along the Y-Z plane in the example illustrated in FIG. 28, a radius "R9" and the central position of the circular arc indicating the shape of the first region 206a of a certain recess 206d may be different from a radius "R10" and the central position of the circular arc indicating the shape of the second region 206b of the certain recess 206d. In the example illustrated in FIG. 28, the central angle of the circular arc indicating the shape of the first region 206a is "φ308". The central angle of the circular arc indicating the shape of the second region 206b is "φ309".

Figure 29:
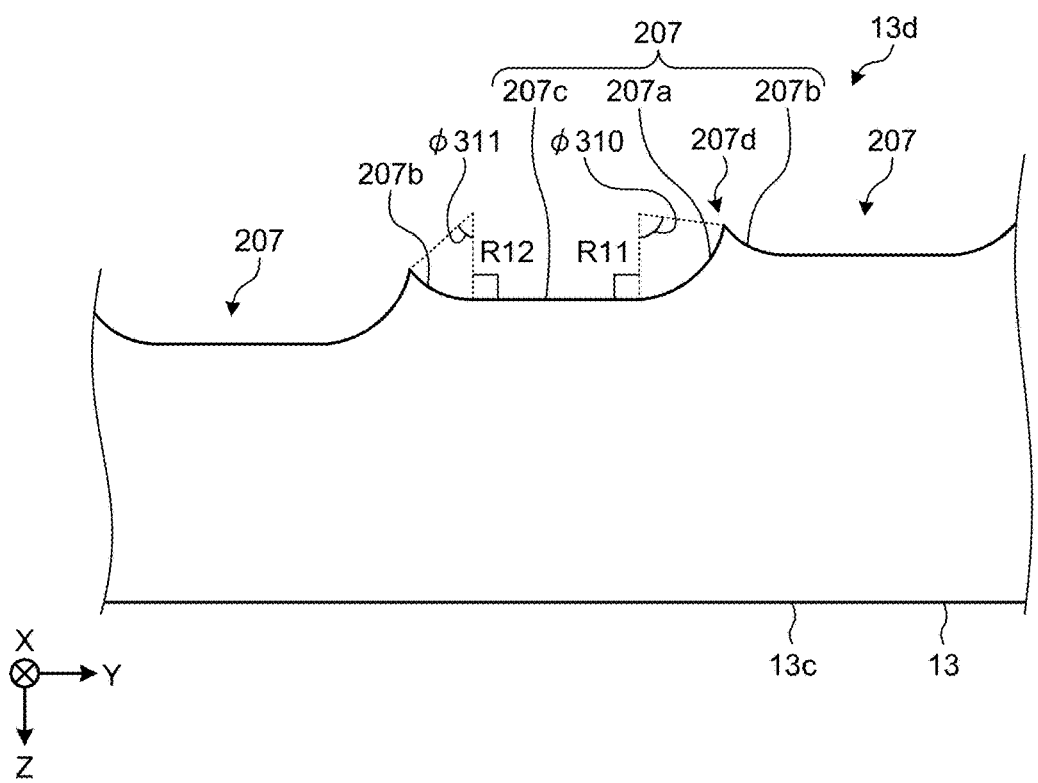
FIG. 29 is a view for explaining another prism.

FIG. 29 illustrates prisms 207 formed on the light guide plate 13. Similarly to the prisms 202 described with reference to FIG. 21, the prisms 207 are formed on the light guide plate 13.

The prisms 207 each have a protrusion 207d including a first region 207a and a second region 207b, and a third region 207c. The protrusion 207d protrudes toward the opposite side of the output surface 13c. The protrusion 207d is an example of the first protrusion.

One end of the first region 207a of a certain prism 207 is connected to one end of the third region 207c of the certain prism 207. The other end of the first region 207a of the certain prism 207 is connected to one end of the second region 207b of the certain prism 207. The other end of the third region 207c of the certain prism 207 is connected to the second region 207b of another prism 207 adjacent to the certain prism 207. The other end of the second region 207b of the certain prism 207 is connected to the third region 207c of another prism 207 adjacent to the certain prism 207.

The first region 207a causes light reflected by the reflection film 14 (refer to FIG. 1) and traveling from the end surface 13b toward the incident surface 13a to be output from the output surface 13c in the first direction 70 (refer to FIG. 9) as light for illumination. The first region 207a is a curved surface recessed inward. In other words, the first region 207a includes a curved surface. The first region 207a has a shape of a circular arc with a radius of "R11" and a central angle of "φ310".

The first region 207a, for example, is gradually away from the output surface 13c in a direction from the incident surface 13a toward the end surface 13b of the light guide plate 13 (plus direction of the Y-axis).

The first region 207a, for example, reflects light reflected by the reflection film 14 and traveling from the end surface 13b toward the incident surface 13a and causes the light to be output from the output surface 13c in the first direction 70 as light for illumination. Consequently, by adjusting the inclination angle of the first region 207a with respect to the output surface 13c, for example, the planar lighting device including the light guide plate 13 with the prisms 207 formed thereon can control distribution of light for illumination.

The first region 207a can widen the width of distribution of light output from the output surface 13c in the first direction 70 as light for illumination because the first region 207a is a curved surface. Consequently, the planar lighting device including the light guide plate 13 with the prisms 207 formed thereon can finely control distribution of light for illumination.

The prisms 207 are formed to be away from the output surface 13c stepwise from the incident surface 13a to the end surface 13b such that a large amount of light is reflected and subjected to distribution control by the first regions 207a. Consequently, the planar lighting device including the light guide plate 13 with the prisms 207 formed thereon can control distribution of light for illumination efficiently.

The second region 207b causes light entering into the incident surface 13a and traveling from the incident surface 13a toward the end surface 13b to be output from the output surface 13c in the second direction 71 (refer to FIG. 9) as light for design. The second region 207b is a curved surface recessed inward. In other words, the second region 207b includes a curved surface. The second region 207b has a shape of a circular arc with a radius of "R12" and a central angle of "φ311".

The second region 207b, for example, is gradually closer to the output surface 13c in a direction from the incident surface 13a toward the end surface 13b of the light guide plate 13 (plus direction of the Y-axis). The second region 207b reflects light entering into the incident surface 13a and traveling from the incident surface 13a toward the end surface 13b and causes the light to be output from the output surface 13c in the second direction 71. Consequently, by adjusting the inclination angle of the second region 207b with respect to the output surface 13c, for example, the planar lighting device including the light guide plate 13 with the prisms 207 formed thereon can control distribution of light for design.

The second region 207b can widen the width of distribution of light output from the output surface 13c in the second direction 71 as light for design because the second region 207b is a curved surface. Consequently, the planar lighting device including the light guide plate 13 with the prisms 207 formed thereon can finely control distribution of light for design.

Similarly to the third region 13i according to the first embodiment, the third region 207c is parallel or substantially parallel to the output surface 13c. When an object behind the principal surface 13d opposite to the output surface 13c of the light guide plate 13 is visually recognized from the output surface 13c side, the visually recognized object has high physical continuity. In other words, distortion in the visually recognized object is suppressed. Consequently, the light guide plate 13 has the desired translucency described above.

In a sectional view along the Y-Z plane in FIG. 29, the line segment indicating the shape of the third region 207c is a tangent to the circular arc indicating the shape of the first region 207a and a tangent to the circular arc indicating the shape of the second region 207b. Alternatively, the line segment indicating the shape of the third region 207c may be neither a tangent to the circular arc indicating the shape of the first region 207a nor a tangent to the circular arc indicating the shape of the second region 207b. Furthermore, the line segment indicating the shape of the third region 207c may be a tangent to at least one of the circular arc indicating the shape of the first region 207a and the circular arc indicating the shape of the second region 207b.

Figure 30:
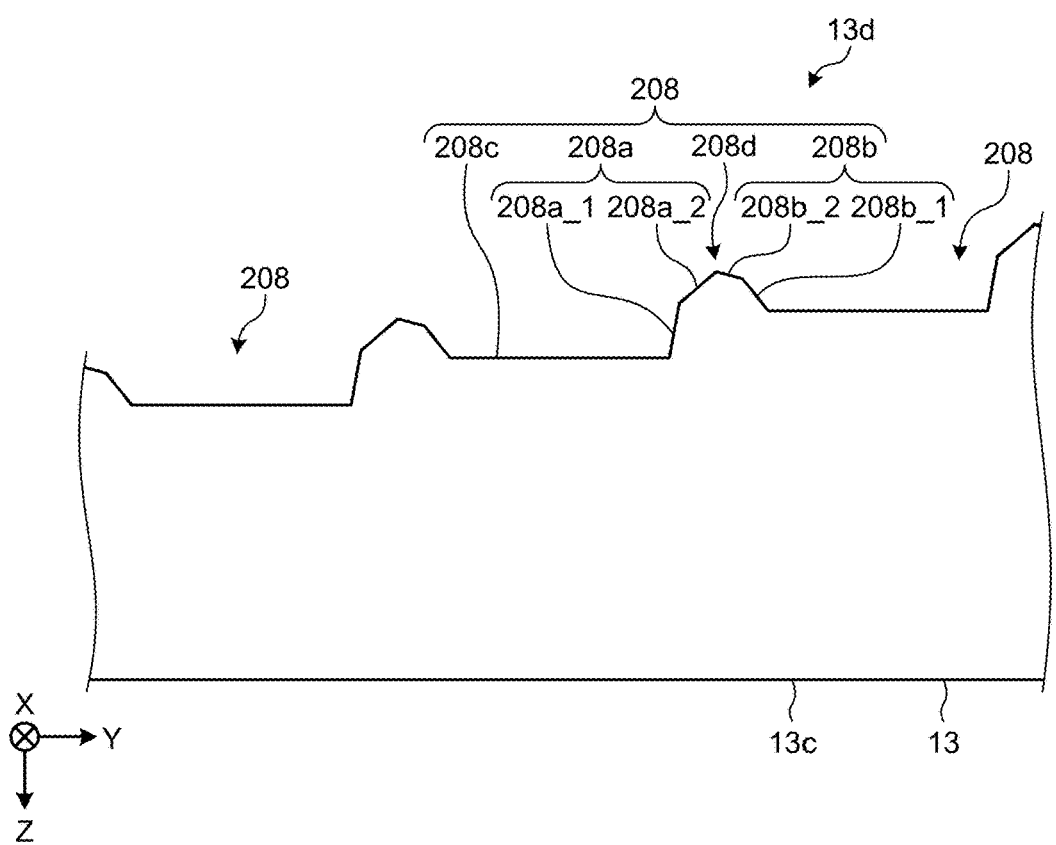
FIG. 30 is a view for explaining another prism.

FIG. 30 illustrates prisms 208 formed on the light guide plate 13. Similarly to the prisms 202 described with reference to FIG. 21, the prisms 208 are formed on the light guide plate 13.

The prisms 208 each have a protrusion 208d including a first region 208a and a second region 208b, and a third region 208c. The protrusion 208d protrudes toward the opposite side of the output surface 13c. The protrusion 208d is an example of the first protrusion.

The first region 208a causes light reflected by the reflection film 14 (refer to FIG. 1) and traveling from the end surface 13b toward the incident surface 13a to be output from the output surface 13c in the first direction 70 (refer to FIG. 9) as light for illumination.

The first region 208a, for example, is gradually away from the output surface 13c in a direction from the incident surface 13a toward the end surface 13b of the light guide plate 13 (plus direction of the Y-axis).

The first region 208a includes a region 208a_1 and a region 208a_2 (a plurality of regions). The regions 208a_1 and 208a_2 are flat surfaces. The inclination angle of the region 208a_1 with respect to the output surface 13c is larger than that of the region 208a_2 with respect to the output surface 13c. One end of the region 208a_1 of a certain prism 208 is connected to one end of the region 208a_2 of the certain prism 208. The other end of the region 208a_2 of the certain prism 208 is connected to one end of a region 208b_2, which will be described later, of the certain prism 208. The other end of the region 208a_1 of the certain prism 208 is connected to one end of the third region 208c of the certain prism 208. The other end of the third region 208c of the certain prism 208 is connected to a region 208b_1, which will be described later, of another prism 208 adjacent to the certain prism 208.

The regions 208a_1 and 208a_2, for example, reflect light reflected by the reflection film 14 and traveling from the end surface 13b toward the incident surface 13a and cause the light to be output from the output surface 13c in the first direction 70 as light for illumination. Consequently, by adjusting the inclination angles of the regions 208a_1 and 208a_2 with respect to the output surface 13c, for example, the planar lighting device including the light guide plate 13 with the prisms 208 formed thereon can control distribution of light for illumination.

The prisms 208 according to the present embodiment are formed to be away from the output surface 13c stepwise from the incident surface 13a (refer to FIG. 1) to the end surface 13b (refer to FIG. 1) such that a large amount of light is reflected and subjected to distribution control by the first regions 208a. Consequently, the planar lighting device including the light guide plate 13 with the prisms 208 formed thereon can control distribution of light for illumination efficiently.

The second region 208b causes light entering into the incident surface 13a and traveling from the incident surface 13a toward the end surface 13b to be output from the output surface 13c in the second direction 71 (refer to FIG. 9) as light for design.

The second region 208b, for example, is gradually closer to the output surface 13c in a direction from the incident surface 13a toward the end surface 13b of the light guide plate 13 (plus direction of the Y-axis).

The second region 208b includes a region 208b_1 and a region 208b_2 (a plurality of regions). The regions 208b_1 and 208b_2 are flat surfaces. The inclination angle of the region 208b_1 with respect to the output surface 13c is larger than that of the region 208b_2 with respect to the output surface 13c. One end of the region 208b_1 of a certain prism 208 is connected to the other end of the region 208b_2 of the certain prism 208. The other end of the region 208b_1 of the certain prism 208 is connected to the third region 208c of another prism 208 adjacent to the certain prism 208.

The region 208b_2, for example, reflects light traveling from the incident surface 13a toward the end surface 13b and causes the light to be output from the output surface 13c in the second direction 71 as light for design. Consequently, by adjusting the inclination angle of the region 208b_2 with respect to the output surface 13c, for example, the planar lighting device including the light guide plate 13 with the prisms 208 formed thereon can control distribution of light for design. The region 208b 1 reflects light traveling from the incident surface 13a toward the end surface 13b and causes the light to be output from the output surface 13c in the first direction 70 not as light for design but as light for illumination.

Similarly to the third region 13i according to the first embodiment, the third region 208c is parallel or substantially parallel to the output surface 13c. When an object behind the principal surface 13d opposite to the output surface 13c of the light guide plate 13 is visually recognized from the output surface 13c side, the visually recognized object has high physical continuity. In other words, distortion in the visually recognized object is suppressed. Consequently, the light guide plate 13 has the desired translucency described above.

Figure 31:
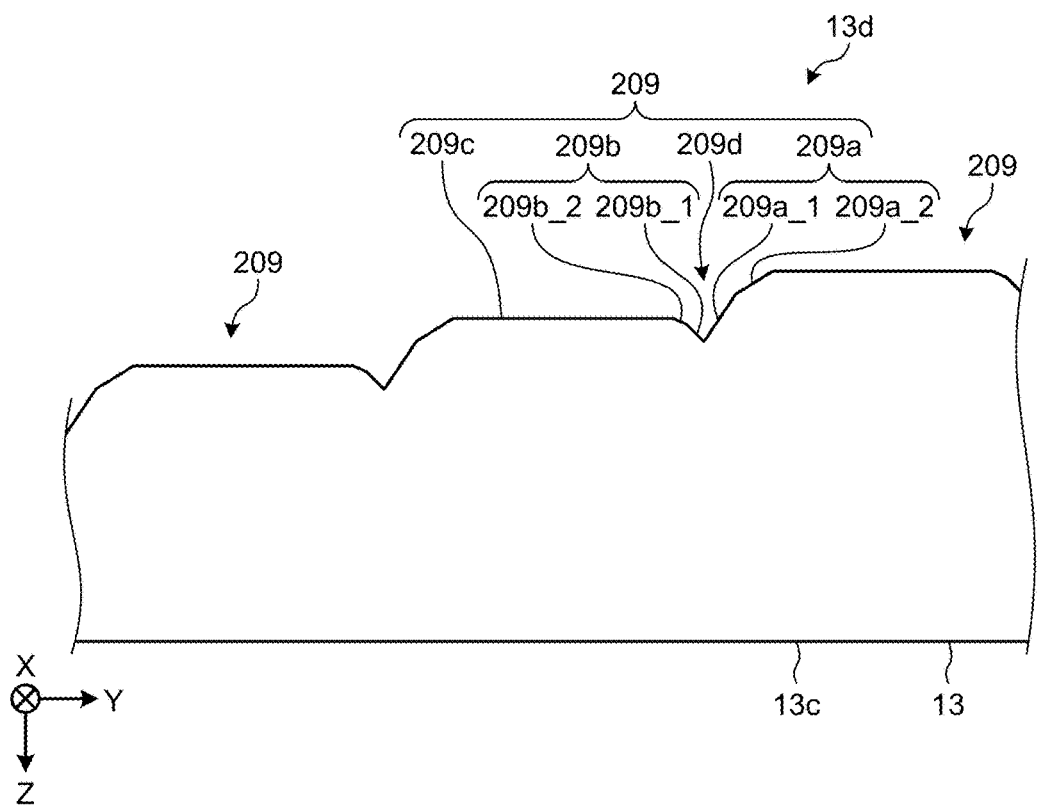
FIG. 31 is a view for explaining another prism.

FIG. 31 illustrates prisms 209 formed on the light guide plate 13. Similarly to the prisms 202 described with reference to FIG. 21, the prisms 209 are formed on the light guide plate 13.

The prisms 209 each have a recess 209d including a first region 209a and a second region 209b, and a third region 209c. The recess 209d is recessed toward the output surface 13c. The recess 209d is an example of the first recess.

The first region 209a causes light reflected by the reflection film 14 (refer to FIG. 1) and traveling from the end surface 13b toward the incident surface 13a to be output from the output surface 13c in the first direction 70 (refer to FIG. 9) as light for illumination.

The first region 209a, for example, is gradually away from the output surface 13c in a direction from the incident surface 13a toward the end surface 13b of the light guide plate 13 (plus direction of the Y-axis).

The first region 209a includes a region 209a_1 and a region 209a_2 (a plurality of regions). The regions 209a_1 and 209a_2 are flat surfaces. The inclination angle of the region 209a_1 with respect to the output surface 13c is larger than that of the region 209a_2 with respect to the output surface 13c. One end of the region 209a_1 of a certain prism 209 is connected to one end of the region 209a_2 of the certain prism 209. The other end of the region 209a_1 of the certain prism 209 is connected to one end of a region 209b_1, which will be described later, of the certain prism 209. The other end of the region 209a_2 of the certain prism 209 is connected to the third region 209c of another prism 209 adjacent to the certain prism 209.

The regions 209a_1 and 209a_2, for example, reflect light reflected by the reflection film 14 and traveling from the end surface 13b toward the incident surface 13a and cause the light to be output from the output surface 13c in the first direction 70 as light for illumination. Consequently, by adjusting the inclination angles of the regions 209a_1 and 209a_2 with respect to the output surface 13c, for example, the planar lighting device including the light guide plate 13 with the prisms 209 formed thereon can control distribution of light for illumination.

The prisms 209 according to the present embodiment are formed to be away from the output surface 13c stepwise from the incident surface 13a (refer to FIG. 1) to the end surface 13b (refer to FIG. 1) such that a large amount of light is reflected and subjected to distribution control by the first regions 209a. Consequently, the planar lighting device including the light guide plate 13 with the prisms 209 formed thereon can control distribution of light for illumination efficiently.

The second region 209b causes light entering into the incident surface 13a and traveling from the incident surface 13a toward the end surface 13b to be output from the output surface 13c in the second direction 71 (refer to FIG. 9) as light for design.

The second region 209b, for example, is gradually closer to the output surface 13c in a direction from the incident surface 13a toward the end surface 13b of the light guide plate 13 (plus direction of the Y-axis).

The second region 209b includes a region 209b_1 and a region 209b_2 (a plurality of regions). The regions 209b_1 and 209b_2 are flat surfaces. The inclination angle of the region 209b_1 with respect to the output surface 13c is larger than that of the region 209b_2 with respect to the output surface 13c. The other end of the region 209b_1 of a certain prism 209 is connected to one end of the region 209b_2 of the certain prism 209. The other end of the region 209b_2 of the certain prism 209 is connected to one end of the third region 209c of the certain prism 209. The other end of the third region 209c of the certain prism 209 is connected to the region 209a_2 of another prism 209 adjacent to the certain prism 209.

The region 209b_2, for example, reflects light traveling from the incident surface 13a toward the end surface 13b and causes the light to be output from the output surface 13c in the second direction 71 as light for design. Consequently, by adjusting the inclination angle of the region 209b_2 with respect to the output surface 13c, for example, the planar lighting device including the light guide plate 13 with the prisms 209 formed thereon can control distribution of light for design. The region 209b_1 reflects light traveling from the incident surface 13a toward the end surface 13b and causes the light to be output from the output surface 13c in the first direction 70 not as light for design but as light for illumination.

Similarly to the third region 13i according to the first embodiment, the third region 209c is parallel or substantially parallel to the output surface 13c. When an object behind the principal surface 13d opposite to the output surface 13c of the light guide plate 13 is visually recognized from the output surface 13c side, the visually recognized object has high physical continuity. In other words, distortion in the visually recognized object is suppressed. Consequently, the light guide plate 13 has the desired translucency described above.

Figure 32:
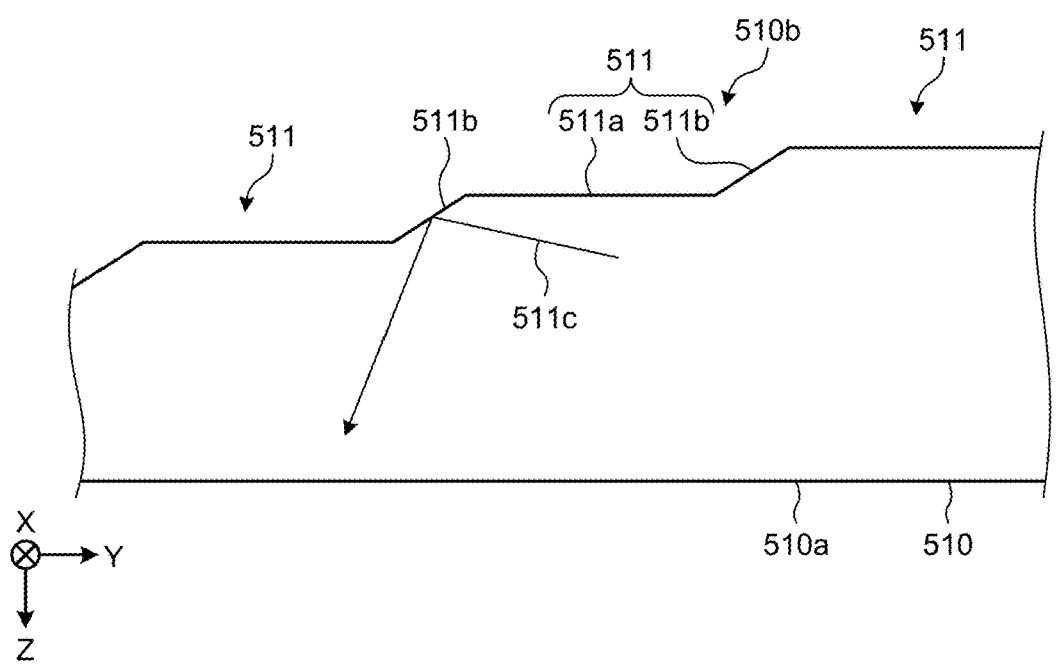
FIG. 32 is a side view of a light guide plate according to a second reference example.

The following describes a light guide plate 510 according to a second reference example with reference to FIG. 32. FIG. 32 is a side view of the light guide plate 510 according to the second reference example. As illustrated in FIG. 32, the light guide plate 510 according to the second reference example has an output surface 510a and a principal surface 510b. The output surface 510a is a surface from which entering light is output. The principal surface 510b is opposite to the output surface 510a. The light guide plate 510 has an incident surface (not illustrated) serving as an end face in the minus direction of the Y-axis and an end surface (not illustrated) serving as an end face opposite to the incident surface.

The incident surface of the light guide plate 510 receives light from a linear light source. A reflection film (not illustrated) is disposed side by side with the end surface of the light guide plate 510. The reflection film reflects light leaking from the end surface. The end surface receives light reflected by the reflection film.

A plurality of prisms 511 are formed side by side in the lateral direction (Y-axis direction) of the light guide plate 510 on the principal surface 510b of the light guide plate 510. The prisms 511 are formed to be away from the output surface 510a stepwise from the incident surface to the end surface (from the minus direction of the Y-axis to the plus direction of the Y-axis).

The prisms 511 each have a region 511a and a region 511b. The region 511a is parallel or substantially parallel to the output surface 510a.

One end of the region 511a of a certain prism 511 is connected to one end of the region 511b of the certain prism 511. The other end of the region 511a of the certain prism 511 is connected to the region 511b of another prism 511 adjacent to the certain prism 511. The other end of the region 511b of the certain prism 511 is connected to the region 511a of another prism 511 adjacent to the certain prism 511.

The region 511b reflects light 511c reflected by the reflection film and traveling from the end surface toward the incident surface and causes the light to be output from the output surface 510a in a predetermined direction for illumination as light for illumination. The light guide plate 510 according to the second reference example, however, has no prism that causes light traveling from the incident surface toward the end surface to be output from the output surface 510a in a predetermined direction for design as light for design. Consequently, it is difficult for the planar lighting device including the light guide plate 510 according to the second reference example to control distribution of light for design.

In the planar lighting device including the light guide plate 13 with any one of the prisms 13e, 13m, 13p, 13u, and 202 to 209 described above formed thereon, the light guide plate 13 is provided with the prisms that control distribution of light for illumination and distribution of light for design. Consequently, the planar lighting device can control distribution of light for illumination and distribution of light for design.

In the light guide plate 13 described with reference to FIGS. 21 to 31, the prisms 202 to 209 correspond to the bright parts 79a described in the second embodiment with reference to FIG. 15. In addition, the light guide plate 13 may be provided with the prisms corresponding to the dark parts 79b. The following describes a method for forming these prisms. If the prisms corresponding to the dark parts 79b each have a protrusion, for example, the prisms corresponding to the dark parts 79b can be formed using a mold produced by a method similar to that performed at Step 2 described with reference to FIG. 16. By adjusting the depth of cutting at the stepped parts of the mold by a cutting tool having the same shape as that of the protrusion 202f, for example, a mold for forming the prisms 202 corresponding to the bright parts 79a and the prisms corresponding to the dark parts 79b can be produced. The other prisms 204, 207, and 208 having the protrusions 204d, 207d, and 208d, respectively, are formed by the same method.

If the prisms corresponding to the dark parts 79b each have a recess, for example, the prisms corresponding to the dark parts 79b can be formed using a mold produced by a method similar to that performed at Step 2 described with reference to FIG. 20. A mold is processed so as to have a part corresponding to the shape of the recess 203h by a cutting tool having the same shape as that of the recess 203h, for example. Subsequently, at least part of the part corresponding to the recess 203h is processed to be flat by a flat surface part of the cutting tool, thereby forming the shape of the prism corresponding to the dark part 79b in the mold. As described above, a mold for forming the prisms 203 corresponding to the bright parts 79a and the prisms corresponding to the dark parts 79b can be produced. The other prisms 205, 206, and 209 having the recesses 205d, 206d, and 209d, respectively, are formed by the same method.

By adjusting the length, the number, the position, and the like of the prisms 202 to 209 corresponding to the bright parts 79a and the prisms corresponding to the dark parts 79b, a desired light emission pattern can be formed.

The following describes examples of cutting tool other than the cutting tool 78 and 90 described with reference to FIGS. 12, 18, and other figures. FIGS. 33 to 38 are schematics of examples of other cutting tool.

Figure 33:
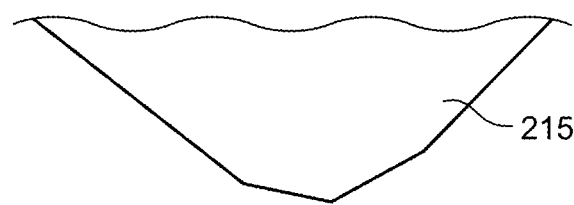
FIG. 33 is a schematic of an example of another cutting tool.

FIG. 33 illustrates a cutting tool 215 as an example of another cutting tool. The cutting tool 215 has a polygonal shape and is used to produce a mold for manufacturing a light guide plate having protrusions with the same shape as that of the pointed end of the cutting tool 215 formed between the prisms, for example.

Figure 34:
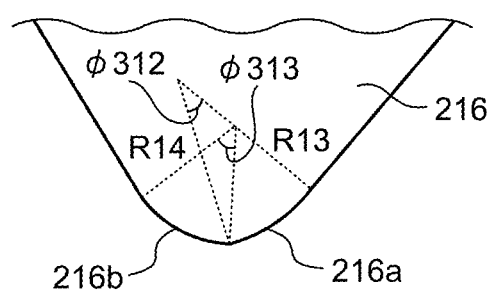
FIG. 34 is a schematic of an example of another cutting tool.

FIG. 34 illustrates a cutting tool 216 as an example of another cutting tool. The pointed end of the cutting tool 216 has a curved surface 216a protruding outward and a curved surface 216b protruding outward. The curved surface 216a is connected to the curved surface 216b. The curved surface 216a has a shape of a circular arc with a radius of "R13" and a central angle of "φ312". The curved surface 216b has a shape of a circular arc with a radius of "R14" and a central angle of "φ313". The cutting tool 216, for example, is used to produce a mold for manufacturing a light guide plate having protrusions with the same shape as that of the pointed end of the cutting tool 216 formed between the prisms.

Figure 35:
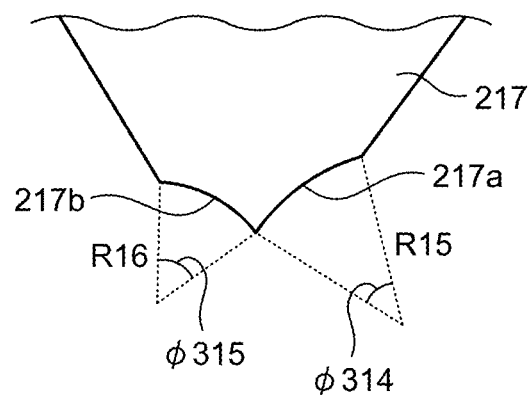
FIG. 35 is a schematic of an example of another cutting tool.

FIG. 35 illustrates a cutting tool 217 as an example of another cutting tool. The pointed end of the cutting tool 217 has a curved surface 217a recessed inward and a curved surface 217b recessed inward. The curved surface 217a is connected to the curved surface 217b. The curved surface 217a has a shape of a circular arc with a radius of "R15" and a central angle of "φ314". The curved surface 217b has a shape of a circular arc with a radius of "R16" and a central angle of "φ315". The cutting tool 217, for example, is used to produce a mold for manufacturing a light guide plate having protrusions with the same shape as that of the pointed end of the cutting tool 217 formed between the prisms.

Figure 36:
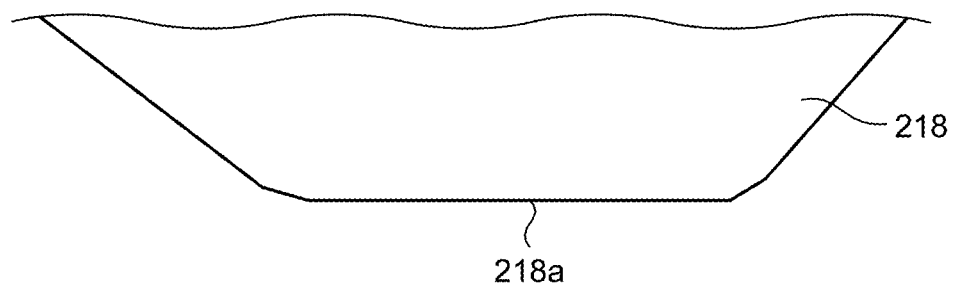
FIG. 36 is a schematic of an example of another cutting tool.

FIG. 36 illustrates a cutting tool 218 as an example of another cutting tool. The cutting tool 218 has a polygonal shape and has a flat surface 218a. The cutting tool 218, for example, is used to produce a mold for manufacturing a light guide plate with prisms having the same shape as that of part of the pointed end of the cutting tool 218 formed thereon.

Figure 37:
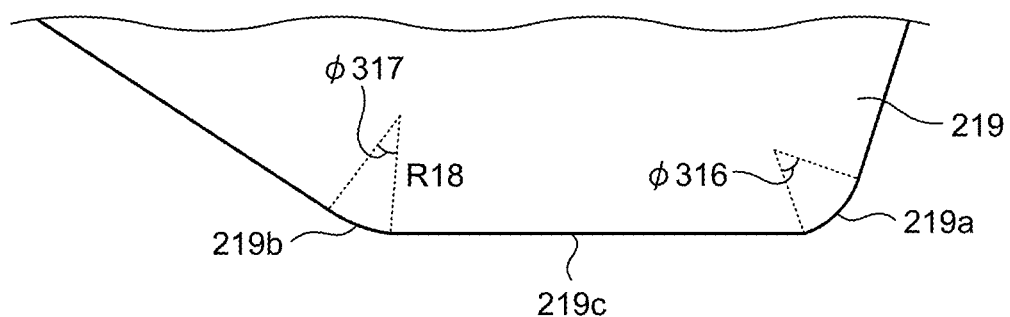
FIG. 37 is a schematic of an example of another cutting tool.

FIG. 37 illustrates a cutting tool 219 as an example of another cutting tool. The pointed end of the cutting tool 219 has a curved surface 219a protruding outward and a curved surface 219b protruding outward and a flat surface 219c. The curved surface 219a is connected to one end of the flat surface 219c. The other end of the flat surface 219c is connected to the curved surface 219b. The curved surface 219a has a shape of a circular arc with a radius of "R17" and a central angle of "φ316". The curved surface 219b has a shape of a circular arc with a radius of "R18" and a central angle of "φ317". The cutting tool 219, for example, is used to produce a mold for manufacturing a light guide plate with prisms having the same shape as that of part of the pointed end of the cutting tool 219 formed thereon.

Figure 38:
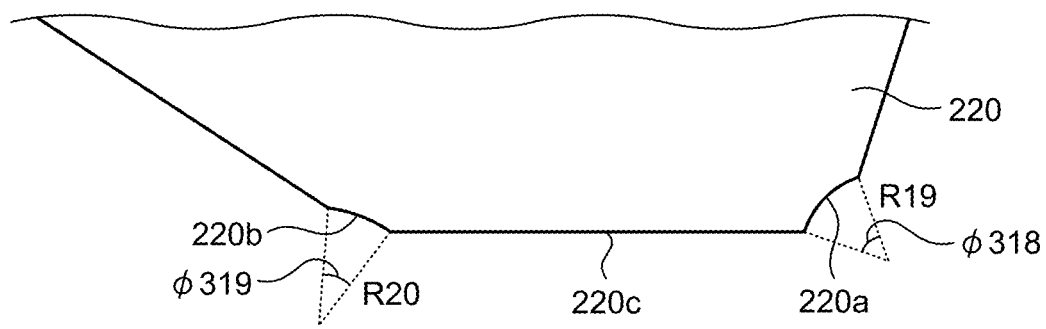
FIG. 38 is a schematic of an example of another cutting tool.

FIG. 38 illustrates a cutting tool 220 as an example of another cutting tool. The pointed end of the cutting tool 220 has a curved surface 220a recessed inward and a curved surface 220b recessed inward and a flat surface 220c. The curved surface 220a is connected to one end of the flat surface 220c. The other end of the flat surface 220c is connected to the curved surface 220b. The curved surface 220a has a shape of a circular arc with a radius of "R19" and a central angle of "φ318". The curved surface 220b has a shape of a circular arc with a radius of "R20" and a central angle of "φ319". The cutting tool 220, for example, is used to produce a mold for manufacturing a light guide plate with prisms having the same shape as that of part of the pointed end of the cutting tool 220 formed thereon.

The following describes results of a simulation carried out on a model of the planar lighting device described above with reference to FIGS. 39 to 42. This simulation is carried out to derive illuminance distribution of light for illumination output by a model of the planar lighting device to an evaluation surface (1000 mm wide and 1000 mm long) placed under the center of the opening 11a of the model of the planar lighting device by 800 mm in the vertical direction. In the simulation, the posture of the model of the planar lighting device is set such that any one of the first directions (refer to FIG. 9) within a certain range passes through the center (0,0) of the evaluation surface.

Figure 39:
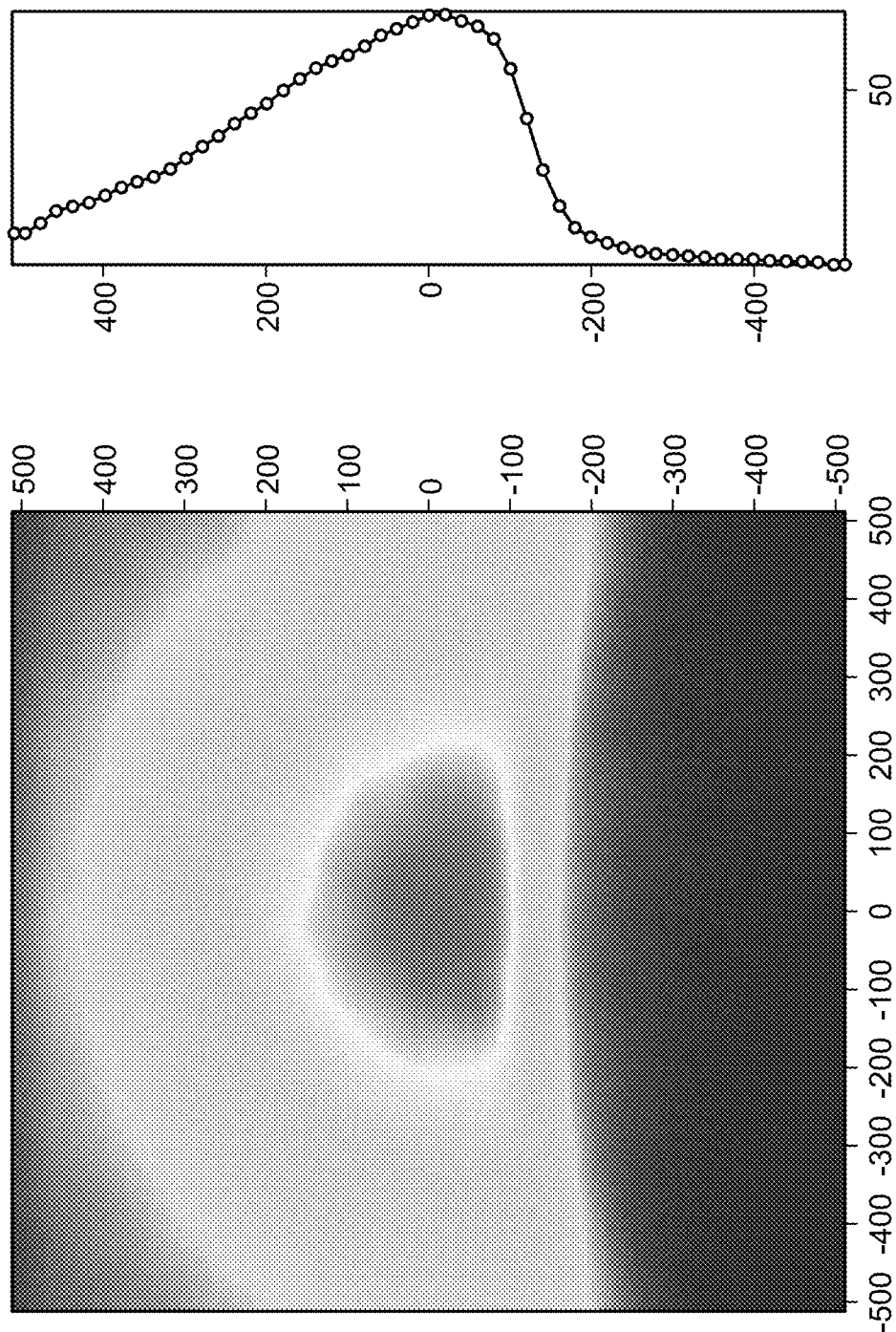
FIG. 39 is a diagram of an example of illuminance distribution of light for illumination output to an evaluation surface by a model of the planar lighting device including the light guide plate with the prisms formed thereon according to the second reference example described with reference to FIG. 32 and is an example of a graph indicating a relation between the position in the vertical direction on the evaluation surface and the illuminance at the center position "0" in the horizontal direction at each position in the vertical direction.

FIG. 39 is a diagram of an example of illuminance distribution of light for illumination output to the evaluation surface by a model of the planar lighting device including the light guide plate 510 with the prisms 511 formed thereon according to the second reference example described with reference to FIG. 32 and is an example of a graph indicating a relation between the position in the vertical direction on the evaluation surface (position with respect to the center position "0" in the vertical direction) and the illuminance at the center position "0" in the horizontal direction at each position in the vertical direction. The left figure in FIG. 39 illustrates an example of the illuminance distribution, and the right figure illustrates an example of the graph. The posture of the model of the planar lighting device is set such that a linear light source (not illustrated) in the model of the planar lighting device is positioned on the upper side in FIG. 39, and a reflection film (not illustrated) is positioned on the lower side in FIG. 39. Also in the examples illustrated in FIGS. 40 to 42, the posture of the model of the planar lighting device is set in the same manner as that described above. In the graph in the example illustrated in FIG. 39, the abscissa indicates illuminance, and the ordinate indicates position in the vertical direction on the evaluation surface. Also in the examples illustrated in FIGS. 40 to 42, the abscissa and the ordinate indicate the same items as those described above.

As indicated in the illuminance distribution and the graph in the example illustrated in FIG. 39, although light is output to the part near the linear light source (part close to the incident surface (not illustrated) of the light guide plate 510 (refer to FIG. 32)) of the model of the planar lighting device, light is hardly output to the part near the reflection film (part close to the end surface (not illustrated) of the light guide plate 510). This is because, as illustrated in FIG. 32, the light guide plate 510 according to the second reference example has no prism that causes light traveling from the incident surface toward the end surface to be output from the output surface 510a within a predetermined range closer to the end surface in a predetermined output range required as the output range of light for illumination. Consequently, it is difficult for the planar lighting device including the light guide plate 510 with the prisms 511 formed thereon according to the second reference example to suppress uneven illuminance.

Figure 40:
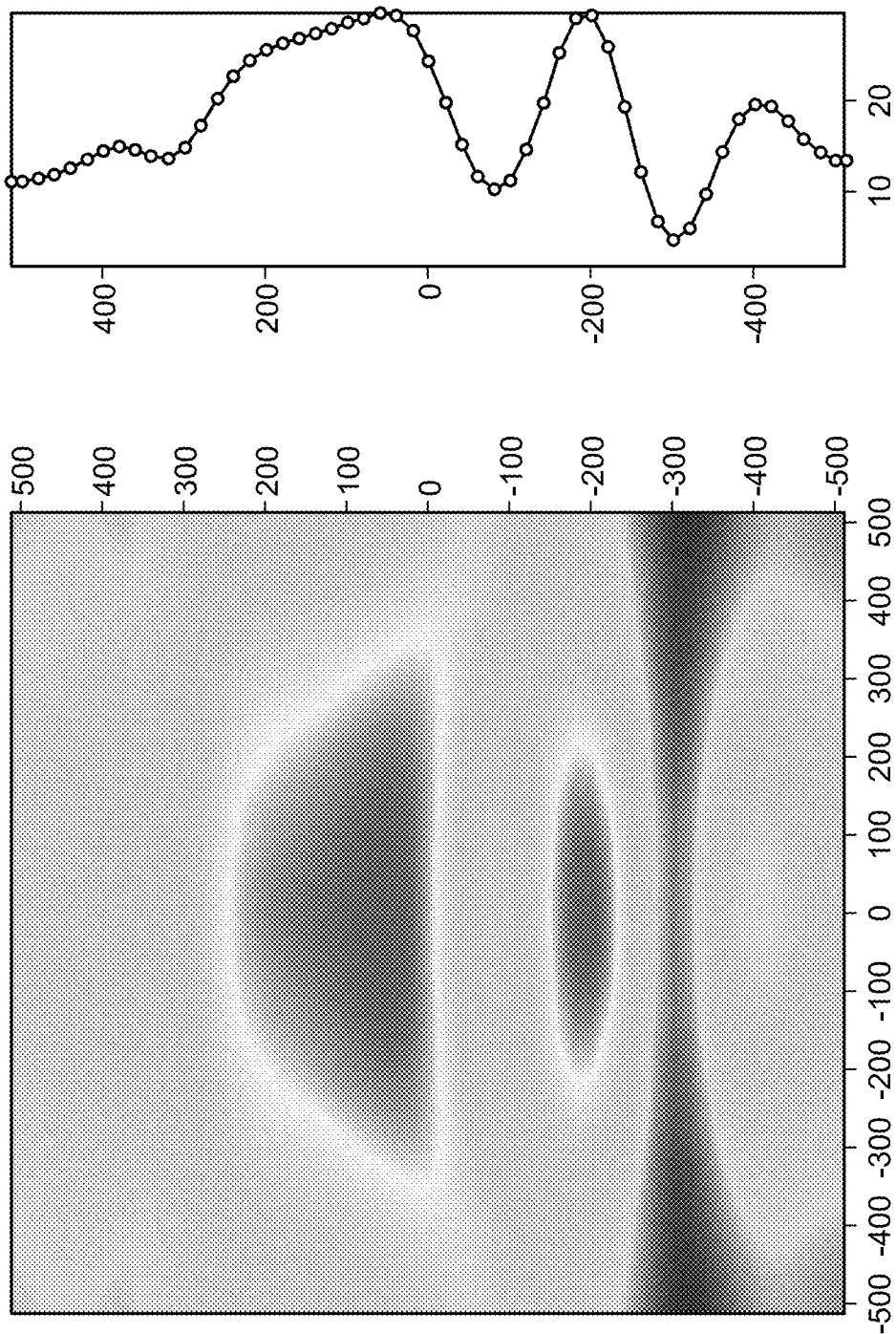
FIG. 40 is a diagram of an example of illuminance distribution of light for illumination output to the evaluation surface by a model of the planar lighting device including the light guide plate with the prisms formed thereon described with reference to FIG. 21 and is an example of the graph indicating a relation between the position in the vertical direction on the evaluation surface and the illuminance at the center position "0" in the horizontal direction at each position in the vertical direction.

FIG. 40 is a diagram of an example of illuminance distribution of light for illumination output to the evaluation surface by a model of the planar lighting device including the light guide plate 13 with the prisms 202 formed thereon described with reference to FIG. 21 and is an example of the graph indicating a relation between the position in the vertical direction on the evaluation surface and the illuminance at the center position "0" in the horizontal direction at each position in the vertical direction. The left figure in FIG. 40 illustrates an example of the illuminance distribution, and the right figure illustrates an example of the graph.

As indicated in the illuminance distribution and the graph in the example illustrated in FIG. 40, light is output to the part near the linear light source 15 (refer to FIG. 1) of the model of the planar lighting device. As indicated in the illuminance distribution and the graph in the example illustrated in FIG. 40, light is also output to the part near the reflection film 14 (refer to FIG. 1) (part close to the end surface 13b (refer to FIG. 1) of the light guide plate 13) compared with the illuminance distribution and the graph in the example illustrated in FIG. 39. This is because, as illustrated in FIG. 21, light traveling from the incident surface 13a (refer to FIG. 1) toward the end surface 13b of the light guide plate 13 is reflected by the second regions 202b of the prisms 202 and output from the output surface 13c as light traveling in the second direction 71 (refer to FIG. 9) is assumed to partially travel in the first direction 70 (refer to FIG. 9). Consequently, the planar lighting device including the light guide plate 13 with the prisms 202 formed thereon can suppress uneven illuminance compared with the planar lighting device including the light guide plate 510 with the prisms 511 formed thereon.

As indicated in the illuminance distribution and the graph in the example illustrated in FIG. 40, however, the illuminance is lower from a position of 0 mm to a position of approximately −170 mm in the vertical direction on the evaluation surface. This is because the light guide plate 13 in the example illustrated in FIG. 21 has no prism that causes light traveling from the incident surface 13a toward the end surface 13b to be output from the output surface 13c within a predetermined range close to the end surface 13b in a predetermined output range required as the output range of light for illumination.

Figure 41:
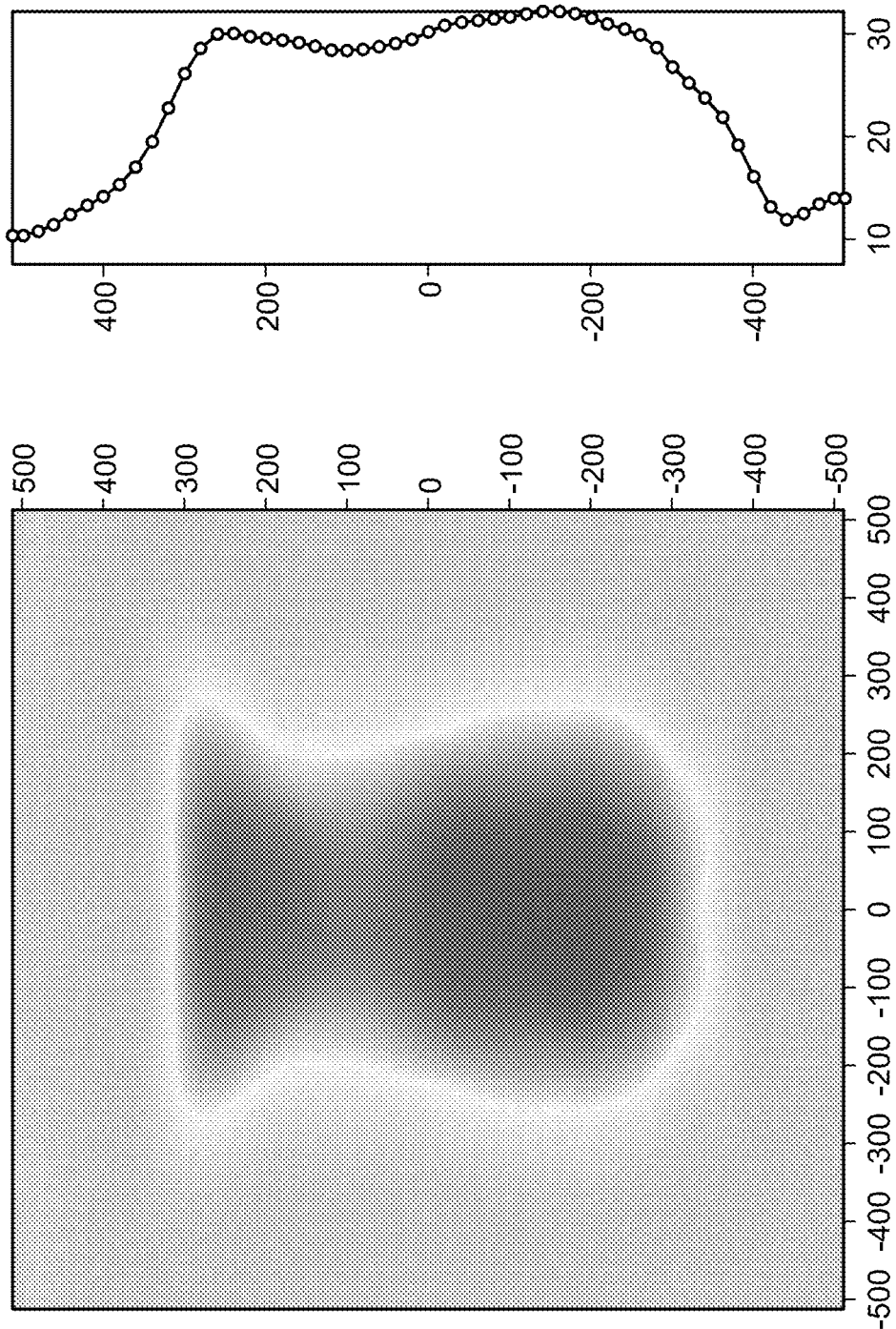
FIG. 41 is a diagram of an example of illuminance distribution of light for illumination output to the evaluation surface by a model of the planar lighting device including the light guide plate with the prisms formed thereon described with reference to FIG. 10 and is an example of the graph indicating a relation between the position in the vertical direction on the evaluation surface and the illuminance at the center position "0" in the horizontal direction at each position in the vertical direction.

FIG. 41 is a diagram of an example of illuminance distribution of light for illumination output to the evaluation surface by a model of the planar lighting device 1 including the light guide plate 13 with the prisms 13e formed thereon described with reference to FIG. 10 and is an example of the graph indicating a relation between the position in the vertical direction on the evaluation surface and the illuminance at the center position "0" in the horizontal direction at each position in the vertical direction. The left figure in FIG. 41 illustrates an example of the illuminance distribution, and the right figure illustrates an example of the graph.

As indicated in the illuminance distribution and the graph in the example illustrated in FIG. 41, light is output to the part near the linear light source 15 (refer to FIG. 1) of the model of the planar lighting device 1. As indicated in the illuminance distribution and the graph in the example illustrated in FIG. 41, light is also output to the part near the reflection film 14 (refer to FIG. 1) (part close to the end surface 13b (refer to FIG. 1) of the light guide plate 13) compared with the illuminance distribution and the graph in the example illustrated in FIG. 40. As indicated in the illuminance distribution and the graph in the example illustrated in FIG. 41, the illuminance is higher in a part corresponding to the part having lower illuminance described above indicated in the illuminance distribution and the graph in the example illustrated in FIG. 40. This is because the light guide plate 13 in the example illustrated in FIG. 10 has the prisms 13e each having the region 13h_2 that causes light traveling from the incident surface 13a toward the end surface 13b to be output from the output surface 13c within a predetermined range near the end surface 13b in a predetermined output range required as the output range of light for illumination. Consequently, the planar lighting device 1 including the light guide plate 13 with the prisms 13e formed thereon can suppress uneven illuminance compared with the planar lighting device including the light guide plate 13 with the prisms 202 formed thereon.

In the illuminance distribution in the example illustrated in FIG. 41, however, the line segment connecting the positions having the same illuminance does not have a concentric circular shape around the central position (0,0) on the evaluation surface but has an irregular shape. This is because the prisms 13e in the example illustrated in FIG. 10 each have the flat-surface regions 13g_1, 13g_2, and 13h_2 serving as flat surfaces. Specifically, this is because light is reflected in a dispersed manner by the flat-surface regions 13g_1, 13g_2, and 13h_2.

Figure 42:
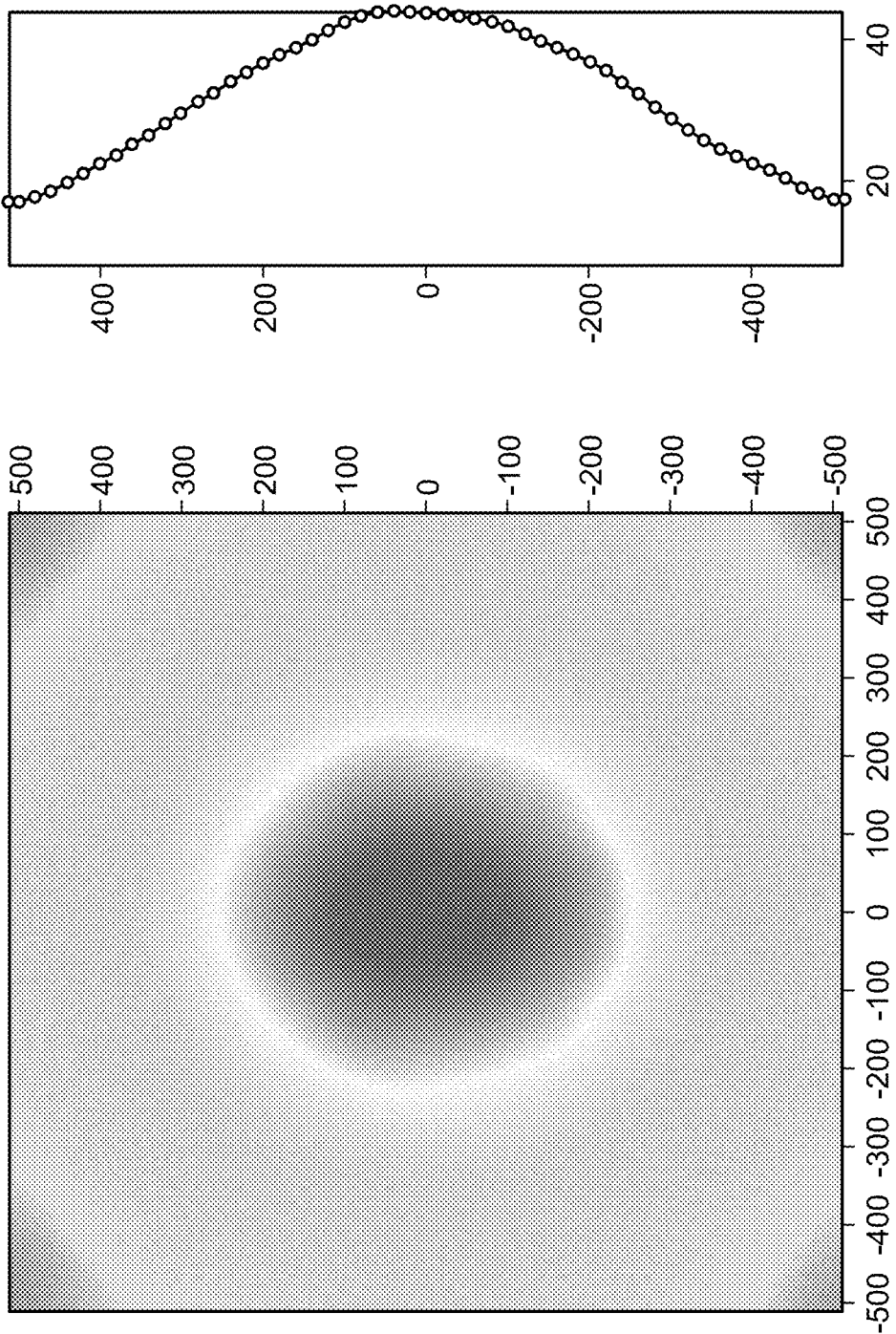
FIG. 42 is a diagram of an example of illuminance distribution of light for illumination output to the evaluation surface by a model of the planar lighting device including the light guide plate with the prisms formed thereon described with reference to FIG. 29 and is an example of the graph indicating a relation between the position in the vertical direction on the evaluation surface and the illuminance at the center position "0" in the horizontal direction at each position in the vertical direction.

FIG. 42 is a diagram of an example of illuminance distribution of light for illumination output to the evaluation surface by a model of the planar lighting device including the light guide plate 13 with the prisms 207 formed thereon described with reference to FIG. 29 and is an example of the graph indicating a relation between the position in the vertical direction on the evaluation surface and the illuminance at the center position "0" in the horizontal direction at each position in the vertical direction. The left figure in FIG. 42 illustrates an example of the illuminance distribution, and the right figure illustrates an example of the graph.

As indicated in the graph in the example illustrated in FIG. 42, the illuminance is highest at the central position "0" in the vertical direction and gradually decreases away from the central position "0" in the vertical direction. Furthermore, as indicated in the illuminance distribution in the example illustrated in FIG. 42, the line segment connecting the positions having the same illuminance has an approximately concentric circular shape about the central position (0,0) on the evaluation surface. This is because the prisms 207 formed on the light guide plate 13 in the example illustrated in FIG. 29 each have the curved-surface first region 207a. Specifically, this is because light traveling from the end surface 13b (refer to FIG. 1) toward the incident surface 13a (refer to FIG. 1) is uniformly diffused in a plurality of directions by the curved-surface first region 207a. As a result, the planar lighting device including the light guide plate 13 with the prisms 207 formed thereon can suppress uneven illuminance compared with the planar lighting device 1 including the light guide plate 13 with the prisms 13e formed thereon.

The planar lighting devices according to the embodiments and the modifications have been described. The planar lighting devices according to the embodiments and the modifications can control distribution of two kinds of light.

The embodiments and the modifications described above are not intended to limit the present invention. Aspects obtained by appropriately combining the components described above are also included in the present invention. Other advantageous effects and modifications can be easily derived by those skilled in the art. Consequently, more extensive aspects of the present invention are not limited to the embodiments and the modifications described above, and various changes may be made.

REFERENCE SIGNS LIST 1, 100, 101, 102 planar lighting device
11 housing frame
12a, 12b FPC
13 light guide plate
13a incident surface
13b end surface
13c output surface
13d principal surface (opposite surface)
13e, 13p, 202 to 209 prism (first prism)
13m, 13u prism (second prism)
13f, 202f, 204d, 207d, 208d protrusion (first protrusion)
13n protrusion (second protrusion)
13q, 203h, 205d, 206d, 209d recess (first recess)
13x recess (second recess)
14 reflection film (reflecting member)
15 linear light source (light source)
15a, 15b LED
15c light bar
15d prism sheet
15e diffusion sheet
70 first direction
71 second direction

The invention claimed is:

1. A planar lighting device comprising:
a light guide plate having an incident surface that receives light output from a light source and an output surface that outputs the light received by the incident surface; and
a reflecting member that faces an end surface opposite to the incident surface of the light guide plate and reflects light leaking from the end surface, wherein
a plurality of first prisms are formed on an opposite surface opposite to the output surface of the light guide plate to be away from the output surface stepwise from the incident surface to the end surface, the first prisms causing the light reflected by the reflecting member and traveling from the end surface toward the incident surface to be output from the output surface in a first direction as first light and causing the light entering into the incident surface and traveling from the incident surface toward the end surface to be output from the output surface in a second direction different from the first direction as second light, and
the first prisms each have a parallel region substantially parallel to the output surface.

2. The planar lighting device according to claim 1, wherein
the first prisms each have a first protrusion protruding toward the opposite side of the output surface, and
the first protrusion has a first region that is gradually away from the output surface in a direction from the incident surface toward the end surface and that causes the light traveling from the end surface toward the incident surface to be output from the output surface in the first direction as the first light and a second region that is gradually closer to the output surface in the direction from the incident surface toward the end surface and that causes at least the light traveling from the incident surface toward the end surface to be output from the output surface in the second direction as the second light.

3. The planar lighting device according to claim 2, wherein
the second region includes a plurality of flat surfaces or a plurality of curved surfaces, and
at least one of the flat surfaces or the curved surfaces causes the light traveling from the incident surface toward the end surface to be output from the output surface in the first direction as the first light.

4. The planar lighting device according to claim 1, wherein
the first prisms each have a first recess recessed toward the output surface, and
the first recess has a first region that is gradually away from the output surface in a direction from the incident surface toward the end surface and that causes the light traveling from the end surface toward the incident surface to be output from the output surface in the first direction as the first light and a second region that is gradually closer to the output surface in the direction from the incident surface toward the end surface and that causes at least the light traveling from the incident surface toward the end surface to be output from the output surface in the second direction as the second light.

5. The planar lighting device according to claim 4, wherein
the second region includes a plurality of flat surfaces or a plurality of curved surfaces, and
at least one of the flat surfaces or the curved surfaces causes the light traveling from the incident surface toward the end surface to be output from the output surface in the first direction as the first light.

6. The planar lighting device according to claim 1, wherein a plurality of second prisms are formed on the opposite surface of the light guide plate to be away from the output surface stepwise from the incident surface to the end surface, the second prisms causing the light entering into the incident surface and traveling from the incident surface toward the end surface and the light reflected by the reflecting member and traveling from the end surface toward the incident surface to be output from the output surface in the first direction as the first light.

7. The planar lighting device according to claim 6, wherein a plurality of prism rows are formed in a third direction from the incident surface toward the end surface, the prism rows each including the first prisms and the second prisms aligned in a fourth direction intersecting the third direction.

8. The planar lighting device according to claim 7, wherein
the second prisms each have a second protrusion protruding toward the opposite side of the output surface, and
the second protrusion has a fourth region that is gradually away from the output surface in the direction from the incident surface toward the end surface and that causes the light traveling from the end surface toward the incident surface to be output from the output surface in the first direction as the first light and a fifth region that is gradually closer to the output surface in the direction from the incident surface toward the end surface, that causes the light traveling from the incident surface toward the end surface to be output from the output surface in the first direction as the first light or causes the light to be output from the output surface in the second direction as the second light, and that is smaller than a region that causes the second light to be output from the output surface in the second direction in the region of the first prisms that is gradually closer to the output surface in the direction from the incident surface toward the end surface.

9. The planar lighting device according to claim 7, wherein
the second prisms each have a second recess recessed toward the output surface, and
the second recess has a fourth region that is gradually away from the output surface in the direction from the incident surface toward the end surface and that causes the light traveling from the end surface toward the incident surface to be output from the output surface in the first direction as the first light and a fifth region that is gradually closer to the output surface in the direction from the incident surface toward the end surface, that causes the light traveling from the incident surface toward the end surface to be output from the output surface in the first direction as the first light or causes the light to be output from the output surface in the second direction as the second light, and that is smaller than a region that causes the second light to be output from the output surface in the second direction in the region of the first prisms that is gradually closer to the output surface in the direction from the incident surface toward the end surface.

10. The planar lighting device according to claim 6, wherein
the second prisms each have a second protrusion protruding toward the opposite side of the output surface, and
the second protrusion has a fourth region that is gradually away from the output surface in the direction from the incident surface toward the end surface and that causes the light traveling from the end surface toward the incident surface to be output from the output surface in the first direction as the first light and a fifth region that is gradually closer to the output surface in the direction from the incident surface toward the end surface, that causes the light traveling from the incident surface toward the end surface to be output from the output surface in the first direction as the first light or causes the light to be output from the output surface in the second direction as the second light, and that is smaller than a region that causes the second light to be output from the output surface in the second direction in the region of the first prisms that is gradually closer to the output surface in the direction from the incident surface toward the end surface.

11. The planar lighting device according to claim 6, wherein
the second prisms each have a second recess recessed toward the output surface, and
the second recess has a fourth region that is gradually away from the output surface in the direction from the incident surface toward the end surface and that causes the light traveling from the end surface toward the incident surface to be output from the output surface in the first direction as the first light and a fifth region that is gradually closer to the output surface in the direction from the incident surface toward the end surface, that causes the light traveling from the incident surface toward the end surface to be output from the output surface in the first direction as the first light or causes the light to be output from the output surface in the second direction as the second light, and that is smaller than a region that causes the second light to be output from the output surface in the second direction in the region of the first prisms that is gradually closer to the output surface in the direction from the incident surface toward the end surface.

12. The planar lighting device according to claim 1, wherein
the light guide plate has translucency configured so as to allow an object behind the opposite surface to be visually recognized from the output surface side, and
a ratio of a length of the parallel region of the first prisms in the direction from the incident surface toward the end surface to a length of a first prism in the direction from the incident surface toward the end surface is equal to or larger than 60%.

13. The planar lighting device according to claim 1, wherein the first light and the second light form a light emission pattern comprising bright parts and dark parts.

14. The planar lighting device according to claim 1, wherein the first light is output as light for illumination and the second light is output as light for design whose intensity of the light emission is different from the light for illumination.

* * * * *